United States Patent
Hirota et al.

(10) Patent No.: US 10,401,195 B2
(45) Date of Patent: Sep. 3, 2019

(54) MAGNET AND DISPLACEMENT DETECTION UNIT

(71) Applicant: TDK CORPORATION, Tokyo (JP)

(72) Inventors: Yohei Hirota, Tokyo (JP); Hiraku Hirabayashi, Tokyo (JP); Keisuke Uchida, Tokyo (JP); Kazuya Watanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 145 days.

(21) Appl. No.: 15/439,264

(22) Filed: Feb. 22, 2017

(65) Prior Publication Data

US 2017/0261346 A1    Sep. 14, 2017

(30) Foreign Application Priority Data

Mar. 9, 2016  (JP) .................. 2016-046188

(51) Int. Cl.
| | |
|---|---|
| *G01D 5/12* | (2006.01) |
| *G01D 5/14* | (2006.01) |
| *G01R 33/00* | (2006.01) |
| *G01R 33/09* | (2006.01) |
| *G01D 5/16* | (2006.01) |

(52) U.S. Cl.
CPC .............. *G01D 5/16* (2013.01); *G01D 5/145* (2013.01)

(58) Field of Classification Search
CPC ............ G01D 5/12; G01D 5/14; G01D 5/145; G01D 5/16; G01R 33/00; G01R 33/09
See application file for complete search history.

(56) References Cited

U.S. PATENT DOCUMENTS

| | | | |
|---|---|---|---|
| 6,570,376 B2 | 5/2003 | Matsui et al. | |
| 2001/0033231 A1* | 10/2001 | Matsui ................... | G01D 5/145 340/672 |
| 2010/0289484 A1* | 11/2010 | Quinn .................... | G01D 5/145 324/207.2 |
| 2012/0176126 A1* | 7/2012 | Naganuma ......... | G01R 33/0011 324/207.25 |

FOREIGN PATENT DOCUMENTS

| | | |
|---|---|---|
| JP | S57-29910 A | 2/1982 |
| JP | H03-123815 A | 5/1991 |
| JP | H06-147816 A | 5/1994 |
| JP | 2001-304805 A | 10/2001 |
| JP | 2011-145168 A | 7/2011 |
| JP | 2012-127736 A | 7/2012 |

* cited by examiner

*Primary Examiner* — Neel D Shah
(74) *Attorney, Agent, or Firm* — Oliff PLC

(57) ABSTRACT

A displacement detection unit includes a magnet and a magnetic detector. The magnet includes a first magnetic-pole region polarized into a south pole and a second magnetic-pole region polarized into a north pole, and generates a magnetic field around the magnet. The magnetic detector is movable relative to the magnet in a first direction, and detects a change in the magnetic field and thereby detects a displacement of the magnet in the first direction. The magnet includes a transition section in which a ratio of a magnetic volume of the second magnetic-pole region in a second direction to a magnetic volume of the first magnetic-pole region in the second direction gradually varies in the first direction. The second direction is orthogonal to the first direction.

24 Claims, 53 Drawing Sheets

(EXPERIMENTAL EXAMPLE 1-1)

(EXPERIMENTAL EXAMPLE 1-1)

(EXPERIMENTAL EXAMPLE 2-1)

$\theta = 225°$, $\phi i = 60mm$, $\phi o = 100mm$ (EXPERIMENTAL EXAMPLE 2-2)

$\theta = 180°$, $\phi i = 60mm$, $\phi o = 100mm$ (EXPERIMENTAL EXAMPLE 2-1)

(EXPERIMENTAL EXAMPLE 2-2)

(EXPERIMENTAL EXAMPLE 2-3)

(EXPERIMENTAL EXAMPLE 2-4)

(EXPERIMENTAL EXAMPLE 3-1)

(EXPERIMENTAL EXAMPLE 3-2)

(EXPERIMENTAL EXAMPLE 3-3)

$\theta = 45°$, $\phi i = 80mm$, $\phi o = 100mm$ (EXPERIMENTAL EXAMPLE 3-4)

$\theta = 25°$, $\phi i = 80mm$, $\phi o = 100mm$ (EXPERIMENTAL EXAMPLE 3-3)

(EXPERIMENTAL EXAMPLE 3-4)

(EXPERIMENTAL EXAMPLE 4-1)

$\theta = 180°$, $\phi i = 60mm$, $\phi o = 100mm$ (EXPERIMENTAL EXAMPLE 4-1)

$B\theta / Br$ (EXPERIMENTAL EXAMPLE 4-2)

$\theta = 180°$, $\phi i = 60mm$, $\phi o = 100mm$ (EXPERIMENTAL EXAMPLE 4-2)

$B\theta/Br$ (EXPERIMENTAL EXAMPLE 6)

(EXPERIMENTAL EXAMPLE 6)

(EXPERIMENTAL EXAMPLE 7-3)

(EXPERIMENTAL EXAMPLE 7-4)

(EXPERIMENTAL EXAMPLE 8-1)

(EXPERIMENTAL EXAMPLE 8-2)

(COMPARATIVE EXAMPLE 1)

$\theta = 0°$, $\phi i = 40mm$, $\phi o = 100mm$ (COMPARATIVE EXAMPLE 1)

$B\theta/Br$

MAGNET AND DISPLACEMENT DETECTION UNIT

CROSS REFERENCE TO RELATED APPLICATIONS

This application claims the benefit of Japanese Priority Patent Application JP2016-046188 filed Mar. 9, 2016, the entire contents of which are incorporated herein by reference.

BACKGROUND

The technology relates to a displacement detection unit that detects a displacement of a magnet relative to a magnetic detection device and relates to a magnet to be provided in the displacement detection unit.

Encoders, potentiometers, and other measurement units typically have a rotation angle detection unit, a so-called displacement detection unit, that detects a rotational movement of a rotating body. An exemplary rotation angle detection unit includes a magnet rotatable together with the rotating body and a magnetic detection device disposed adjacent to and separately from the magnet. For example, reference is made to Japanese Unexamined Patent Application Publications Nos. 2001-304805 and 2011-145168.

SUMMARY

However, ranges of detection angles supported by rotation angle detection units, as described above, may be insufficient, and their detected value may greatly differ from an actual one at a certain rotation angle.

It is desirable to provide a displacement detection unit that makes it possible to detect an angle with higher precision without decreasing its detectable angle range, and a magnet to be provided suitably in this displacement detection unit.

A displacement detection unit according to an embodiment of the technology includes: a magnet that includes a first magnetic-pole region polarized into a south pole and a second magnetic-pole region polarized into a north pole, and generates a magnetic field around the magnet; and a magnetic detector that is movable relative to the magnet in a first direction, and detects a change in the magnetic field and thereby detects a displacement of the magnet in the first direction. The magnet includes a transition section in which a ratio of a magnetic volume of the second magnetic-pole region in a second direction to a magnetic volume of the first magnetic-pole region in the second direction gradually varies in the first direction. The second direction is orthogonal to the first direction.

A magnet according to an embodiment of the technology includes: a first magnetic-pole region extending in a first direction, and polarized into a south pole; a second magnetic-pole region extending in the first direction, and polarized into a north pole; and a transition section in which a ratio of a magnetic volume of the second magnetic-pole region in a second direction to a magnetic volume of the first magnetic-pole region in the second direction gradually varies in the first direction. The second direction is orthogonal to the first direction.

DETAILED DESCRIPTION

Some embodiments of the technology will be described below in detail with reference to the accompanying drawings. The description will be given in the following order.

1. First Embodiment

A displacement detection unit that detects a magnetic field component in a plane parallel to the rotation plane of a circular magnet 2. Second Embodiment A displacement detection unit that detects a magnetic field component in a rotational direction of a circular magnet and a magnetic field component perpendicular to the rotation plane of the circular magnet 3. Third Embodiment A displacement detection unit that detects a magnetic field component in a moving direction of a rectangular parallelepiped magnet and a magnetic field component perpendicular to the moving direction of the rectangular parallelepiped magnet 4. Other Modifications 1. First Embodiment

[1-1] Example of Linear Boundaries
[Configuration of Displacement Detection Unit 11]

Figure 1A:
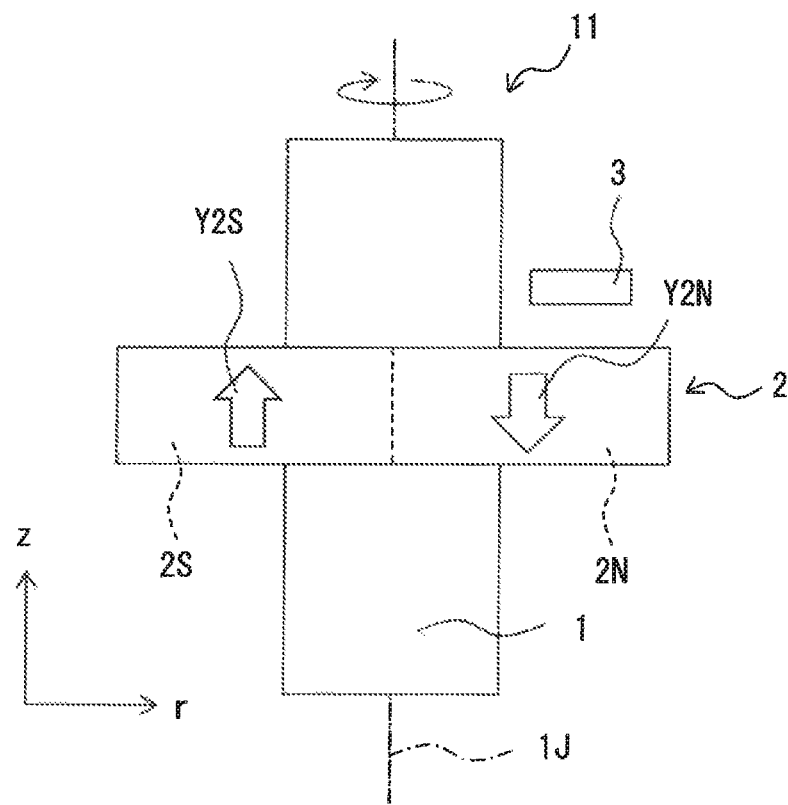
FIG. 1A is a front view of an overall configuration of a displacement detection unit according to a first embodiment of the technology.
Figure 1B:
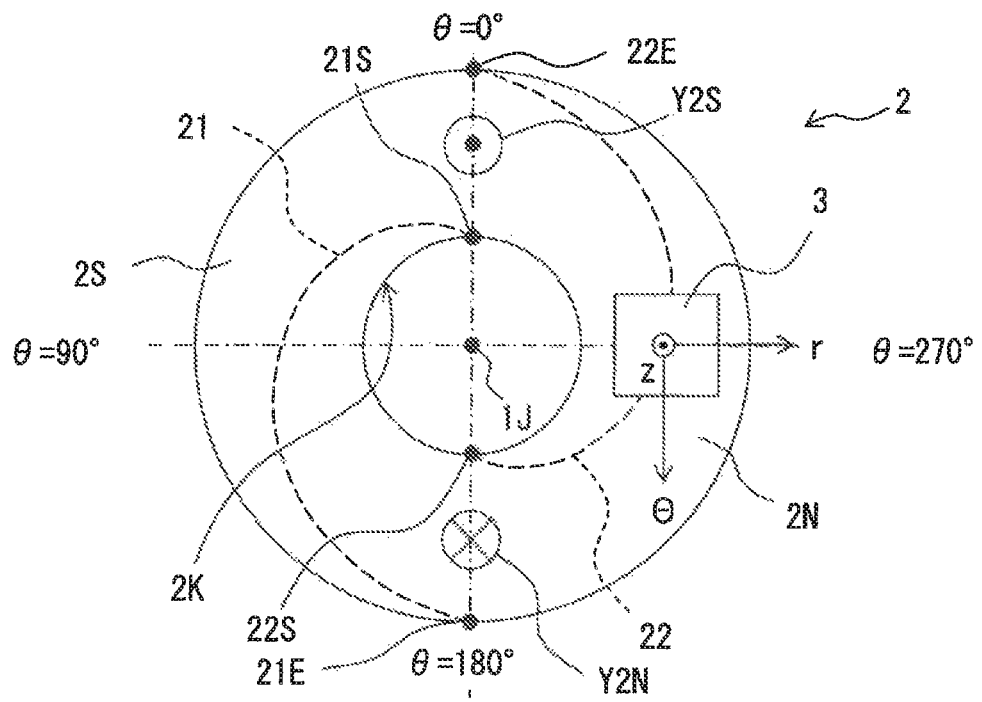
FIG. 1B is a top plan view of the overall configuration of the displacement detection unit illustrated in FIG. 1A.
Figure 1C:
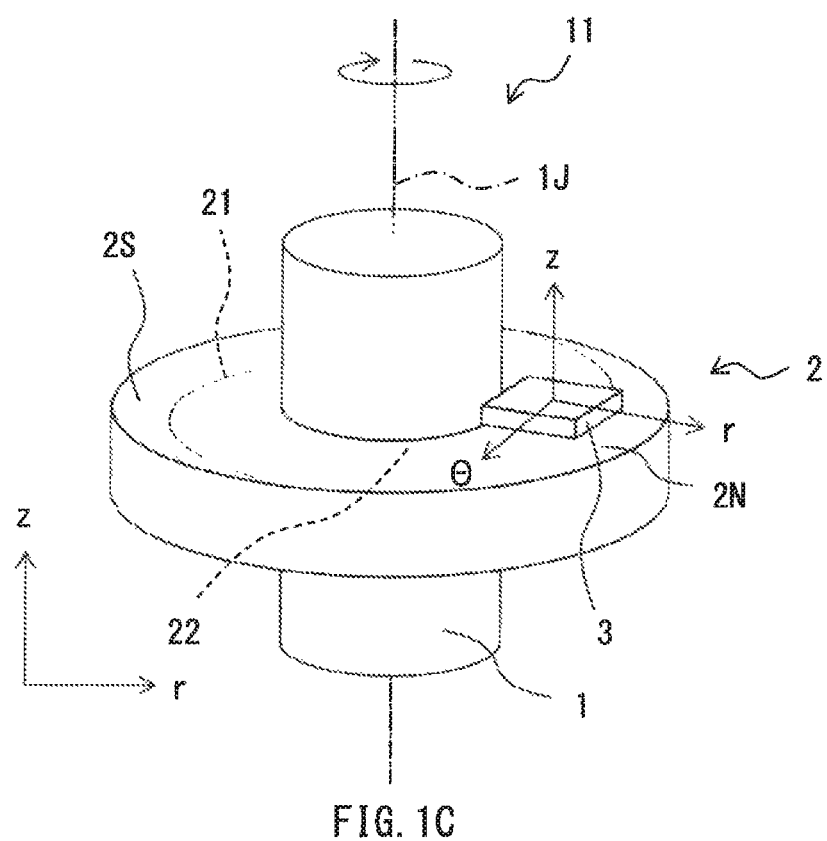
FIG. 1C is a perspective view of the overall configuration of the displacement detection unit illustrated in FIG. 1A.
Figure 2A:
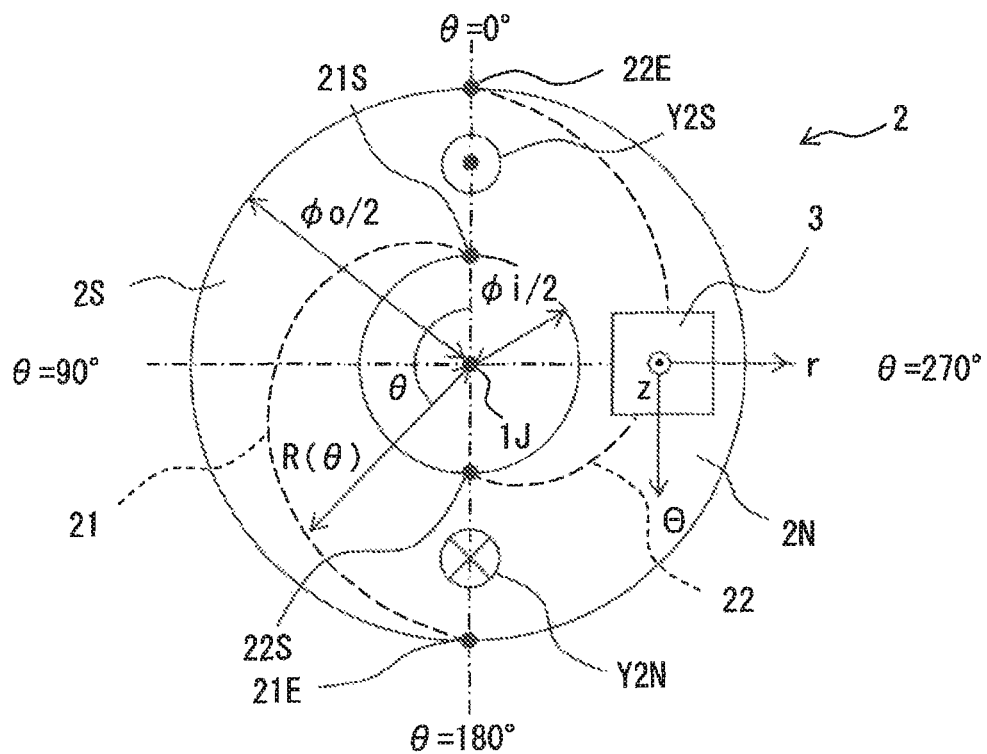
FIG. 2A is an explanatory schematic view of an expression that defines boundaries of the magnet illustrated in FIG. 1A.
Figure 2B:
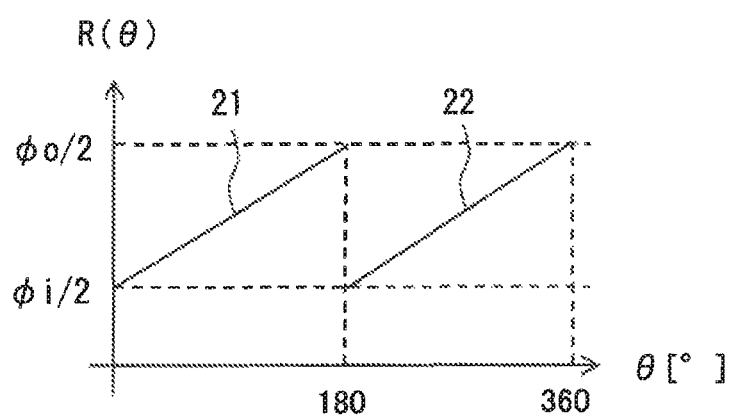
FIG. 2B is a graph indicating distances from the rotation axis of the magnet illustrated in FIG. 1A to the respective boundaries between a first magnetic-pole region and a second magnetic-pole region in the magnet.
Figure 3A:
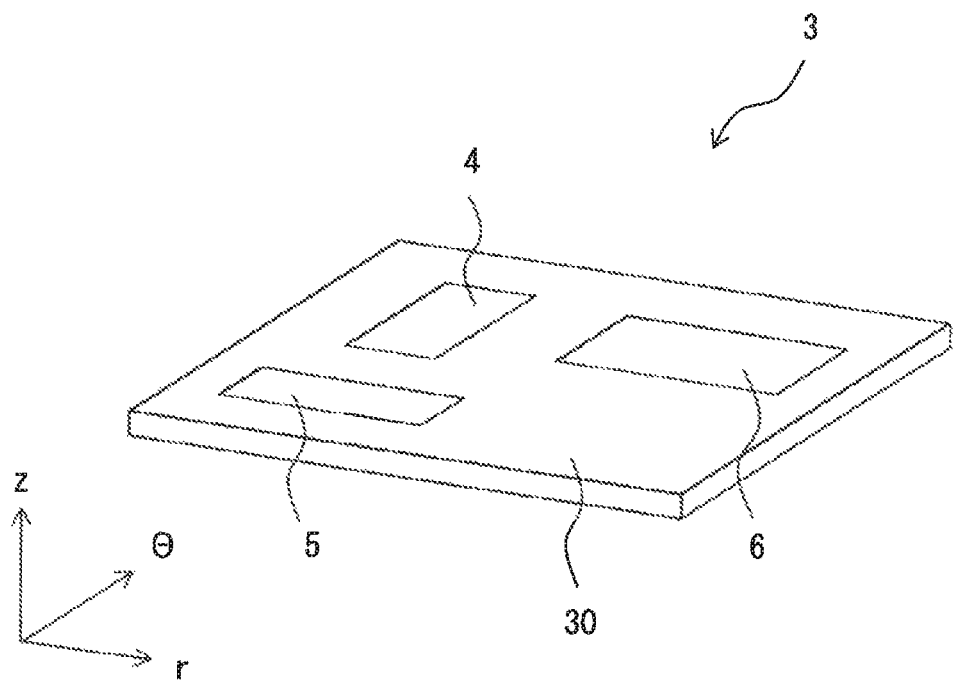
FIG. 3A is a perspective view of a configuration of the magnetic detector illustrated in FIG. 1A.
Figure 3B:
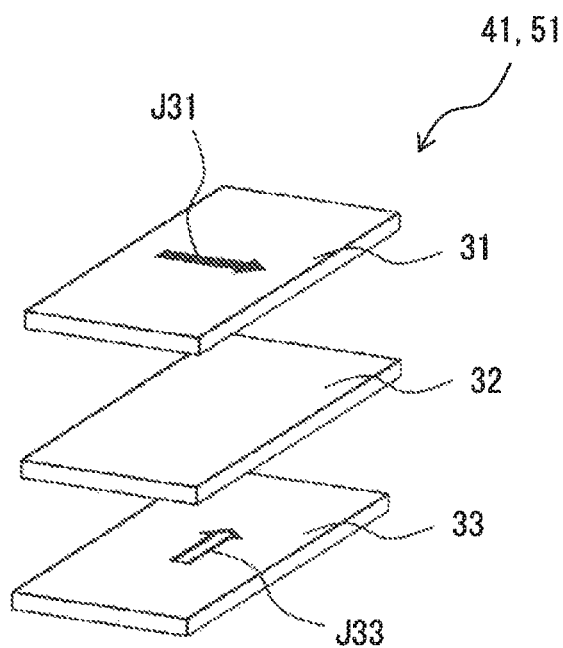
FIG. 3B is an enlarged, exploded perspective view of a configuration of a key part of the magnetic detector illustrated in FIG. 1A.
Figure 3C:
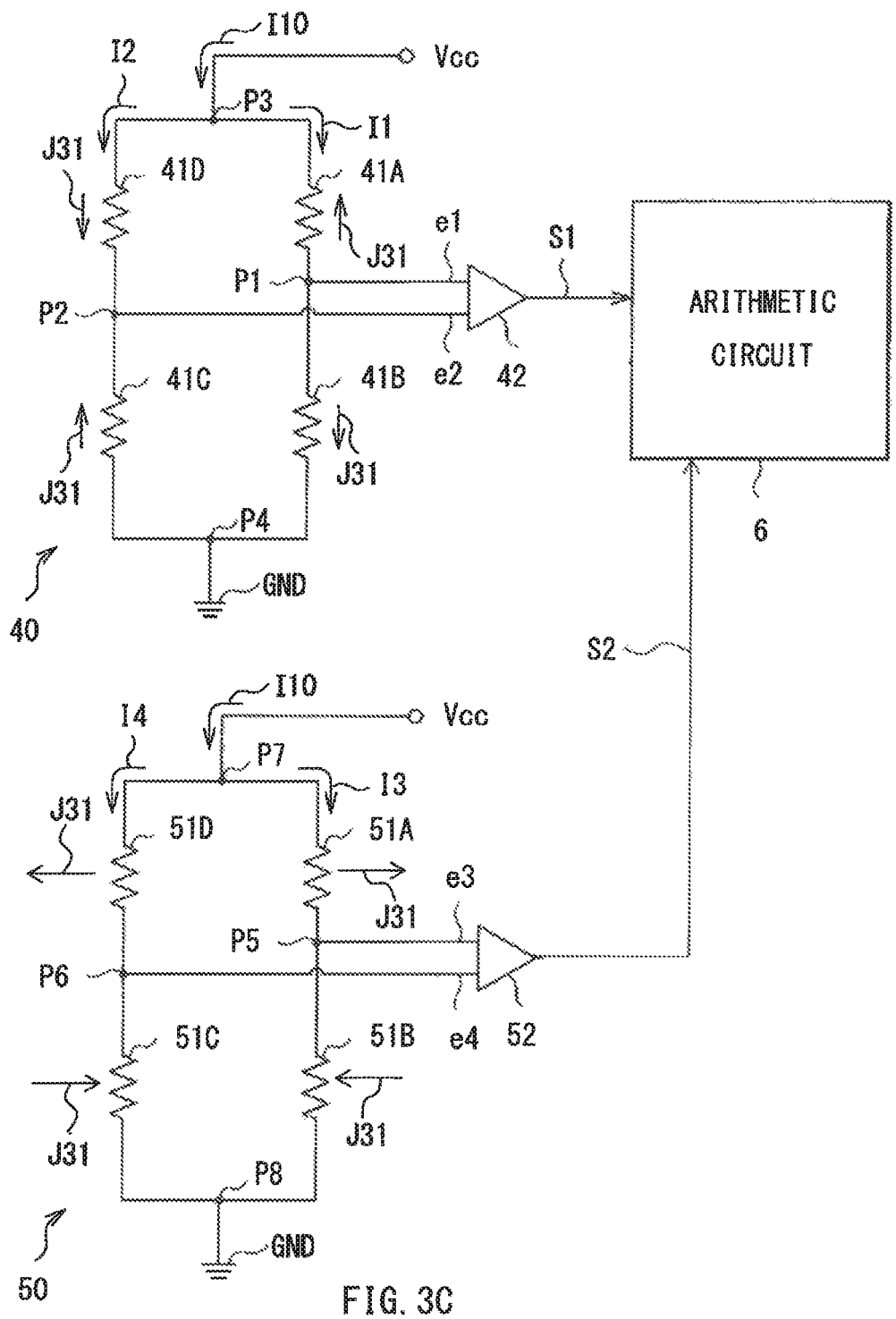
FIG. 3C is a circuit diagram of the magnetic detector illustrated in FIG. 1A.

A description will be given of a configuration of a displacement detection unit 11 according to a first embodiment of the technology, with reference to FIGS. 1A to 1C, 2A, 2B, and 3A to 3C. FIG. 1A is a front view of an overall configuration of the displacement detection unit 11; FIG. 1B is a top plan view of the overall configuration of the displacement detection unit 11; and FIG. 1C is a perspective view of the overall configuration of the displacement detection unit 11. FIG. 2A is a top plan view of a configuration of a magnet 2 (described later) in the displacement detection unit 11; FIG. 2B is a characteristic graph relating to the shapes of boundaries 21 and 22 in the magnet 2. FIG. 3A is a perspective view of an exemplary overall configuration of a sensor unit 3 (described later) in the displacement detection unit 11; FIG. 3B is an exploded perspective view of a configuration of magneto-resistive effect devices 41 and 51 (described later) in the sensor unit 3; and FIG. 3C is a circuit diagram of the sensor unit 3.

The displacement detection unit 11 may be a rotation angle detection unit that detects a rotation angle of a rotating body. The rotating body may be an object to be measured and have a rod-like or disc-like shape, for example. The displacement detection unit 11 may include a shaft 1, the magnet 2, and the sensor unit 3, for example. In this embodiment, a direction along a rotation axis 1J (described later) of the shaft 1 or the magnet 2 is defined as a rotation axis direction z or a z direction. A rotational direction of the shaft 1 and the magnet 2 is defined as a rotational direction Θ or a Θ direction. A direction orthogonal to both the rotation axis 1J and the rotational direction Θ is defined as a radial direction r or a direction r.

The shaft 1 may be a pillar or cylindrical member. The shaft 1 may be directly or indirectly attached to the rotating body, which is an object to be measured, and be rotatable around the rotation axis 1J together with the rotating body.

The magnet 2 may correspond to a "magnet" in one specific but non-limiting embodiment of the technology, and may be rotatable around the rotation axis 1J relative to an external system and together with the shaft 1. The magnet 2 may be a circular member and have an opening 2K provided in the vicinity of the rotation axis 1J and an outer-circumferential rim and an inner-circumferential rim whose circumferential directions coincide with the rotational direction Θ. The magnet 2 may be, for example a ferromagnetic body having a substantially uniform dimension in the z direction, namely, a substantially uniform thickness. The shaft 1 may be so disposed as to penetrate through the opening 2K, and fixed in the opening 2K with its outer surface being in contact with the inner surface of the opening 2K.

The magnet 2 has an S-pole region 2S and an N-pole region 2N. The S-pole region 2S is polarized into the south pole; the N-pole region 2N is polarized into the north pole. Hereinafter, the south pole is referred to as the S pole, and the north pole is referred to as the N pole. The S-pole region 2S and the N-pole region 2N are separated from each other by the two boundaries 21 and 22. The magnet 2 has a transition section in which the S-pole region 2S and the N-pole region 2N coexist in the radial direction r, which is orthogonal to the rotational direction Θ. In this transition section, the ratio of the magnetic volume of the N-pole region 2N in the radial direction r to the magnetic volume of the S-pole region 2S in the radial direction r gradually varies in the rotational direction Θ. This embodiment is based on a non-limiting example in which both the magnetic volume of the S-pole region 2S in the radial direction r and the magnetic volume of the N-pole region 2N in the radial direction r gradually varies in the rotational direction Θ. Hereinafter, the magnetic volume of the S-pole region 2S is referred to as a magnetic volume Vs; the magnetic volume of the N-pole region 2N is referred to as a magnetic volume Vn. Furthermore, in this transition section, each of the boundaries 21 and 22 may include a part that is angled in both the radial direction r and the rotational direction Θ. It is to be noted that the transition section is provided in the whole of the magnet 2 in the example illustrated in FIGS. 1A to 1C, except for the following sections; an inner-circumferential edge 21S of the boundary 21, an inner end location at an angle θ of 0° which is defined by a straight line passing through both the outer-circumferential edge 22E of the boundary 22 and the rotation axis 1J, an outer-circumferential edge 21E of the boundary 21, and an outer end location at an angle θ of 180° which is defined by the straight line passing through both an inner-circumferential edge 22S of the boundary 22 and the rotation axis 1J, as illustrated in FIG. 2B. In this embodiment, the magnet 2 may have a substantially uniform thickness, and a cross section z-r of the magnet 2 which is orthogonal to the rotational direction Θ may have a substantially uniform shape and area in the rotational direction Θ. This makes it possible to determine the ratio between the magnetic volume Vs and the magnetic volume Vn on the basis of a ratio between dimensions of the S-pole region and the N-pole region in the r direction. For example, in this embodiment, the magnetic volume Vs of the S-pole region 2S in the transition section of the magnet 2 may gradually decrease while the magnetic volume Vn of the N-pole region 2N in the transition section of the magnet 2 may gradually increase as going, in the +Θ direction, from the inner end location at the angle θ of 0° to the outer end location at the angle θ of 180°. As described above, the magnet 2 in this embodiment may have a substantially uniform thickness. Therefore, a ratio between the lengths of the line segments of the S-pole region and the N-pole region that both extend in the r direction may gradually vary in the rotational direction Θ on a cross section of the magnet 2 which is parallel to the Θ-r plane orthogonal to the z direction, each surface of the magnet 2, or both thereof. In other words, in the transition section of the magnet 2, a ratio between the areas of the z-r cross sections of the S-pole region and the N-pole region which are orthogonal to the rotational direction Θ may gradually vary in the rotational direction Θ. Furthermore, in the magnet 2, the rotation axis 1J may be present between the outer-circumferential edge 21E of the boundary 21 and the outer-circumferential edge 22E of the boundary 22, and the rotation axis 1J may also be present between the inner-circumferential edge 21S and the inner-circumferential edge 22S. As in the example illustrated in FIGS. 1A to 1C, all of the outer-circumferential edge 21E, the outer-circumferential edge 22E, the inner-circumferential edge 21S, the inner-circumferential edge 22S, and the rotation axis 1J may be aligned with one another.

An arrow denoted by a character Y2S within the S-pole region 2S and an arrow denoted by a character Y2N within the N-pole region 2N each indicate an orientation of a major magnetic flux produced by the magnet 2. In this example, the magnetic flux Y2S may be produced in the +z direction within the S-pole region 2S, whereas the magnetic flux Y2N may be produced in the −z direction within the N-pole region 2N.

In the transition section, as described above, the ratio of the magnetic volume Vn of the N-pole region in the radial direction r to the magnetic volume Vs of the S-pole region in the radial direction r may monotonically increase or decrease in the rotational direction Θ. As illustrated in FIGS. 2A and 2B, the boundary 21 may be curved such that a distance R(θ) from the rotation axis 1J to the boundary 21 monotonically increases or decreases with a boundary angle θ (described later); the boundary angle θ will be referred to below as the angle θ. Likewise, the boundary 22 may be curved such that a distance R(θ) from the rotation axis 1J to the boundary 22 monotonically increases or decreases with the angle θ. More specifically, each of the boundaries 21 and 22 may be linearly change with the angle θ in conformity with expression (1) described below. It is to be noted that FIG. 2A is a top plan view of the configuration of the magnet 2 which is used to explain expression (1) and FIG. 2B is a characteristic graph indicating the relationship between the angle θ and the distance R(θ).

$$R(\theta) = (\theta/180) \times (\phi 0 - \phi i)/2 + (\phi i/2) \quad (1)$$

In expression (1), R(θ) denotes the distance from the rotation axis 1J positioned in the center of the magnet 2 to any given point on the boundary 21 or 22. In addition, θ denotes a central angle (°) between a reference line and a line coupling the rotation axis 1J to any given point on the boundary 21 or 22; the reference line has an angle θ of 0° and couples the rotation axis 1J to the inner-circumferential edge 21S of the boundary 21 or the inner-circumferential edge 22S of the boundary 22. Furthermore, φi denotes the inner diameter of the magnet 2, and φ0 denotes the outer diameter of the magnet 2.

The main constituent material of magnet 2 may be a ferromagnetic material, examples of which may include, but is not limited to, neodymium (Nd), samarium (Sm), iron (Fe), chromium (Cr), cobalt (Co), nickel (Ni), manganese (Mn), and two or more thereof.

The sensor unit 3 detects a displacement of the magnet 2 in the Θ direction by detecting a variation in a density of a magnetic flux produced by the magnet 2 rotating in the Θ-r plane. The sensor unit 3 may correspond to a "magnetic detector" in one specific but non-limiting embodiment of the technology. Since the sensor unit 3 is disposed so as to be stationary relative to an external system, the magnet 2 is movable in the rotational direction Θ relative to the sensor unit 3. The sensor unit 3 may be preferably disposed at a location overlapped with, i.e., over or under, the magnet 2 in the rotation axis direction z.

As illustrated in FIG. 3A, the sensor unit 3 may include a substrate 30, two magnetic detection devices 4 and 5, and an arithmetic circuit 6; a substrate 30 may be laid out in a rotation plane, or the Θ-r plane, of the magnet 2 and the magnetic detection devices 4 and 5 and the arithmetic circuit 6 may be mounted over the substrate 30.

As illustrated in FIG. 3C, the magnetic detection device 4 may include a bridge circuit 40 and a difference detector 42; in the bridge circuit 40, four magneto-resistive effect devices 41, more specifically magneto-resistive effect (MR) devices 41A to 41D may be bridge-coupled to one another. Likewise, the magnetic detection device 5 may include a bridge circuit 50 and a difference detector 52; in the bridge circuit 50, four magneto-resistive effect devices 51, more specifically magneto-resistive effect (MR) devices 51A to 51D are bridge-coupled to one another. In the bridge circuit 40, a first end of the MR device 41A may be coupled to a first end of the MR device 41B at a node P1. A first end of the MR device 41C may be coupled to a first end of the MR device 41D at a node P2. A second end of the MR device 41A may be coupled to a second end of the MR device 41D at a node P3. A second end of the MR device 41B may be coupled to a second end of the MR device 41C at a node P4. The node P3 may be coupled to a power source Vcc; the node P4 may be grounded. The nodes P1 and P2 may be coupled to respective input terminals of the difference detector 42. The difference detector 42 may detect a difference between electric potentials at the nodes P1 and P2 when voltage is applied between the nodes P3 and P4. In other words, the difference detector 42 may detect a difference between voltage drops in the MR devices 41A and 41D. The difference detector 42 may output the detected difference to the arithmetic circuit 6 as a differential signal S1. Likewise, in the bridge circuit 50, a first end of the MR device 51A may be coupled to a first end of the MR device 51B at a node P5. A first end of the MR device 51C may be coupled to a first end of the MR device 51D at a node P6. A second end of the MR device 51A may be coupled to a second end of the MR device 51D at a node P7. A second end of the MR device 51B may be coupled to a second end of the MR device 51C at a node P8. The node P7 may be coupled to a power source Vcc; the node P8 may be grounded. The nodes P5 and P6 may be coupled to respective input terminals of the difference detector 52. The difference detector 52 may detect a difference between electric potentials at the nodes P5 and P6 when voltage is applied between the nodes P7 and P8. In other words, the difference detector 52 may detect a difference between voltage drops in the MR devices 51A and 51D. The difference detector 52 may output the detected difference to the arithmetic circuit 6 as a differential signal S2. In FIG. 3B, an arrow denoted by a character "J31" schematically indicates an orientation of magnetization of the magnetization pinned layer 31 in each of the MR devices 41A to 41D and 51A to 51D. Details of the magnetization pinned layer 31 will be described later. Specifically, the resistances of both the MR devices 41A and 41C may change in a first orientation (i.e., increase or decrease) in response to a change in an external signal magnetic field, whereas the resistances of both the MR devices 41B and 41D may change in a second orientation (i.e., decrease or increase) in response to a change in the external signal magnetic field. Further, the first orientation is opposite to the second orientation. The resistances of the MR devices 51A and 51C may change in response to a change in the external signal magnetic field, with their phase shifted by 90° from that of the resistances of the MR devices 41A to 41D. Resistances of the MR devices 51B and 51D and resistances of the MR devices 51A and 51C may change to the opposite sides in response to a change in the signal magnetic field. For example, when the magnet 2 rotates, resistances of the MR devices 41A and 41C increase but resistances of the MR devices 41B and 41D decrease within a certain angle range. In this case, the resistances of the MR devices 51A and 51C may change with their phase delayed or leading by 90° with respect to that of the resistances of the MR devices 41A and 41C, whereas the resistances of the MR devices 51B and 51D may change with their phase delayed or leading 90° with respect to that of the resistances of the MR devices 41B and 41D.

As illustrated in FIG. 3B, for example, each MR device 41 may have a spin-valve structure in which a plurality of functional films, including a magnetic layer, are stacked on top of one another. More specifically, each MR device 41 may include a magnetization free layer 33, an intermediate layer 32, and the magnetization pinned layer 31 that are stacked in a Z-axis direction in this order. The magnetization pinned layer 31 may have the magnetization J31 fixed in a predetermined constant direction; the intermediate layer 32 may exhibit no magnetization in specific directions; and the magnetization free layer 33 may have magnetization J33 changing with a density of a magnetic flux in a signal magnetic field Hm. Each of the magnetization pinned layer 31, the intermediate layer 32, and the magnetization free layer 33 may be a thin film provided in the Θ-r plane. Therefore, the orientation of the magnetization J33 of the magnetization free layer 33 may be rotatable in the Θ-r plane. FIG. 3B illustrates a state in which a load is applied to the signal magnetic field Hm in the orientation of the magnetization J33. As one example, the magnetization J31 of the magnetization pinned layer 31 in each of the MR devices 41A and 41C may be pinned in the +Θ direction, whereas the magnetization J31 of the magnetization pinned layer 31 in each of the MR devices 41B and 41D may be pinned in the −Θ direction. Each of the magnetization pinned layer 31, the intermediate layer 32, and the magnetization free layer 33 may have either a single-layer structure or a multi-layer structure including a plurality of layers.

The magnetization pinned layer 31 may be made of a ferromagnetic material, examples of which may include, but are not limited to, cobalt (Co), a cobalt-iron alloy (CoFe), and a cobalt-iron-boron alloy (CoFeB). An unillustrated antiferromagnetic layer may be provided on the surface of the magnetization pinned layer 31 which is farther from the intermediate layer 32 so that the antiferromagnetic layer adjoins the magnetization pinned layer 31. This antiferromagnetic layer may be made of an antiferromagnetic material, examples of which may include, but are not limited to, a platinum-manganese alloy (PtMn) and an iridium-manganese alloy (IrMn). As one example, the antiferromagnetic layer in the magnetic detection device 4 may be in a state where spin magnetic moments in the +Θ and −Θ directions completely cancel each other and may fix the orientation of the magnetization J31 of the adjoining magnetization pinned layer 31 in the +Θ direction.

In one embodiment where the spin-valve structure functions as a magnetic tunnel junction (MTJ) film, the intermediate layer 32 may be a non-magnetic tunnel barrier layer made of magnesium oxide (MgO), for example, and may be thin enough to allow a tunnel current based on quantum mechanics to flow therethrough. The tunnel barrier layer made of MgO may be obtained through a process such as a sputtering process using a target made of MgO, a process of oxidizing a thin film made of magnesium (Mg), and a reactive sputtering process by which magnesium (Mg) is subjected to sputtering under an oxygen atmosphere, for example. Instead of MgO, the intermediate layer 32 may be made of an oxide or nitride of aluminum (Al), tantalum (Ta), or hafnium (Hf), for example. Alternatively, the intermediate layer 32 may be made of an element of the platinum group such as ruthenium (Ru) or a non-magnetic metal such as gold (Au) and copper (Cu). In this case, the spin-valve structure may function as a giant magneto resistive effect (GMR) film.

The magnetization free layer 33 may be a soft ferromagnetic layer, and made of a cobalt-iron alloy (CoFe), a nickel-iron alloy (NiFe), or a cobalt-iron-boron alloy (CoFeB), for example.

When a current I10 is supplied from the voltage terminal Vcc to the bridge circuit 40, the current I10 may be divided into a current I1 and a current I2 at the node P3. Then, the current I1 flows through the MR devices 41A and 41B in the bridge circuit 40, and the current I2 flows through the MR devices 41D and 41C in the bridge circuit 40. Thereafter, the bridge circuit 40 outputs a signal e1 from the node P1 and a signal e2 from the node P2, and then the signals e1 and e2 are supplied to the difference detector 42. In this case, if the angle between the magnetization J31 and the magnetization J33 is denoted by γ, for example, the signal e1 may represent an output change that changes in conformity with A cos(+γ)+B and the signal e2 may represent an output change that changes in conformity with A cos(γ−180°)+B, where A and B are constants. Likewise, when the current I10 is supplied from the voltage terminal Vcc to the bridge circuit 50, the current I10 may be divided into a current I3 and a current I4 at the node P7. Then, the current I3 flows through the MR devices 51A and 51B in the bridge circuit 50, and the current I4 flows through the MR devices 51D and 51C in the bridge circuit 40. Thereafter, the bridge circuit 50 outputs a signal e3 from the node P5 and a signal e4 from the node P6, and then the signals e3 and e4 are supplied to the difference detector 52. In this case, the signal e3 may represent an output change that changes in conformity with A sin(+γ)+B and the signal e4 may represent an output change that changes in conformity with A sin(γ−180°)+B. Following this, the difference detector 42 may output the differential signal S1, and the difference detector 52 may output differential signal S2. Then, the differential signals S1 and S2 may flow into the arithmetic circuit 6. The arithmetic circuit 6 may calculate an angle conforming to tan γ. Since γ corresponds to a rotation angle θs of the magnet 2 relative to the sensor unit 3, the arithmetic circuit 6 may be able to determine a rotation angle θs.

[Operation and Workings of Displacement Detection Unit 11]

The displacement detection unit 11 according to this embodiment may be able to cause the sensor unit 3 to detect a rotation angle θs of the magnet 2 in the Θ direction.

Figure 4A:
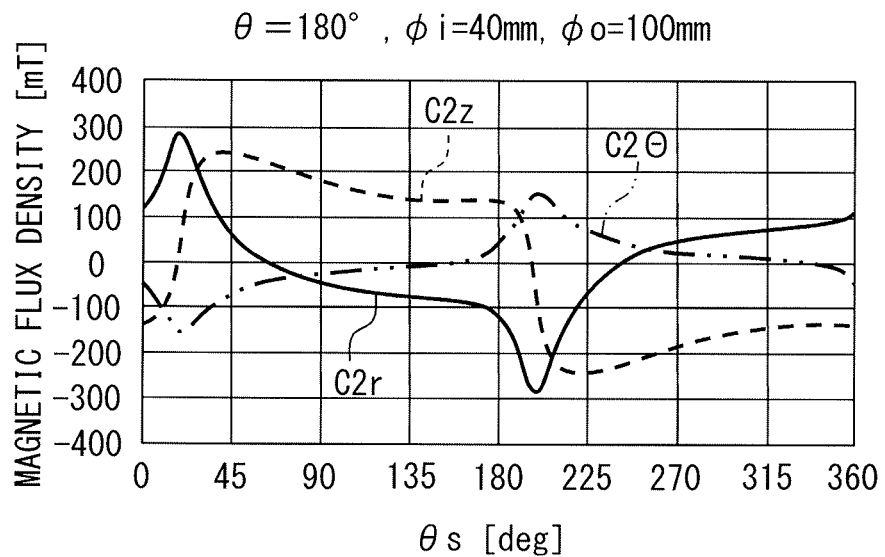
FIG. 4A is a characteristic graph of the displacement detection unit, illustrated in FIG. 1A, according to experimental example 1-1 which indicates the relationships between a rotation angle of the magnet relative to the magnetic detector and individual magnetic flux densities.

When the magnet 2 in the displacement detection unit 11 rotates one revolution, a magnetic field may reach the sensor unit 3, and the MR devices 41 may detect variations in magnetic field components in the r and Θ directions. The bridge circuit 40 may output the signals e1 and e2, which then flow into the arithmetic circuit 6. More specifically, the magnet 2 may cause a magnetic flux density Br (e.g., α sin θs) to be varied, for example, as expressed by a curve C2r in FIG. 4A, and may cause a magnetic flux density BΘ (e.g., β cos θs) to be varied, for example, as expressed by a curve C2Θ in FIG. 4A. Variations in the magnetic flux densities Br and BΘ may be detected by the magnetic detection device 4, and as a result, the signals e1 and e2 may be supplied to the arithmetic circuit 6. Thereafter, the arithmetic circuit 6 may be able to determine a rotation angle θs of the magnet 2 on the basis of the expression Arctan(α sin θs/β cos θs). FIG. 4A is a characteristic graph of the displacement detection unit 11 which indicates the relationships between the rotation angle θs of the magnet 2 relative to the sensor unit 3 and the individual magnetic flux densities Br, BΘ, and Bz. Specifically, FIG. 4A illustrates simulation data on experimental example 1-1, and this simulation data was obtained under the conditions described below. A thickness of the magnet 2, or a dimension of the magnet 2 in the z direction, was set to 10 mm. The outer diameter φ0 of the magnet 2 was set to 100 mm. The inner diameter φi of the magnet 2 was set to 40 mm. A distance Rs between the magnetic detection device 4 and the rotation axis 1J was set to 23 mm. A distance Zs between the surface of the magnet 2 in the z direction and the magnetic detection device 4 was set to 1 mm. An angle θ was set to 180°. The boundaries 21 and 22 conformed to expression (1).

Figure 4B:
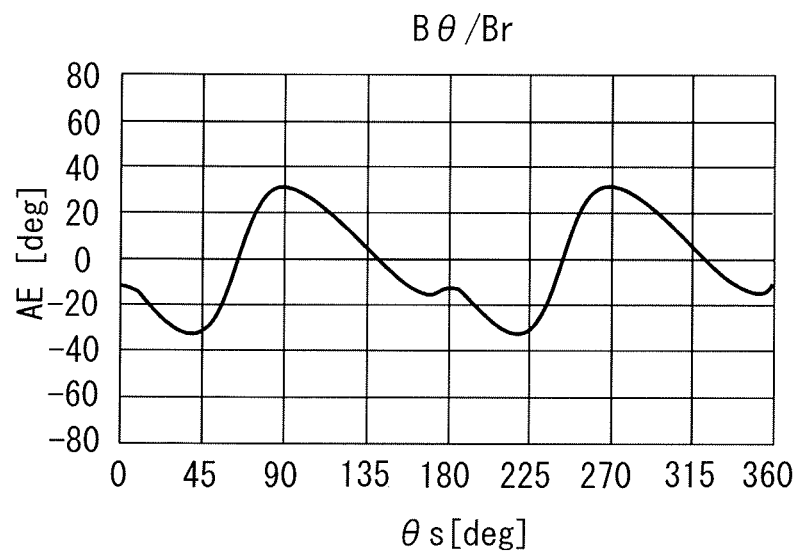
FIG. 4B is a characteristic graph of the displacement detection unit, illustrated in FIG. 1A, according to experimental example 1-1 which indicates an error in a rotation angle determined from the magnetic flux densities detected by the magnetic detector with respect to an actual rotation angle of the magnet.
Figure 5:
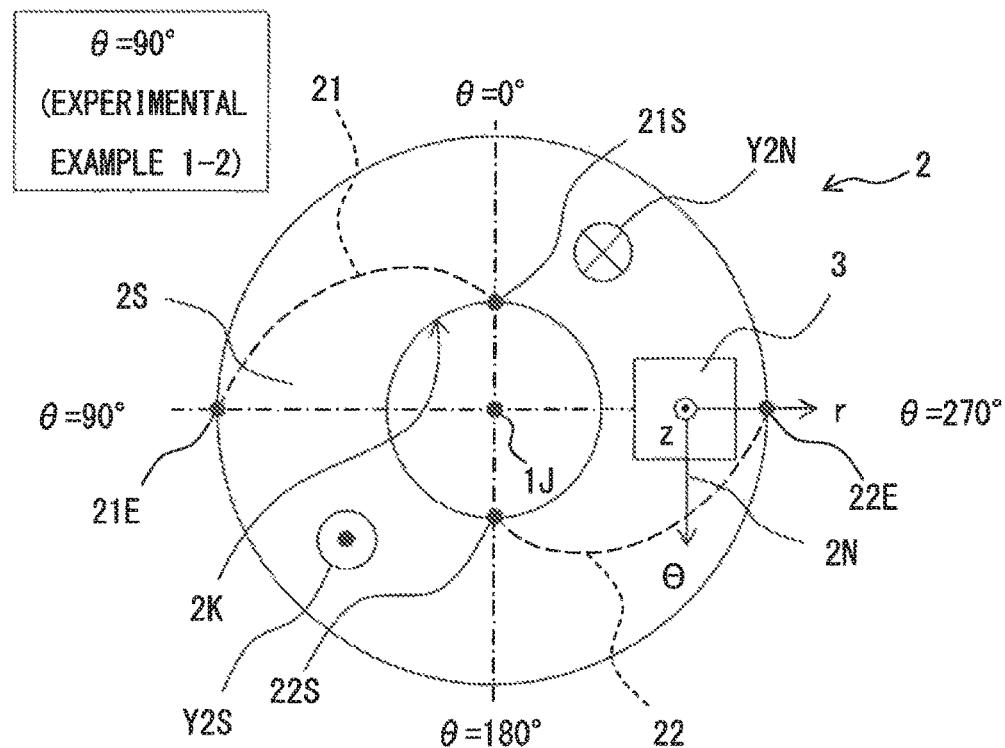
FIG. 5 is a top plan view of a magnet according to experimental example 1-2.
Figure 6:
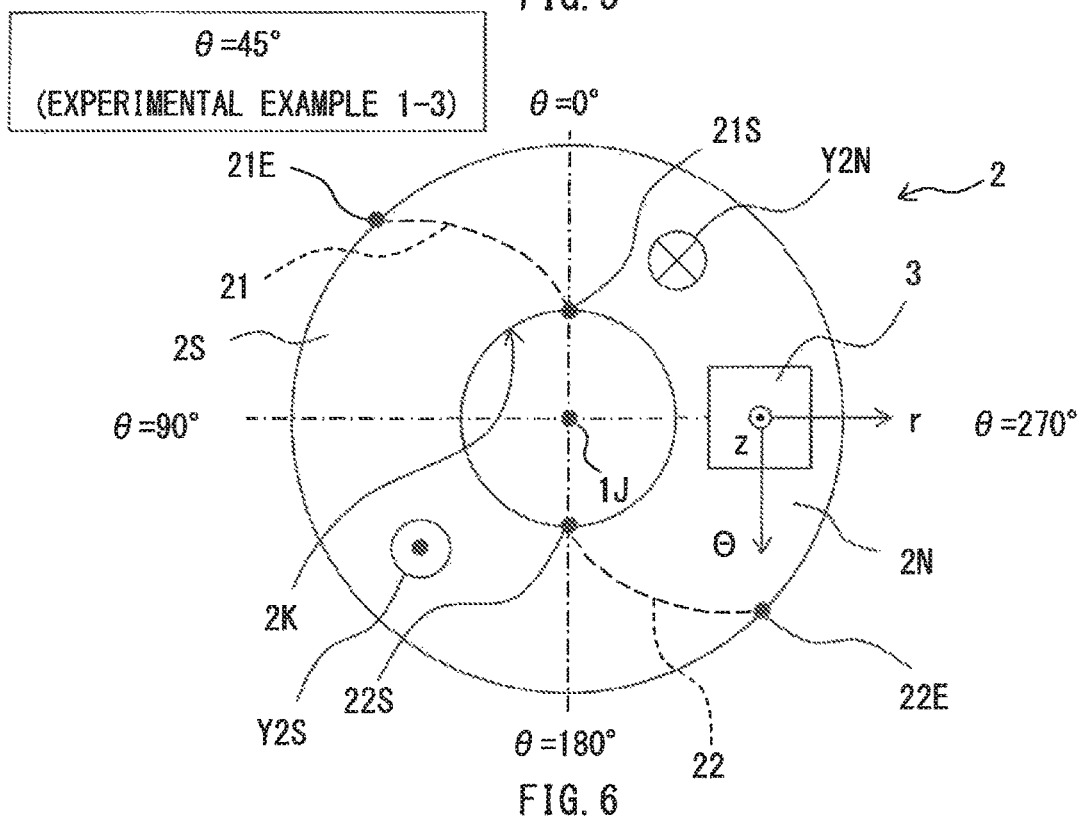
FIG. 6 is a top plan view of a magnet according to experimental example 1-3.
Figure 7:
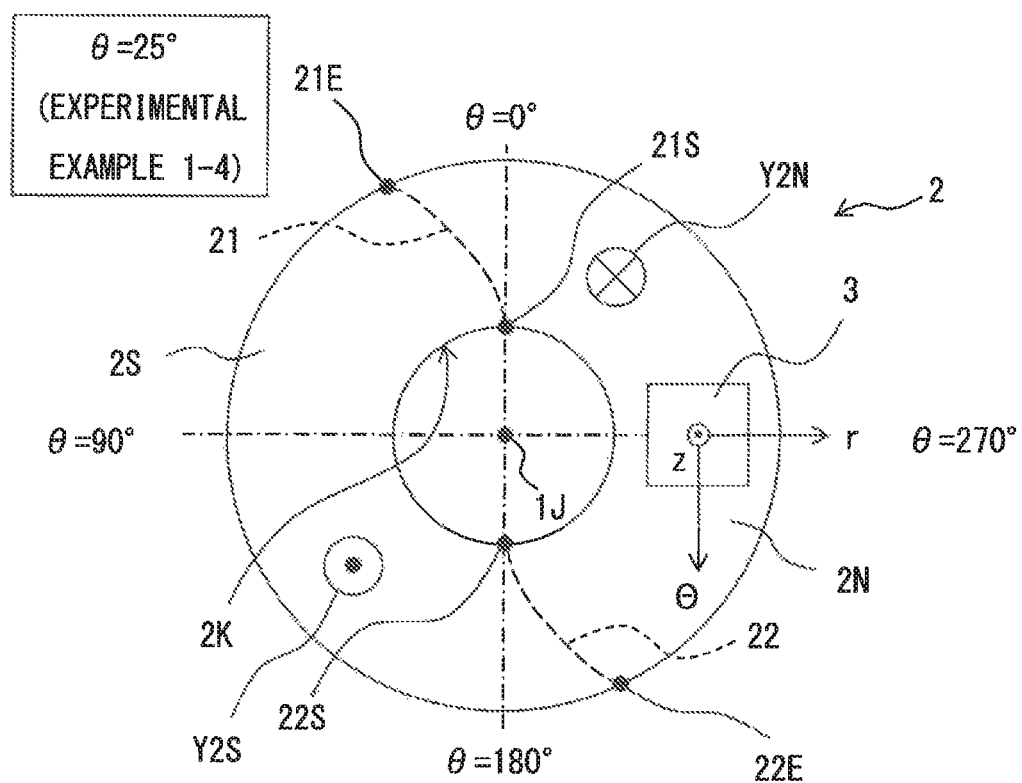
FIG. 7 is a top plan view of a magnet according to experimental example 1-4.

FIG. 4B is a characteristic graph of experimental example 1-1 which indicates an error AE in a rotation angle θss of the magnet 2 with respect to an actual rotation angle θs; the rotation angle θss is determined from the magnetic flux densities Br and BΘ detected by the magnetic detection device 4. FIG. 4B reveals that the error AE periodically changes with the actual rotation angle θs. As indicated in FIG. 4A, the curves that indicate the variations in the magnetic flux densities Br, BΘ, and Bz with the rotation angle θs each have a first angle range in which the magnetic flux densities Br, BΘ, and Bz vary gently and a second angle range in which the magnetic flux densities Br, BΘ, and Bz vary sharply. The presence of these first and second angle ranges is believed to cause the error AE in the rotation angle θss, which is calculated on the basis of the variations in the magnetic flux densities Br and BΘ with respect to the rotation angle θs.

Figure 35:
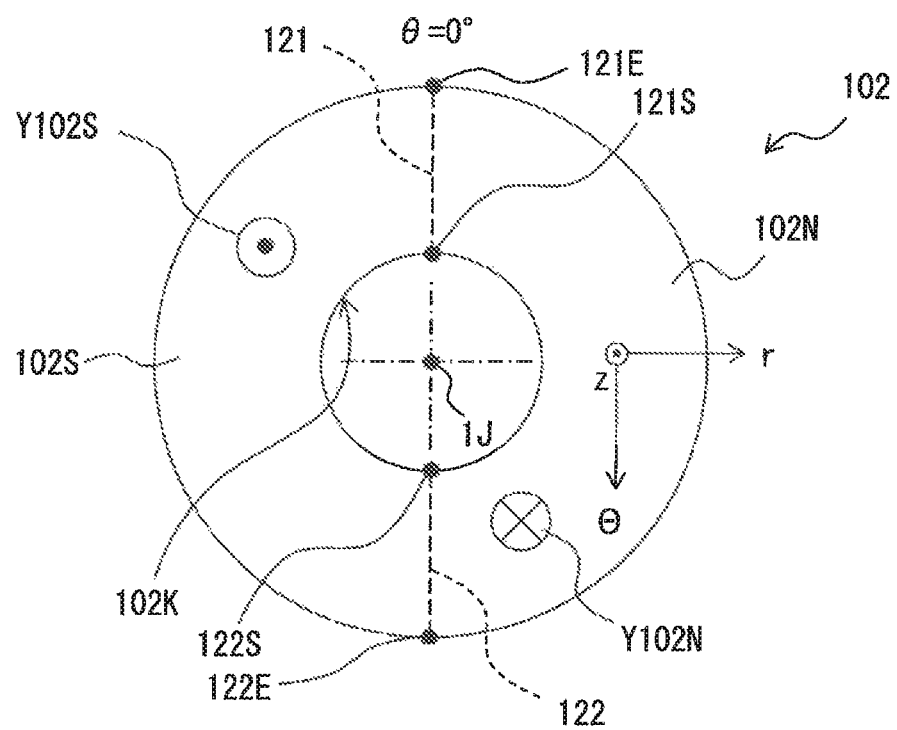
FIG. 35 is a schematic view of a configuration of a magnet according to comparative example 1.
Figure 36A:
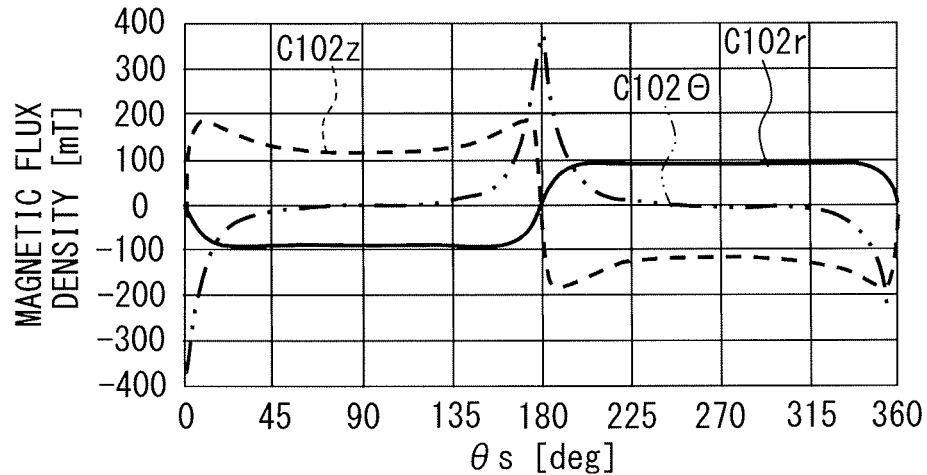
FIG. 36A is a characteristic graph of a displacement detection unit according to comparative example 1 which indicates a relationship between a rotation angle of a magnet relative to a magnetic detector and individual magnetic flux densities when the displacement detection unit is provided with the magnet illustrated in FIG. 35.
Figure 36B:
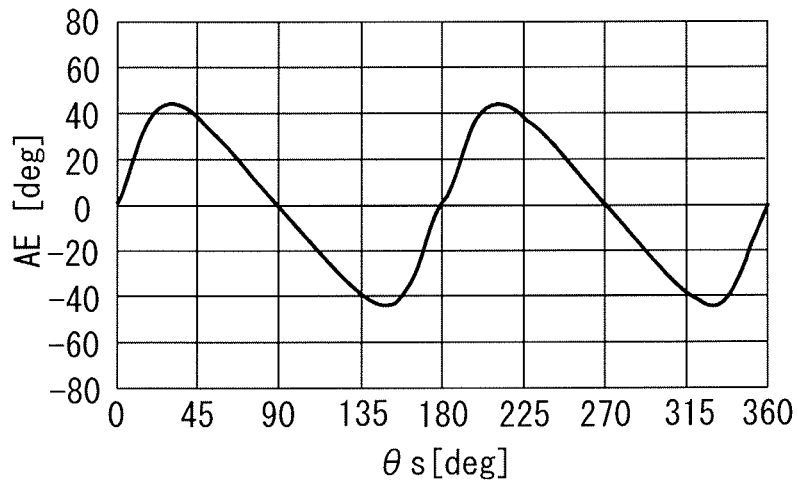
FIG. 36B is a characteristic graph of the displacement detection unit according to comparative example 1 which indicates an error in a displacement determined from the magnetic flux densities detected by the magnetic detector with respect to an actual displacement of the magnet when the displacement detection unit is provided with the magnet illustrated in FIG. 35.

Nevertheless, the displacement detection unit 11 according to this embodiment greatly reduces the error AE caused by the sensor unit 3 in comparison with comparative example 1 for which a typical type of magnet 102 (see FIG. 35) is used, as indicated in FIGS. 36A and 36B. A possible reason for this is as follows. As indicated in FIG. 36A, when the magnet 102 is used, the ranges of the rotation angle θs in which the magnetic flux density Br, BΘ, or Bz hardly varies emerge. In contrast, when the magnet 2 in this embodiment is used, the ranges of the rotation angle θs in which the magnetic flux density Br, BΘ, or Bz hardly vary emerge less remarkably, and thus the magnetic flux densities Br, BΘ, and Bz vary relatively greatly with the rotation angle θs. FIG. 35 illustrates an example of the magnet 102 that does not conform to expression (1) and in which an S-pole region 102S and an N-pole region 102N are disposed such that both boundaries 121 and 122 extend in the r direction; this example is expressed as "angle θ=0". FIG. 36A is a characteristic graph that indicates the relationships between the rotation angle θs of the magnet 102 relative to the sensor unit 3 and the individual magnetic flux densities Br, BΘ, and Bz. FIG. 36B is a characteristic graph that indicates an error AE in a rotation angle θss determined from the magnetic flux densities Br and BΘ detected by the magnetic detection device 4 with respect to an accrual rotation angle θs of the magnet 102.

[Effect of Displacement Detection Unit 11]

In the displacement detection unit 11 according to this embodiment, the magnet 2 includes the transition section in which both the magnetic volume Vs of the S-pole region 2S and the magnetic volume Vn of the N-pole region 2N in the r direction gradually vary in the Θ direction. This enables the displacement detection unit 11 to provide an output from the sensor unit 3 in accordance with a variation in relative location between the sensor unit 3 and the magnet 2 with higher precision than a displacement detection unit that has a magnet without the above transition section. Consequently, it is possible to detect a movement, displacement, or rotation angle θs of the magnet 2 relative to the sensor unit 3 with high precision. Moreover, the displacement detection unit 11 calculates the rotation angle θs on the basis of variations in magnetic flux densities in a rotation plane, or the Θ-r plane, of the magnet 2 which is detected by the sensor unit 3. This is advantageous in downsizing of the displacement detection unit 11 as a whole.

Experimental Examples 1-2 to 1-4

Figure 8A:
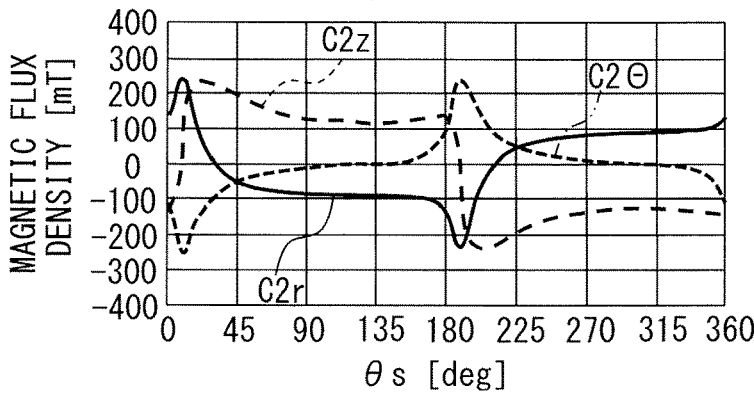
FIG. 8A is a characteristic graph of a displacement detection unit with the magnet, illustrated in FIG. 5, according to experimental example 1-2 which indicates the relationships between the rotation angle of the magnet relative to the magnetic detector and the individual magnetic flux densities.
Figure 8B:
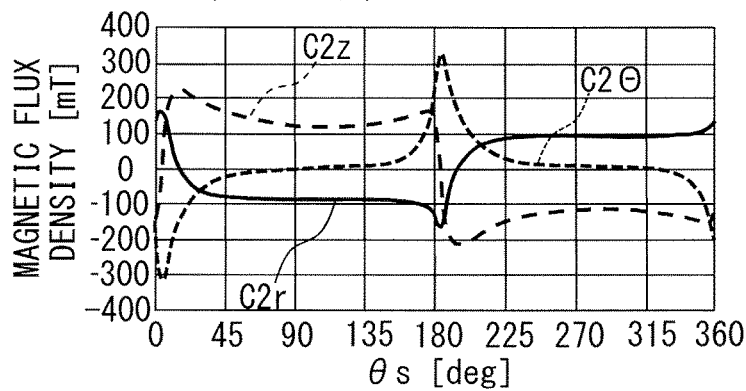
FIG. 8B is a characteristic graph of a displacement detection unit with the magnet, illustrated in FIG. 6, according to experimental example 1-3 which indicates the relationships between the rotation angle of the magnet relative to the magnetic detector and the individual magnetic flux densities.
Figure 8C:
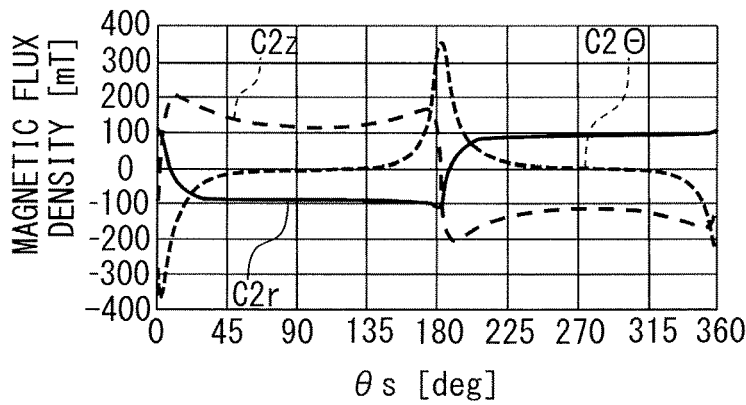
FIG. 8C is a characteristic graph of a displacement detection unit with the magnet, illustrated in FIG. 7, according to experimental example 1-4 which indicates the relationships between the rotation angle of the magnet relative to the magnetic detector and the individual magnetic flux densities.
Figure 9A:
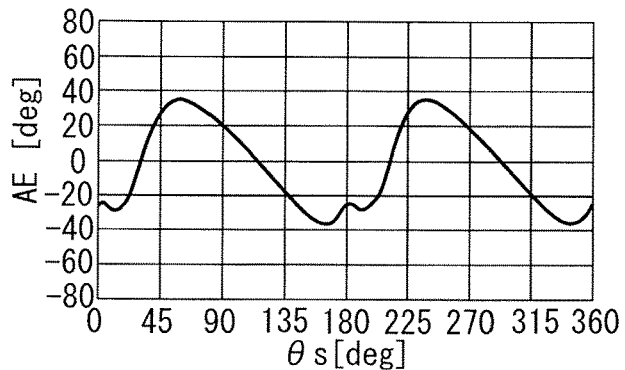
FIG. 9A is a characteristic graph of the displacement detection unit with the magnet illustrated in FIG. 5 according to experimental example 1-2 which indicates an error in a rotation angle.
Figure 9B:
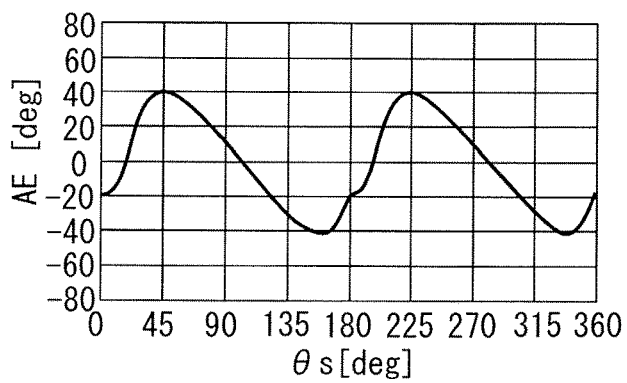
FIG. 9B is a characteristic graph of the displacement detection unit with the magnet illustrated in FIG. 6 in experimental example 1-3 which indicates an error in a rotation angle.
Figure 9C:
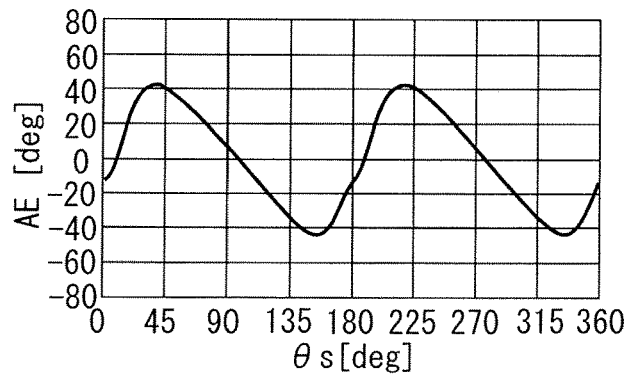
FIG. 9C is a characteristic graph of the displacement detection unit with the magnet illustrated in FIG. 7 in experimental example 1-4 which indicates an error in a rotation angle.

As indicated in FIGS. 5 to 7 and 8A to 8C, experimental examples 1-2 to 1-4 reveal that the relationships between the rotation angle θs of the magnet 2 relative to the sensor unit 3 and the individual magnetic flux densities Br, BΘ, and Bz change with the angle θ. In addition, as indicated in FIGS. 9A to 9C, the error AE also changes with the angle θ. More specifically, as the angle θ in expression (1) increases, the error AE decreases. The magnets 2 in FIGS. 5 to 7 had substantially the same configuration as that in FIGS. 1A to 1C, except for the angle θ. More specifically, the angle θ of experimental examples 1-2 in FIG. 5 was set to 90°; the angle θ of experimental examples 1-3 in FIG. 6 was set to 45°; and the angle θ of experimental examples 1-3 in FIG. 7 was set to 25°. FIG. 8A is a characteristic graph of the displacement detection unit with the magnet 2 illustrated in FIG. 5 which indicates the relationships between the rotation angle θs and the individual magnetic flux densities Br, BΘ, and Bz. FIG. 8B is a characteristic graph of the displacement detection unit with the magnet 2 illustrated in FIG. 6 which indicates the relationships between the rotation angle θs and the individual magnetic flux densities Br, BΘ, and Bz. FIG. 8C is a characteristic graph of the displacement detection unit with the magnet 2 illustrated in FIG. 7 which indicates the relationships between the rotation angle θs and the individual magnetic flux densities Br, BΘ, and Bz. FIG. 9A is a characteristic graph indicating the error AE caused in the displacement detection unit with the magnet 2 illustrated in FIG. 5. FIG. 9B is a characteristic graph indicating the error AE caused in the displacement detection unit with the magnet 2 illustrated in FIG. 6. FIG. 9C is a characteristic graph indicating the error AE caused in the displacement detection unit with the magnet 2 illustrated in FIG. 7.

Experimental Examples 2-1 to 2-4

Figure 10A:
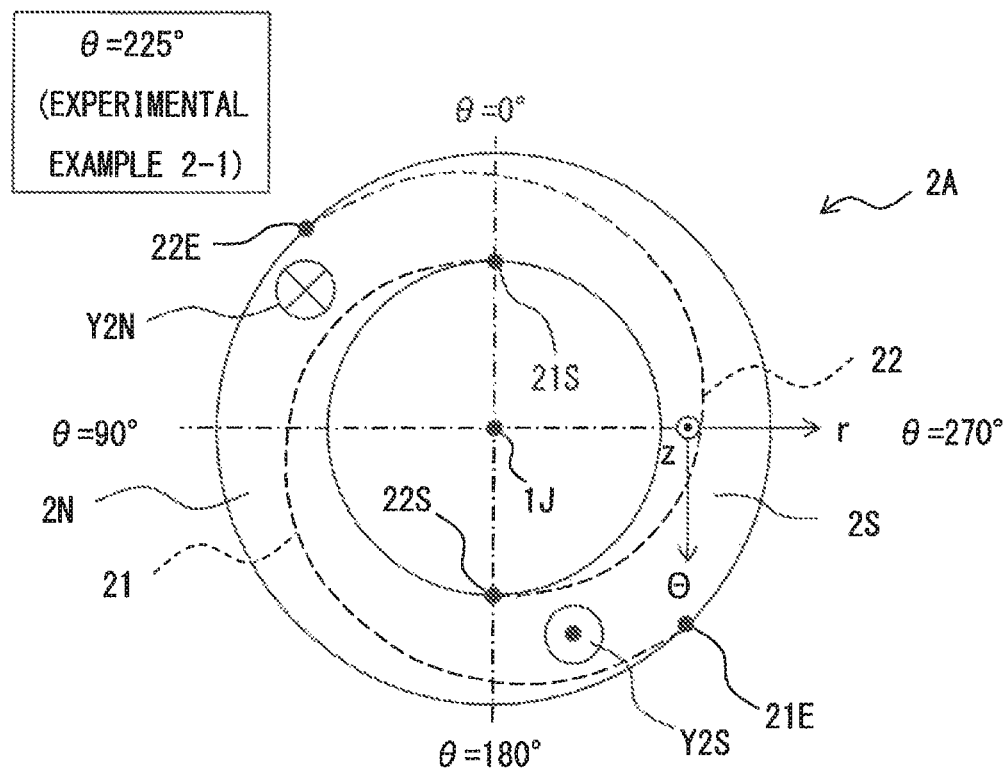
FIG. 10A is a top plan view of a magnet according to experimental example 2-1.
Figure 10B:
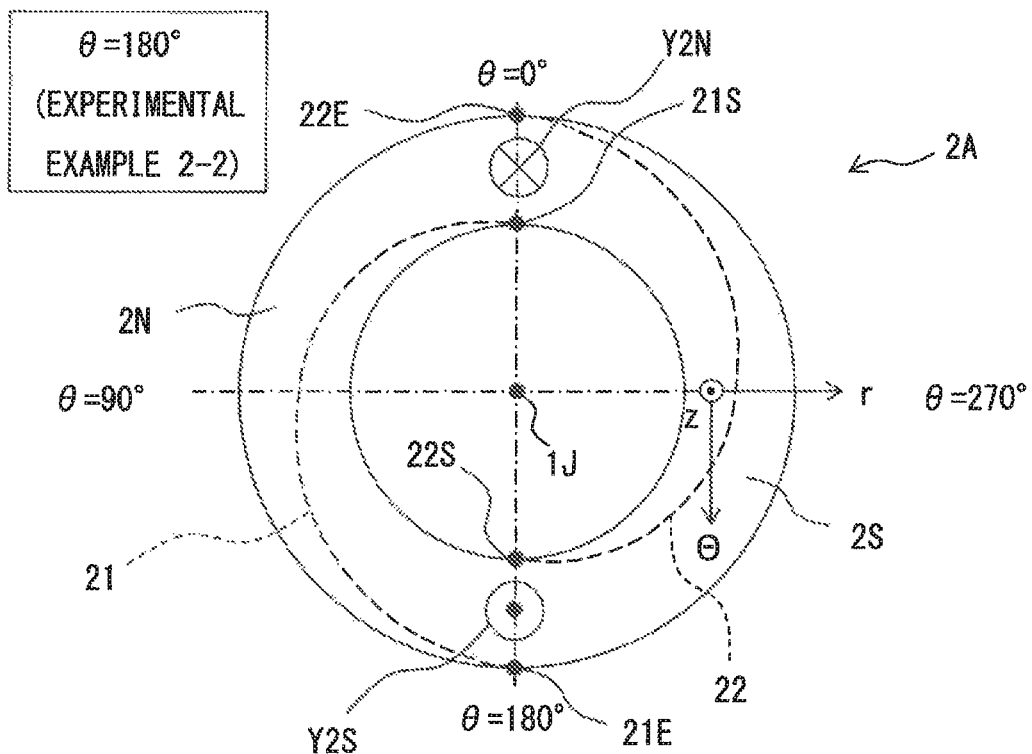
FIG. 10B is a top plan view of a magnet according to experimental example 2-2.
Figure 10C:
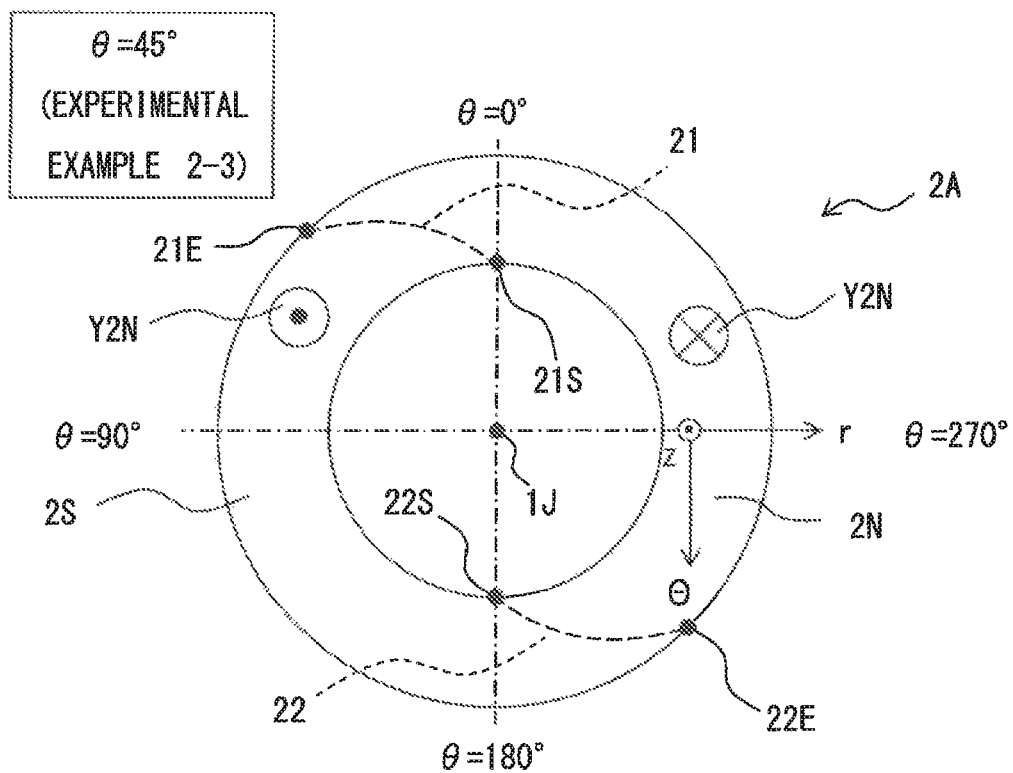
FIG. 10C is a top plan view of a magnet according to experimental example 2-3.
Figure 10D:
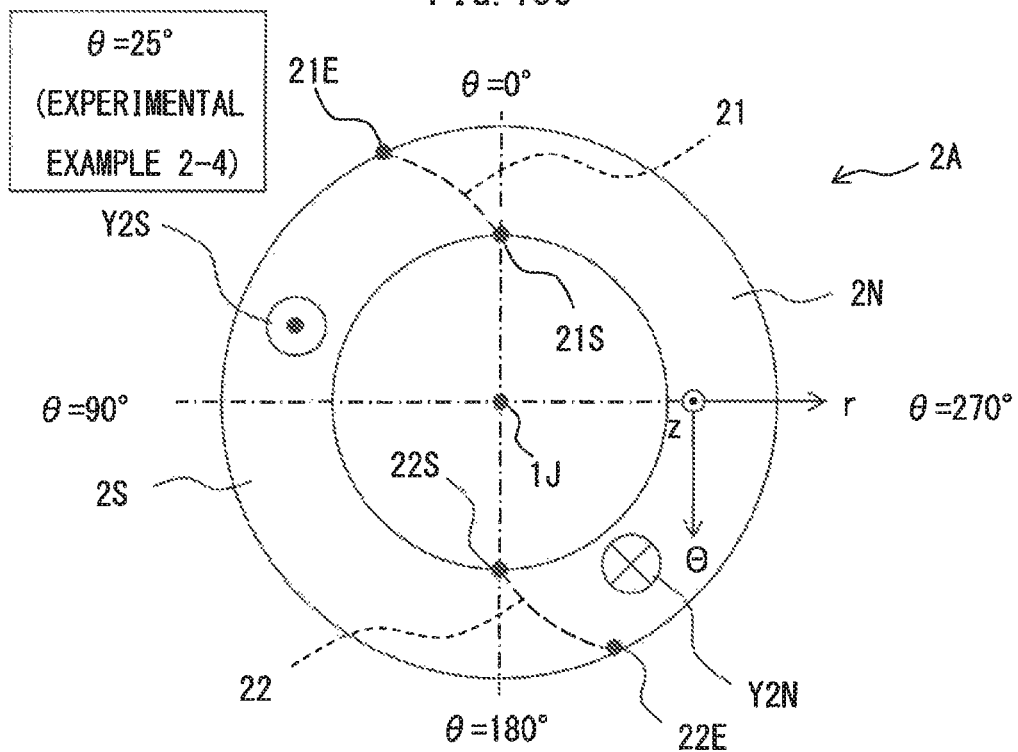
FIG. 10D is a top plan view of a magnet according to experimental example 2-4.
Figure 11A:
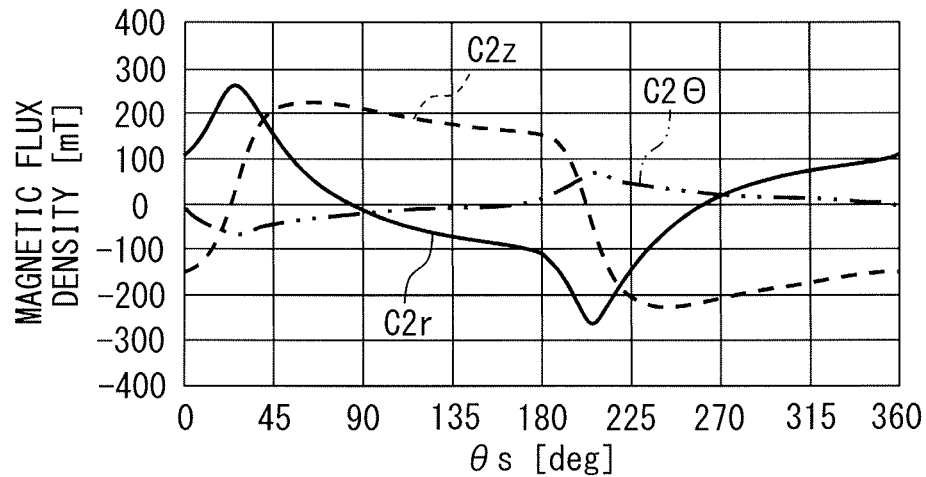
FIG. 11A is a characteristic graph of a displacement detection unit with the magnet illustrated in FIG. 10A according to experimental example 2-1 which indicates the relationships between the rotation angle of the magnet relative to the magnetic detector and the individual magnetic flux densities.
Figure 11B:
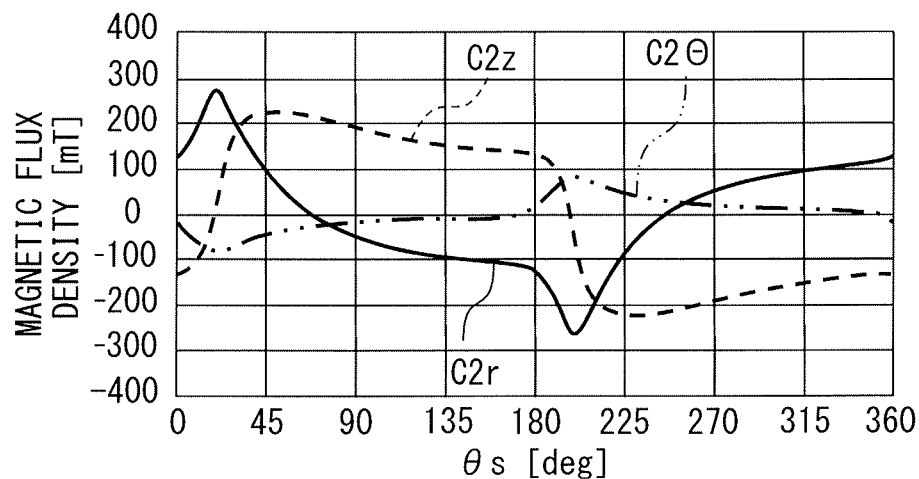
FIG. 11B is a characteristic graph of a displacement detection unit with the magnet illustrated in FIG. 10B according to experimental example 2-2 which indicates the relationships between the rotation angle of the magnet relative to the magnetic detector and the individual magnetic flux densities.
Figure 11C:
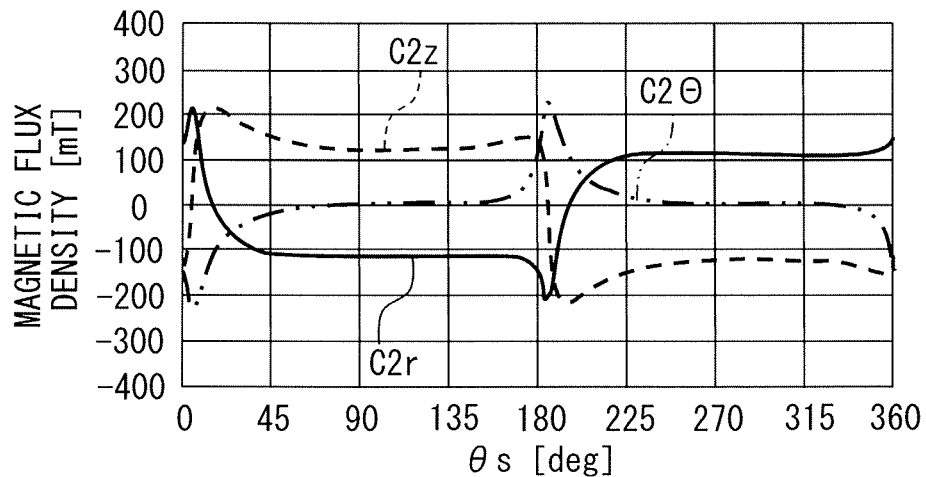
FIG. 11C is a characteristic graph of a displacement detection unit with the magnet illustrated in FIG. 10C according to experimental example 2-3 which indicates the relationships between the rotation angle of the magnet relative to the magnetic detector and the individual magnetic flux densities.
Figure 11D:
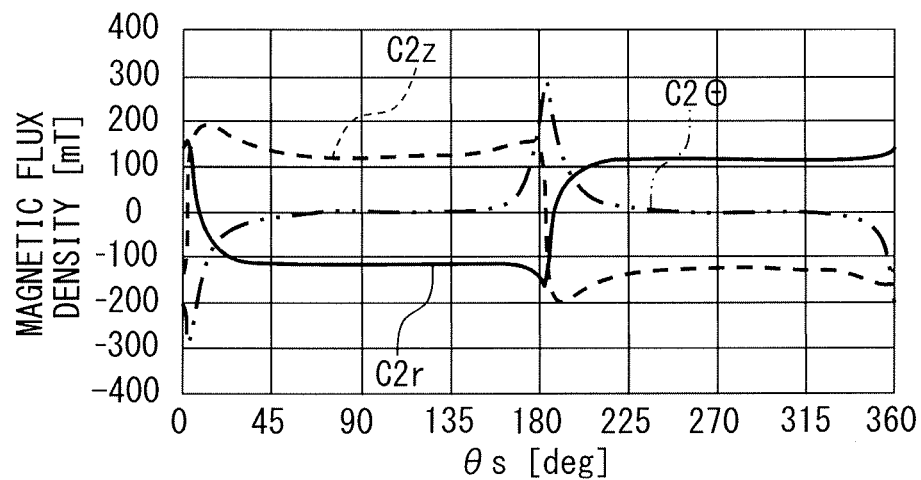
FIG. 11D is a characteristic graph of a displacement detection unit with the magnet illustrated in FIG. 10D according to experimental example 2-4 which indicates the relationships between the rotation angle of the magnet relative to the magnetic detector and the individual magnetic flux densities.
Figure 12A:
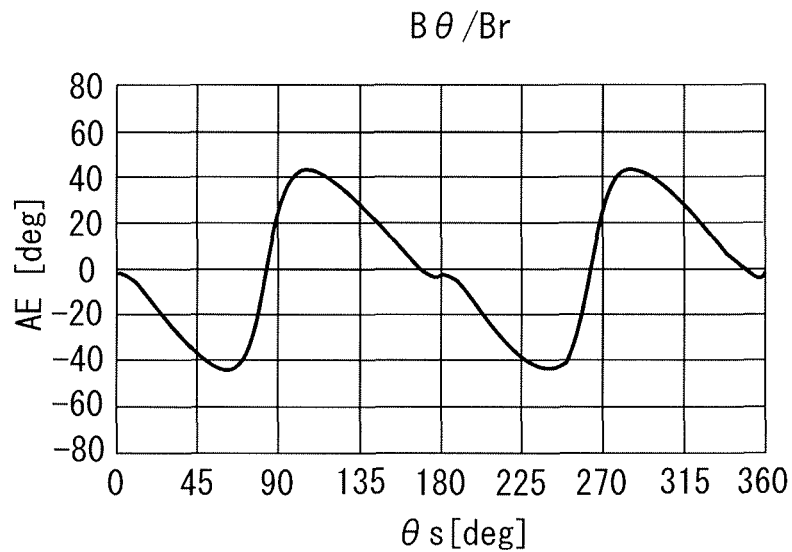
FIG. 12A is a characteristic graph of the displacement detection unit with the magnet illustrated in FIG. 10A according to experimental example 2-1 which indicates an error in a rotation angle.
Figure 12B:
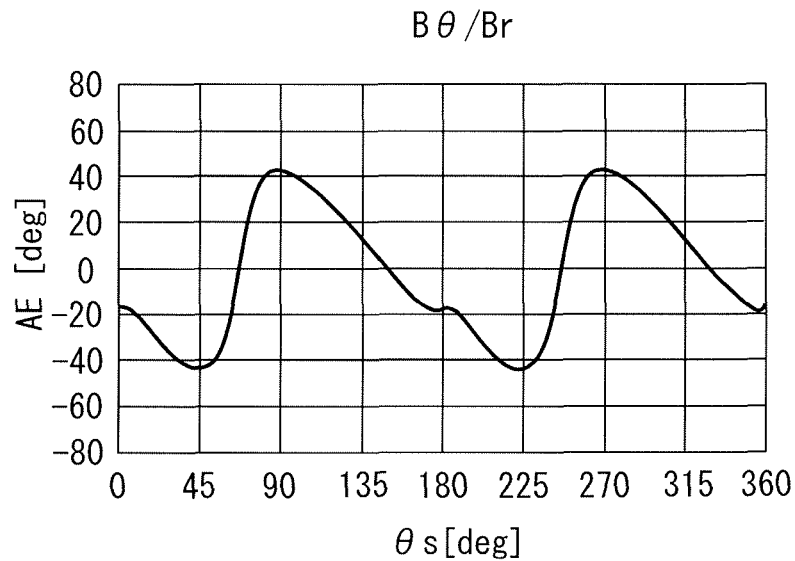
FIG. 12B is a characteristic graph of the displacement detection unit with the magnet illustrated in FIG. 10B according to experimental example 2-2 which indicates an error in a rotation angle.
Figure 12C:
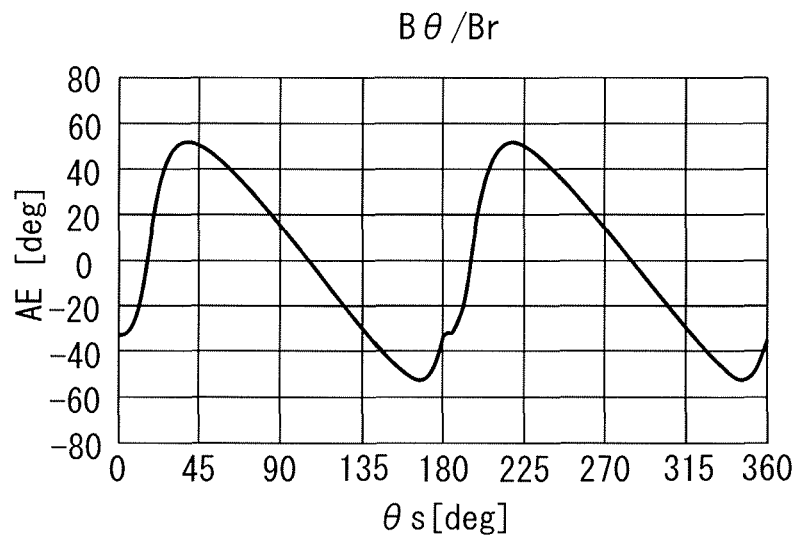
FIG. 12C is a characteristic graph of the displacement detection unit with the magnet illustrated in FIG. 10C according to experimental example 2-3 which indicates an error in a rotation angle.
Figure 12D:
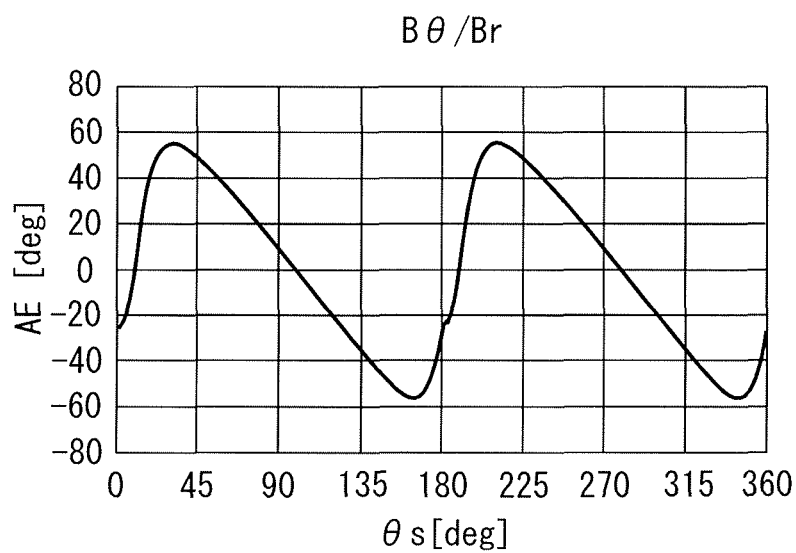
FIG. 12D is a characteristic graph of the displacement detection unit with the magnet illustrated in FIG. 10D according to experimental example 2-4 which indicates an error in a rotation angle.
Figure 37:
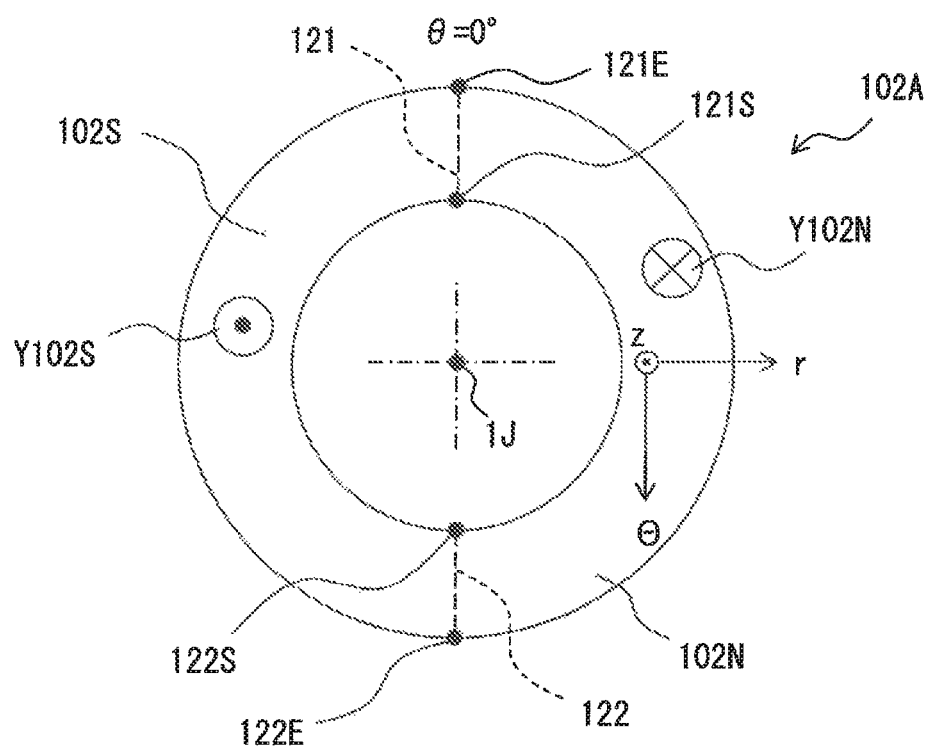
FIG. 37 is a schematic view of a configuration of a magnet according to comparative example 2.
Figure 38A:
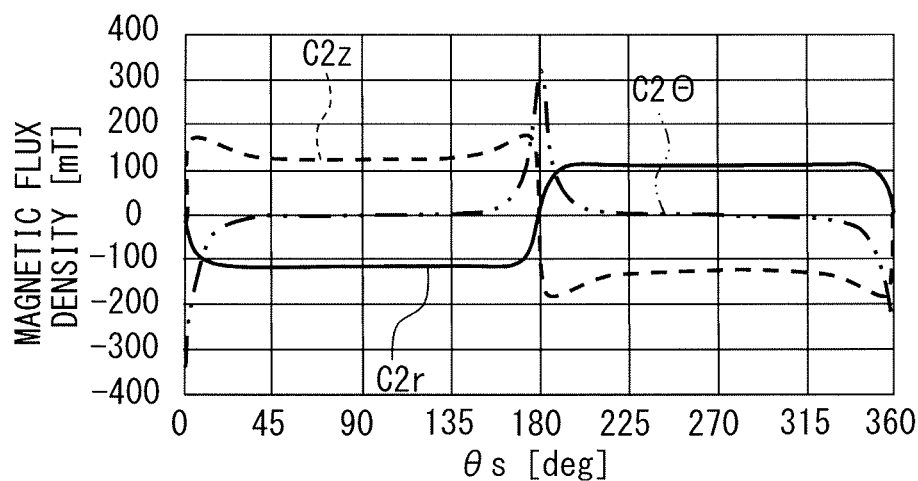
FIG. 38A is a characteristic graph of the displacement detection unit according to comparative example 2 which indicates the relationships between a rotation angle of the magnet relative to the magnetic detector and individual magnetic flux densities when the displacement detection unit is provided with the magnet illustrated in FIG. 37.
Figure 38B:
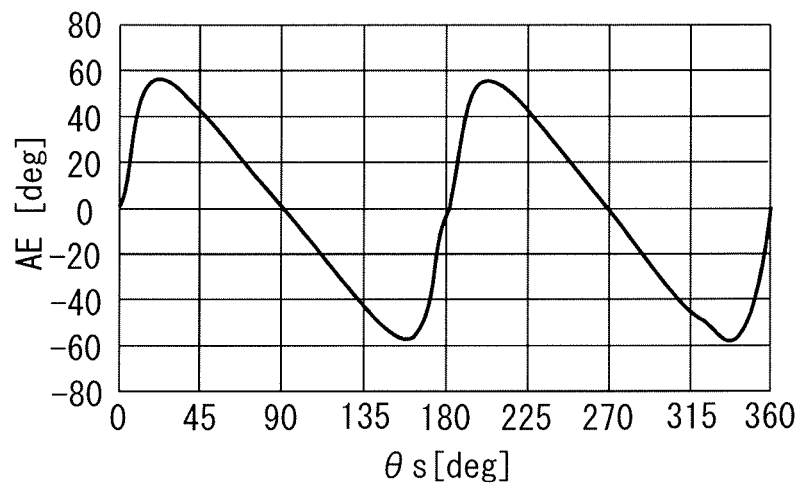
FIG. 38B is a characteristic graph of the displacement detection unit according to comparative example 2 which indicates an error in a rotation angle determined from the magnetic flux densities detected by the magnetic detector with respect to an actual rotation angle of the magnet when the displacement detection unit is provided with the magnet illustrated in FIG. 37.

FIG. 10A illustrates a configuration of a magnet 2A according to experimental example 2-1; FIG. 10B illustrates a configuration of a magnet 2A according to experimental example 2-2; FIG. 10C illustrates a configuration of a magnet 2A according to experimental example 2-3; and FIG. 10D illustrates a configuration of a magnet 2A according to experimental example 2-4. The magnets 2A in FIGS. 10A to 10D had substantially the same configuration as the magnet 2 illustrated in FIG. 1B, except that their inner diameter φi was set to 60 mm and their distance Rs between the magnetic detection device 4 and the rotation axis 1J was set to 32 mm. However, the angle θ of experimental example 2-1 was set to 225° as illustrated in FIG. 10A; the angle θ of experimental example 2-2 was set to 180° as illustrated in FIG. 10B; the angle θ of experimental example 2-3 was set to 45° as illustrated in FIG. 10C; the angle θ of experimental example 2-4 was set to 25° as illustrated in FIG. 10D. FIG. 37 illustrates a configuration of a magnet 102A according to comparative example 2. The magnet 102A had substantially the same configuration as the magnet 102 illustrated in FIG. 35, except that its inner diameter φi was set to 60 mm. FIG. 11A is a characteristic graph of experimental example 2-1 which indicates the relationships between the rotation angle θs of the magnet 2A relative to the sensor unit 3 and the individual magnetic flux densities Br, BΘ, and Bz. FIG. 11B is a characteristic graph of experimental example 2-2 which indicates the relationships between the rotation angle θs of the magnet 2A relative to the sensor unit 3 and the individual magnetic flux densities Br, BΘ, and Bz. FIG. 11C is a characteristic graph of experimental example 2-3 which indicates the relationships between the rotation angle θs of the magnet 2A relative to the sensor unit 3 and the individual magnetic flux densities Br, BΘ, and Bz. FIG. 11D is a characteristic graph of experimental example 2-4 which indicates the relationships between the rotation angle θs of the magnet 2A relative to the sensor unit 3 and the individual magnetic flux densities Br, BΘ, and Bz. FIG. 38A is a characteristic graph of comparative example 2 which indicates the relationships between the rotation angle θs of the magnet 102A relative to the sensor unit 3 and the individual magnetic flux densities Br, BΘ, and Bz. FIG. 12A is a characteristic graph of experimental example 2-1 which indicates the error AE in the rotation angle θs determined from the magnetic flux densities Br and BΘ detected by the magnetic detection device 4 with respect to the actual rotation angle θs of the magnet 2A. FIG. 12B is a characteristic graph of experimental example 2-2 which indicates the error AE in the rotation angle θs determined from the magnetic flux densities Br and BΘ detected by the magnetic detection device 4 with respect to the actual rotation angle θs of the magnet 2A. FIG. 12C is a characteristic graph of experimental example 2-3 which indicates the error AE in the rotation angle θs determined from the magnetic flux densities Br and BΘ detected by the magnetic detection device 4 with respect to the actual rotation angle θs of the magnet 2A. FIG. 12D is a characteristic graph of experimental example 2-4 which indicates the error AE in the rotation angle θs determined from the magnetic flux densities Br and BΘ detected by the magnetic detection device 4 with respect to the actual rotation angle θs of the magnet 2A. FIG. 38B is a characteristic graph of comparative example 2 which indicates the error AE in the rotation angle θs determined from the magnetic flux densities Br and BΘ detected by the magnetic detection device 4 with respect to the actual rotation angle θs of the magnet 102A.

Figure 13A:
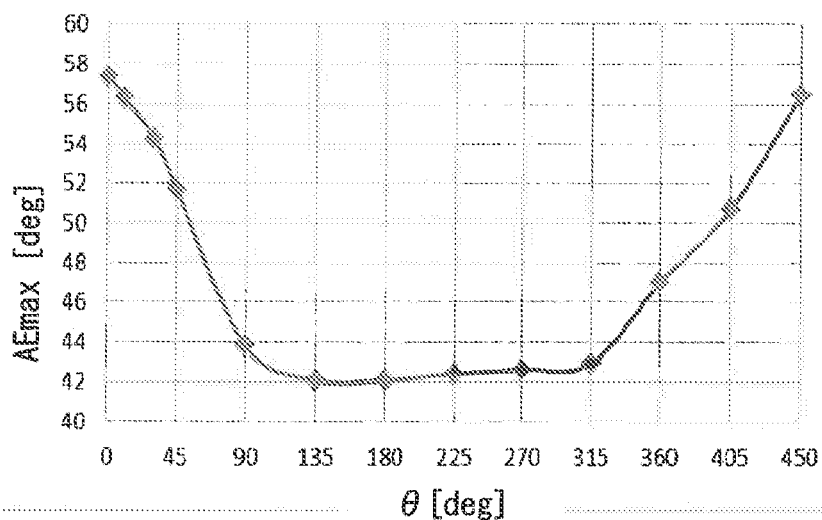
FIG. 13A is a characteristic graph of experimental examples 2-1 to 2-4 which indicates the relationship between an angle θ and the maximum of errors AE.
Figure 13B:
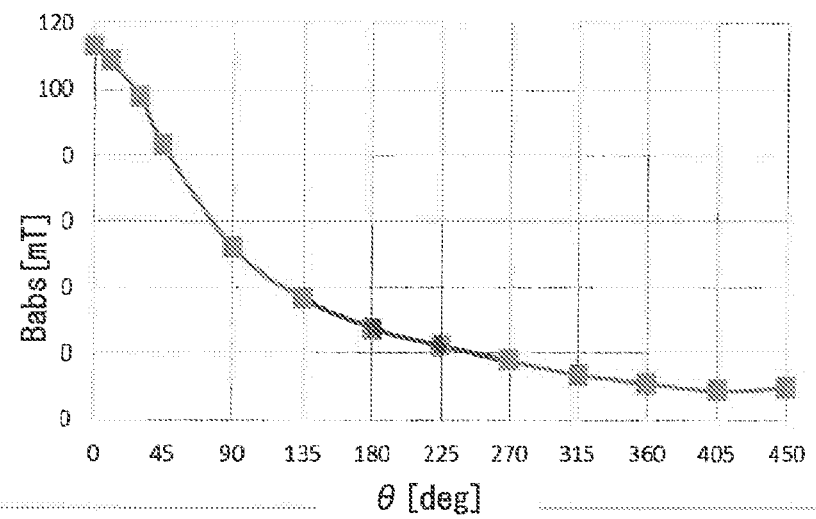
FIG. 13B is a characteristic graph of experimental examples 2-1 to 2-4 which indicates the relationship between an angle θ and a magnitude Babs of a magnetic flux density.

FIG. 13A is a characteristic graph of experimental examples 2-1 to 2-4 which indicates the relationship between the angle θ and the maximum of the errors AE. FIG. 13B is a characteristic graph of experimental examples 2-1 to 2-4 which indicates the relationship between the angle θ and a magnitude Babs of a magnetic flux density. It is to be noted that the maximums AEmax of the errors AE caused at angles θ other than 25°, 45°, 180°, and 225° are also plotted in the graphs in FIGS. 13A and 13B. The magnitude Babs of the magnetic flux density is the minimum of values calculated from the expression $(Br^2+BΘ^2)^{0.5}$ where Br denotes the magnetic flux density Br, and BΘ denotes the magnetic flux density BΘ. As indicated in FIG. 13A, the maximum AEmax of the error AE is reduced to a relatively small value over the range in which the angle θ varies from 90° to 315°.

Experimental Examples 3-1 to 3-4

Figure 14A:
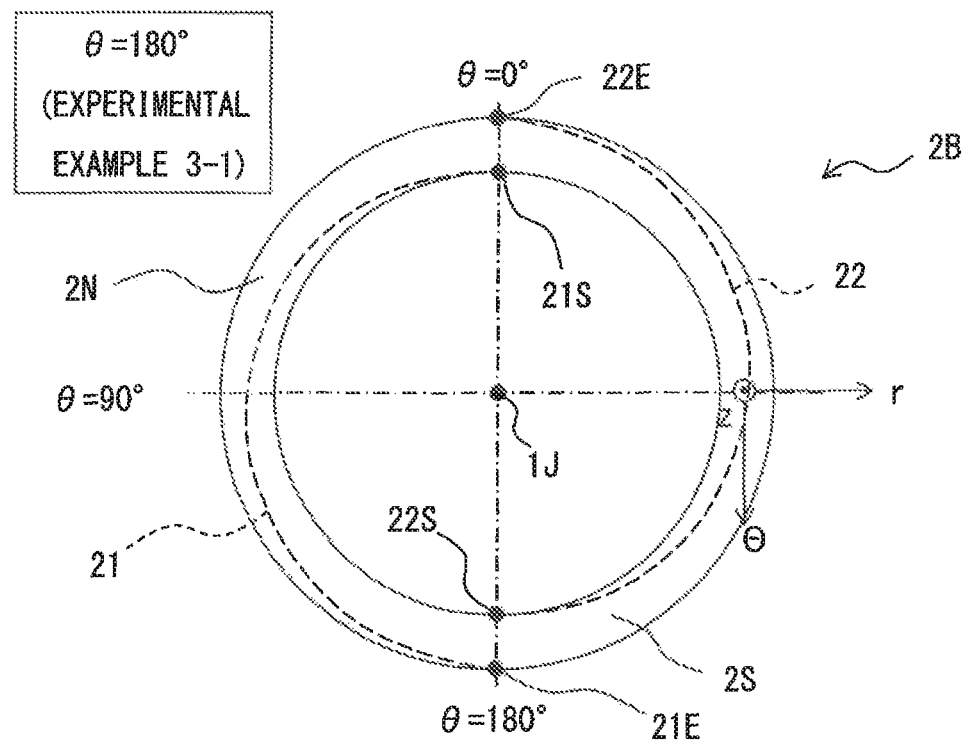
FIG. 14A is a top plan view of a magnet according to experimental example 3-1.
Figure 14B:
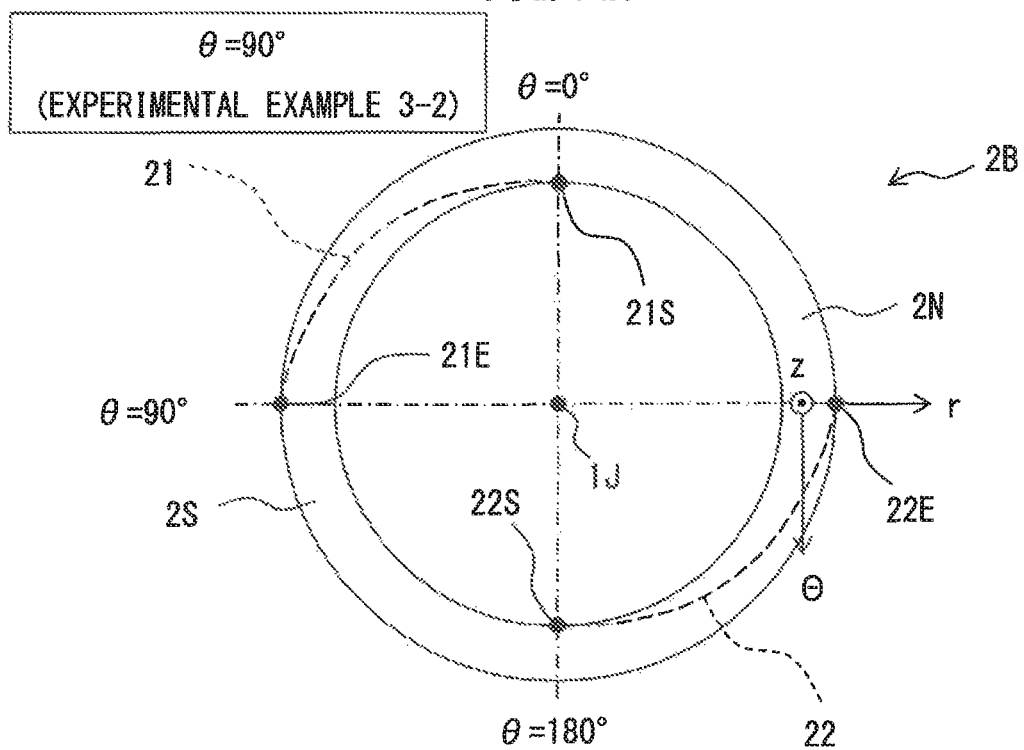
FIG. 14B is a top plan view of a magnet according to experimental example 3-2.
Figure 14C:
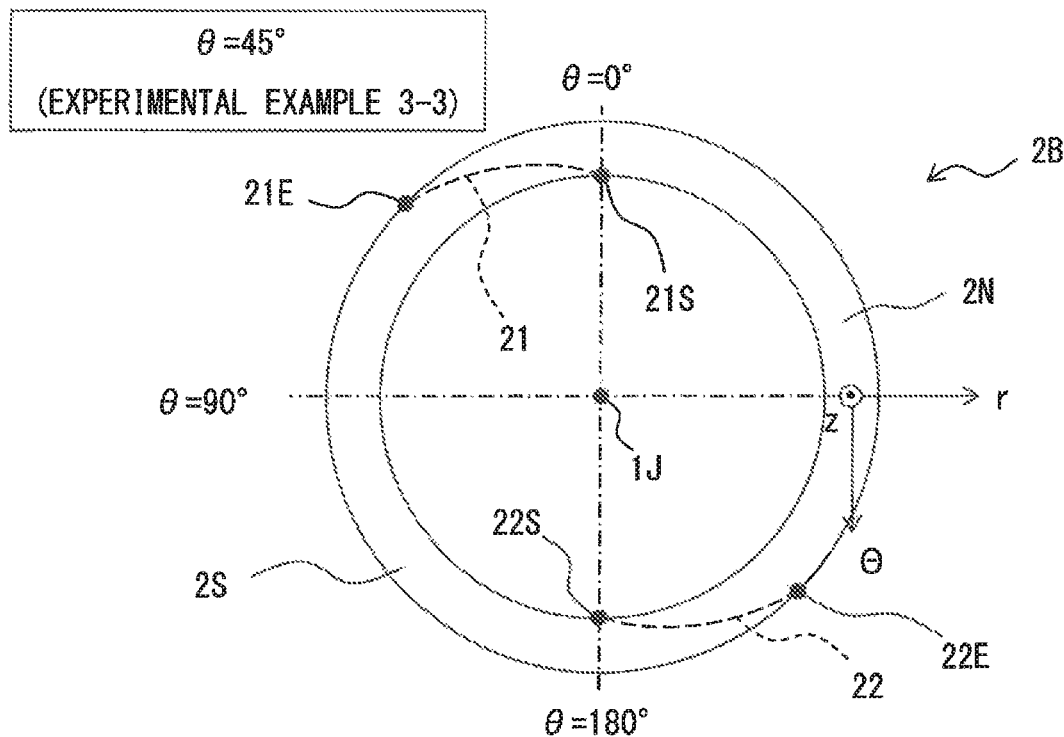
FIG. 14C is a top plan view of a magnet according to experimental example 3-3.
Figure 14D:
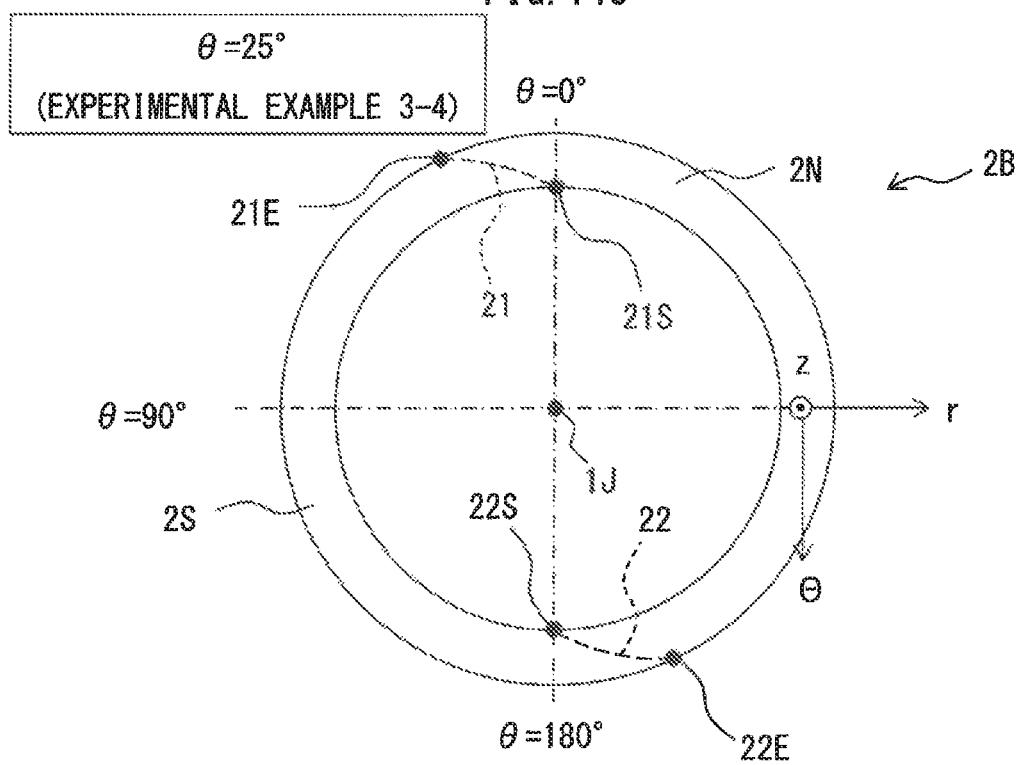
FIG. 14D is a top plan view of a magnet according to experimental example 3-4.
Figure 15A:
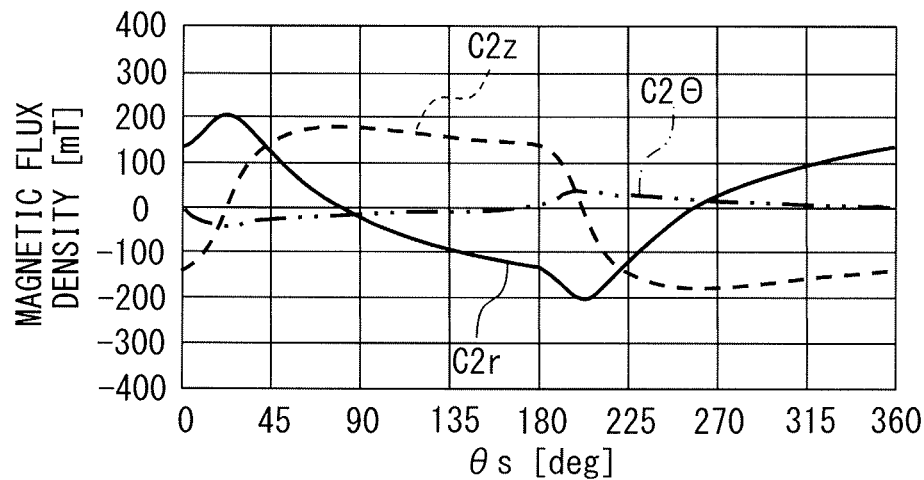
FIG. 15A is a characteristic graph of a displacement detection unit, with the magnet illustrated in FIG. 14A, according to experimental example 3-1 which indicates the relationships between the rotation angle of the magnet relative to the magnetic detector and the individual magnetic flux densities.
Figure 15B:
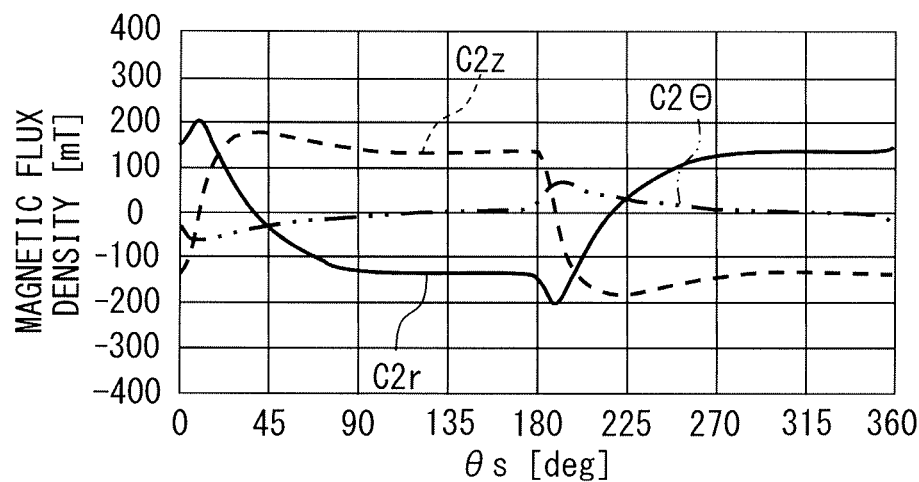
FIG. 15B is a characteristic graph of a displacement detection unit, with the magnet illustrated in FIG. 14B, according to experimental example 3-2 which indicates the relationships between the rotation angle of the magnet relative to the magnetic detector and the individual magnetic flux densities.
Figure 15C:
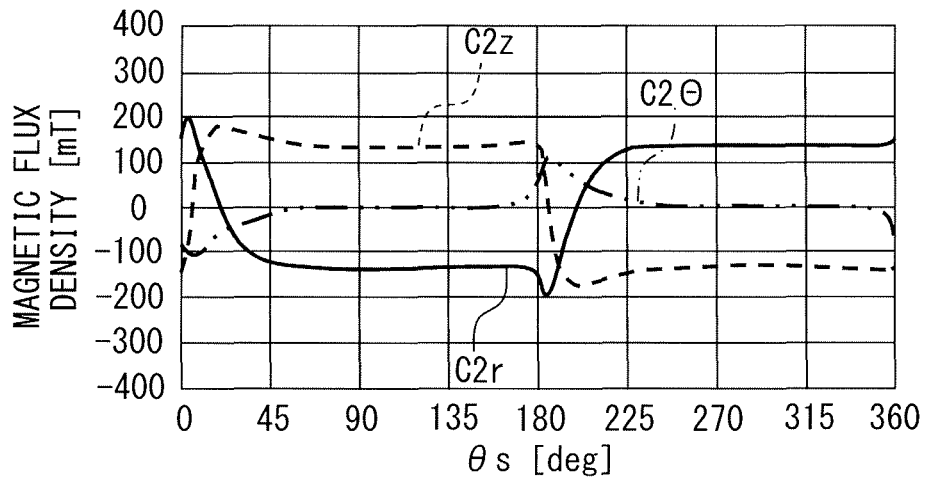
FIG. 15C is a characteristic graph of a displacement detection unit, with the magnet illustrated in FIG. 14C, according to experimental example 3-3 which indicates the relationships between the rotation angle of the magnet relative to the magnetic detector and the individual magnetic flux densities.
Figure 15D:
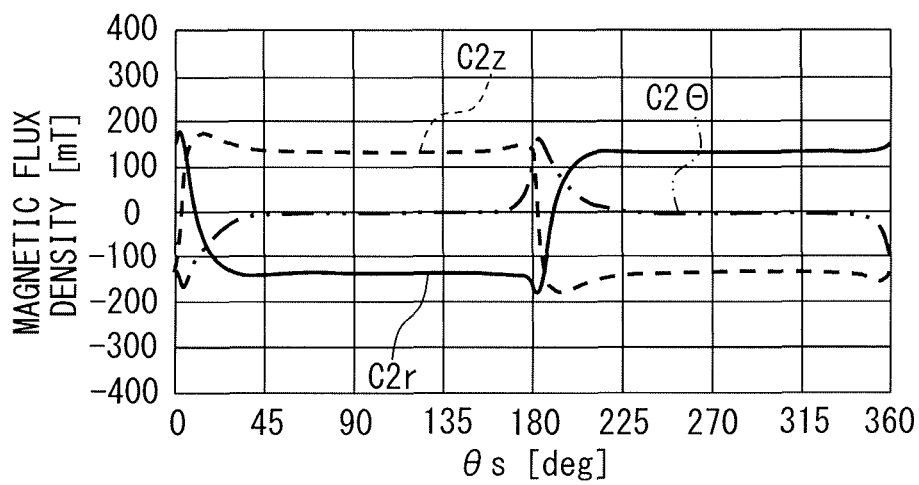
FIG. 15D is a characteristic graph of the displacement detection unit, with the magnet illustrated in FIG. 14D, according to experimental example 3-4 which indicates the relationships between the rotation angle of the magnet relative to the magnetic detector and the individual magnetic flux densities.
Figure 16A:
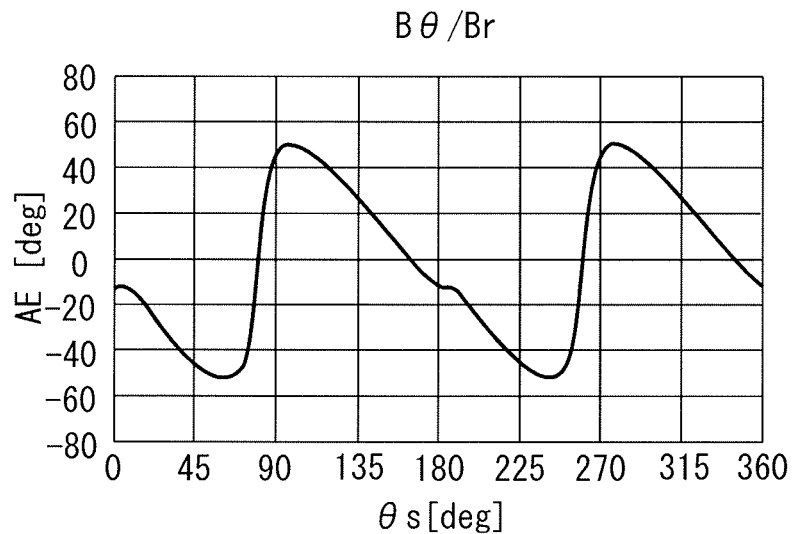
FIG. 16A is a characteristic graph of the displacement detection unit, with the magnet illustrated in FIG. 14A, according to experimental example 3-1 which indicates an error in a rotation angle.
Figure 16B:
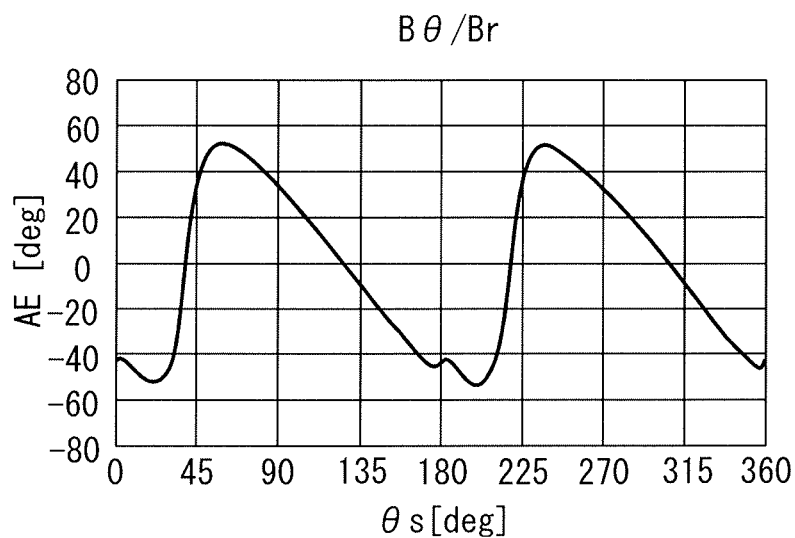
FIG. 16B is a characteristic graph of the displacement detection unit, with the magnet illustrated in FIG. 14B, according to experimental example 3-2 which indicates an error in a rotation angle.
Figure 16C:
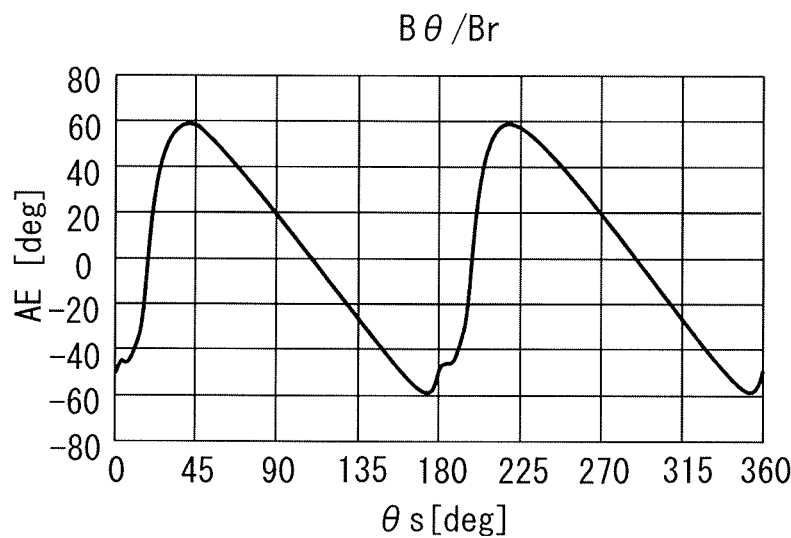
FIG. 16C is a characteristic graph of the displacement detection unit, with the magnet illustrated in FIG. 14C, according to experimental example 3-3 which indicates an error in a rotation angle.
Figure 16D:
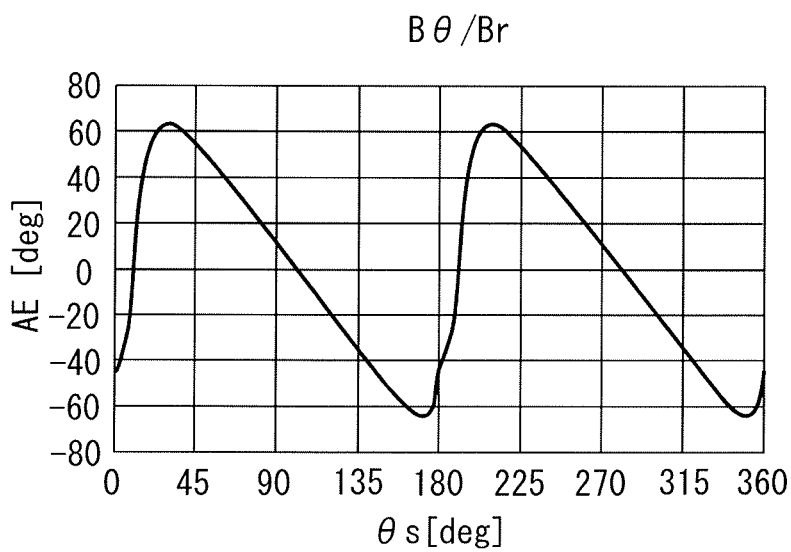
FIG. 16D is a characteristic graph of the displacement detection unit, with the magnet illustrated in FIG. 14D, according to experimental example 3-4 which indicates an error in a rotation angle.
Figure 39:
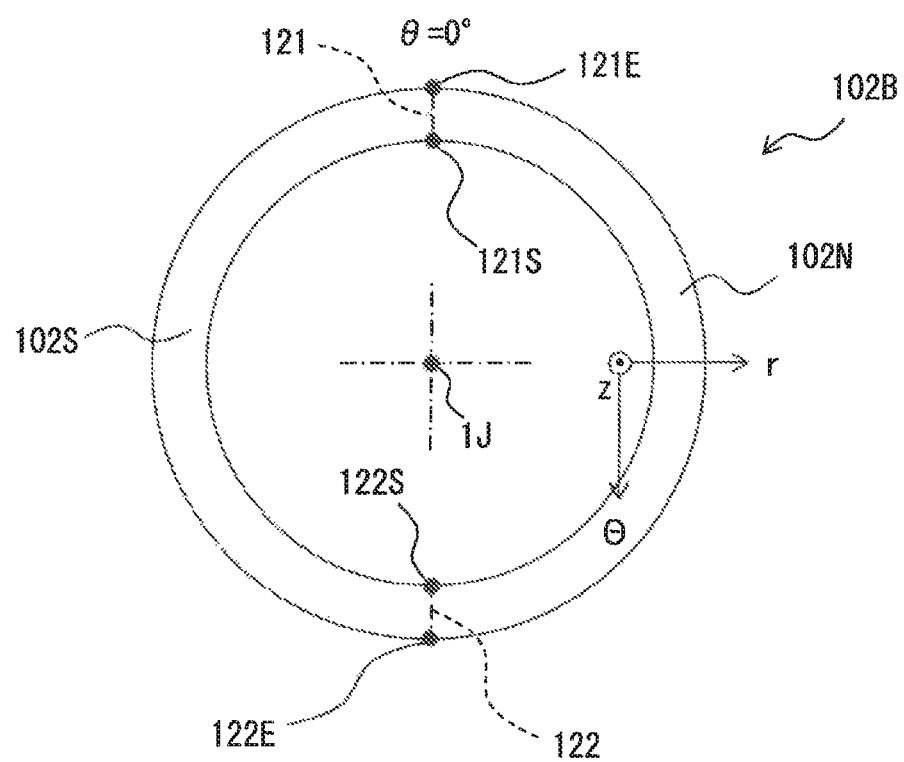
FIG. 39 is a schematic view of a configuration of a magnet according to comparative example 3.
Figure 40A:
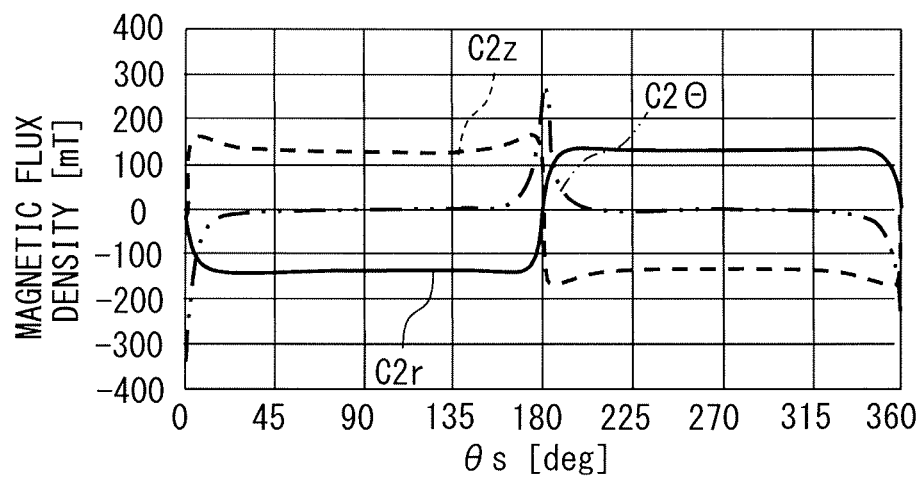
FIG. 40A is a characteristic graph of a displacement detection unit according to comparative example 3 which indicates the relationships between a rotation angle of the magnet relative to the magnetic detector and individual magnetic flux densities when the displacement detection unit is provided with the magnet illustrated in FIG. 39.
Figure 40B:
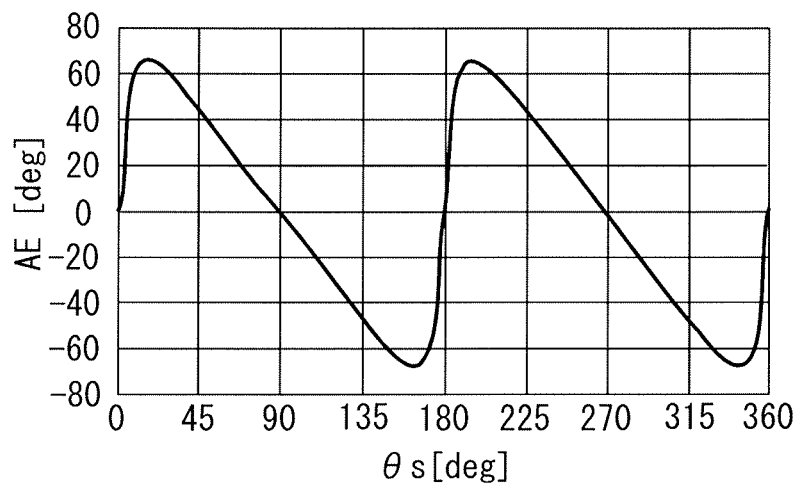
FIG. 40B is a characteristic graph of the displacement detection unit according to comparative example 3 which indicates an error in a rotation angle determined from the magnetic flux densities detected by the magnetic detector with respect to an actual rotation angle of the magnet when the displacement detection unit is provided with the magnet illustrated in FIG. 39.

FIG. 14A illustrates a configuration of a magnet 2B according to experimental example 3-1; FIG. 14B illustrates a configuration of a magnet 2B according to experimental example 3-2; FIG. 14C illustrates a configuration of a magnet 2B according to experimental example 3-3; FIG. 14D illustrates a configuration of a magnet 2B according to experimental example 3-4. The magnets 2B in FIGS. 14A to 14D had substantially the same configuration as the magnet 2 illustrated in FIG. 1B, except that their inner diameter φi was set to 80 mm and their distance Rs between the magnetic detection device 4 and the rotation axis 1J was set to 41 mm. However, the angle θ of experimental example 3-1 was set to 180° as illustrated in FIG. 14A; the angle θ of experimental example 3-2 was set to 90° as illustrated in FIG. 14B; the angle θ of experimental example 3-3 was set to 45° as illustrated in FIG. 14C; and the angle θ of experimental example 3-4 was set to 25° as illustrated in FIG. 14D. FIG. 39 illustrates a configuration of a magnet 102B according to comparative example 3. The magnet 102B had substantially the same configuration as the magnet 102 illustrated in FIG. 35 except that the inner diameter φi was set to 80 mm. FIG. 15A is a characteristic graph of experimental example 3-1 which indicates the relationships between the rotation angle θs of the magnet 2B relative to the sensor unit 3 and the individual magnetic flux densities Br, BΘ, and Bz. FIG. 15B is a characteristic graph of experimental example 3-2 which indicates the relationships between the rotation angle θs of the magnet 2B relative to the sensor unit 3 and the individual magnetic flux densities Br, BΘ, and Bz. FIG. 15C is a characteristic graph of experimental example 3-3 which indicates the relationships between the rotation angle θs of the magnet 2B relative to the sensor unit 3 and the individual magnetic flux densities Br, BΘ, and Bz. FIG. 15D is a characteristic graph of experimental example 3-4 which indicates the relationships between the rotation angle θs of the magnet 2B relative to the sensor unit 3 and the individual magnetic flux densities Br, BΘ, and Bz. FIG. 40A is a characteristic graph of comparative example 3 which indicates the relationships between the rotation angle θs of the magnet 102B relative to the sensor unit 3 and the individual magnetic flux densities Br, BΘ, and Bz. FIG. 16A is a characteristic graph of experimental example 3-1 which indicates the error AE in the rotation angle θs determined from the magnetic flux densities Br and BΘ detected by the magnetic detection device 4 with respect to the actual rotation angle θs of the magnet 2B. FIG. 16B is a characteristic graph of experimental example 3-2 which indicates the error AE in the rotation angle θs determined from the magnetic flux densities Br and BΘ detected by the magnetic detection device 4 with respect to the actual rotation angle θs of the magnet 2B. FIG. 16C is a characteristic graph of experimental example 3-3 which indicates the error AE in the rotation angle θs determined from the magnetic flux densities Br and BΘ detected by the magnetic detection device 4 with respect to the actual rotation angle θs of the magnet 2B. FIG. 16D is a characteristic graph of experimental example 3-4 which indicates the error AE in the rotation angle θs determined from the magnetic flux densities Br and BΘ detected by the magnetic detection device 4 with respect to the actual rotation angle θs of the magnet 2B. FIG. 40B is a characteristic graph of comparative example 3 which indicates the error AE in the rotation angle θs determined from the magnetic flux densities Br and BΘ detected by the magnetic detection device 4 with respect to the actual rotation angle θs of the magnet 102B.

Figure 17A:
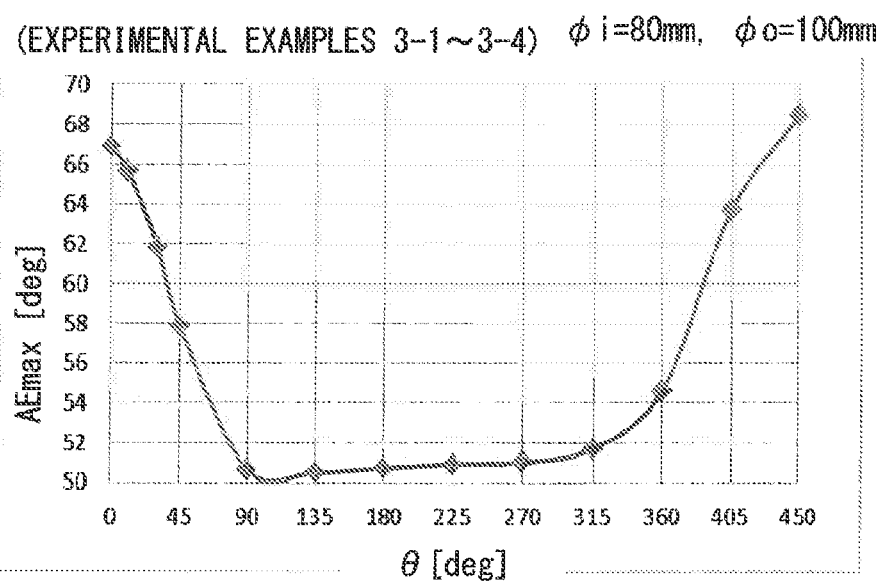
FIG. 17A is a characteristic graph of the displacement detection units according to experimental examples 3-1 to 3-4 which indicates the relationship between the angle θ and the maximum of the errors AE.
Figure 17B:
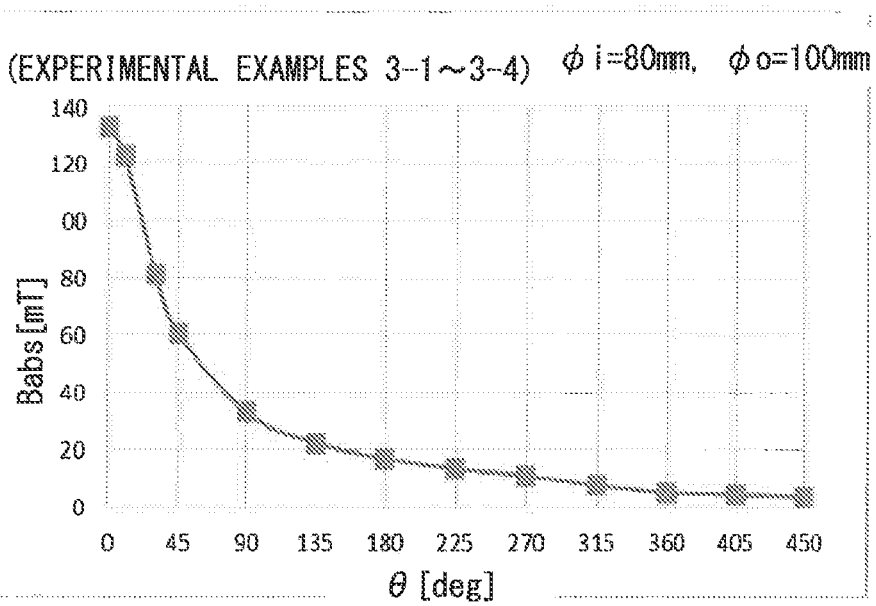
FIG. 17B is a characteristic graph of the displacement detection unit according to experimental example 3-1 to 3-4 which indicates the relationship between the angle θ and a magnitude Babs of a magnetic flux density.

FIG. 17A is a characteristic graph of experimental examples 3-1 to 3-4 which indicates the relationship between the angle θ and the maximum of the errors AE. FIG. 17B is a characteristic graph of experimental example 3-1 to 3-4 which indicates the relationship between the angle θ and the magnitude Babs of the magnetic flux density. It is to be noted that the maximums AEmax of the errors AE caused at angles θ other than 25°, 45°, 90°, and 180° are also plotted in the graphs in FIGS. 17A and 17B. As indicated in FIG. 17A, the maximum AEmax of the errors AE is reduced to a relatively small value over the range in which the angle θ varies from 90° to 315°.

In light of the result of the comparison among experimental examples 1-1 to 1-4, 2-1 to 2-4, and 3-1 to 3-4, the error AE is believed to become more sensitive to the rotation angle θs as the difference between the outer diameter φ0 and the inner diameter φi becomes smaller.

[1-2] Example of Nonlinear Boundaries
[Configuration of Magnet According to First Modification]

Figure 18:
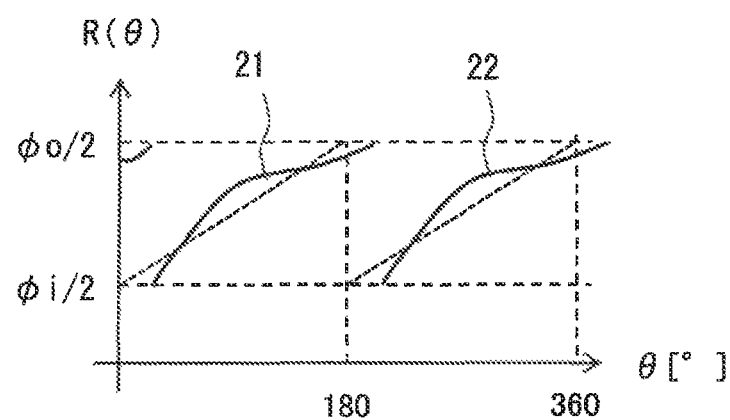
FIG. 18 is an explanatory view of shapes of boundaries in a magnet according to a first modification.

In the foregoing first embodiment, the boundaries 21 and 22 of the magnet 2 may satisfy expression (1). More specifically, the distance R(θ) between the rotation axis 1J and any given point on each of the boundaries 21 and 22 may linearly vary with the angle θ. However, the technology is limited to this configuration. In this modification, the boundaries 21 and 22 may satisfy expression (2) described below, for example, as illustrated in FIG. 18. More specifically, in this modification, the distance R(θ) between the rotation axis 1J and any given point on each of the boundaries 21 and 22 may nonlinearly vary with the angle θ. Other configurations in this modification may be substantially the same as those in the foregoing first embodiment.

$$R(θ)=-α·\cos(2θ)-(θ/180)×(Φ0-Φi)/2+(Φ0/2) \qquad (2)$$

In expression (2), α denotes a constant.

In this modification, the boundaries 21 and 22 satisfy expression (2), which may possibly result in a decrease in the error AE.

Figure 19A:
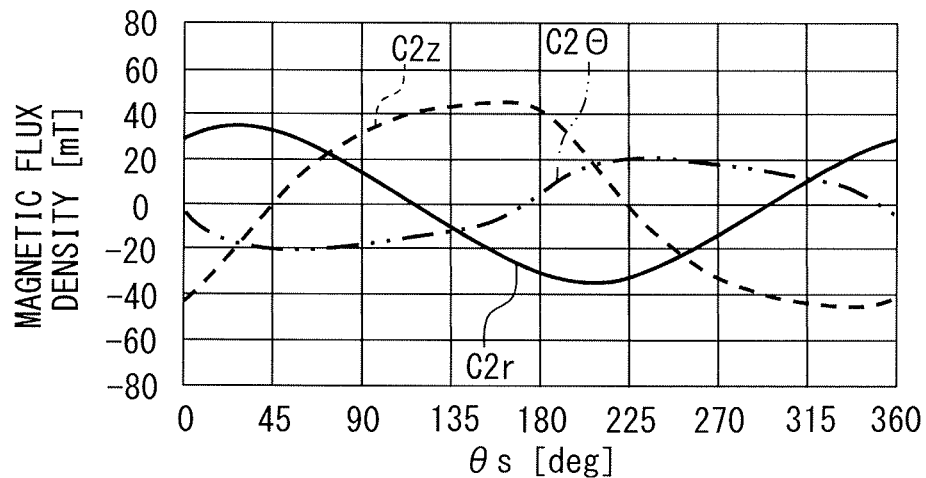
FIG. 19A is a characteristic graph of a displacement detection unit according to experimental example 4-1 which indicates the relationships between the rotation angle of the magnet relative to the magnetic detector and the individual magnetic flux densities when the magnet is provided with the boundaries having shapes as illustrated in FIG. 1B.
Figure 19B:
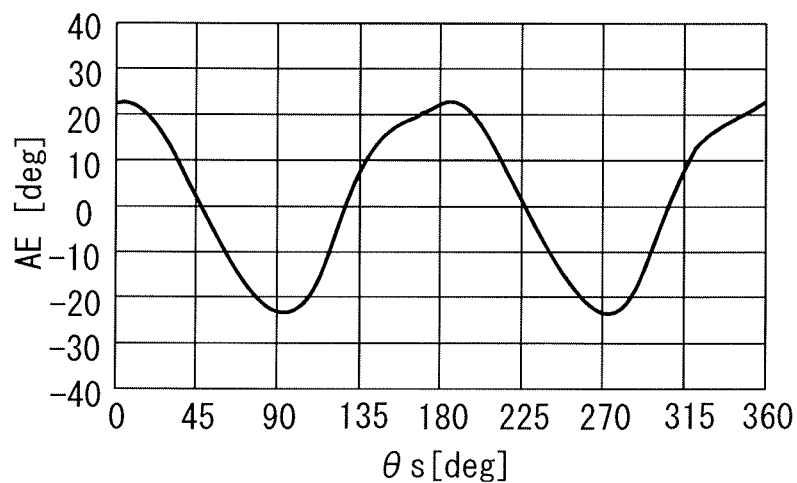
FIG. 19B is a characteristic graph of the displacement detection unit according to experimental example 4-1 which indicates an error in a rotation angle when the magnet is provided with the boundaries having shapes as illustrated in FIG. 1B.

FIG. 19A is a characteristic graph of experimental example 4-1 which indicates the relationships between the rotation angle θs of the magnet 2 and the individual magnetic flux densities Br, BΘ, and Bz when the boundaries 21 and 22 in the magnet 2 satisfy expression (1) as illustrated in FIG. 2B. Specifically, FIG. 19A illustrates simulation data obtained under the conditions described below. A thickness of the magnet 2, or a dimension of the magnet 2 in the z direction, was set to 10 mm. The outer diameter φ0 of the magnet 2 was set to 100 mm. The inner diameter φi of the magnet 2 was set to 60 mm. The distance Rs between the magnetic detection device 4 and the rotation axis 1J was set to 32 mm. The distance Zs between the surface of the magnet 2 in the z direction and the magnetic detection device 4 was set to 10 mm. The angle θ was set to 180°. FIG. 19B is a characteristic graph of experimental example 4-1 which indicates the error AE in the rotation angle θss with respect to the actual rotation angle θs of the magnet 2; the rotation angle θss is determined from the magnetic flux densities Br and BΘ detected by the magnetic detection device 4.

Figure 20A:
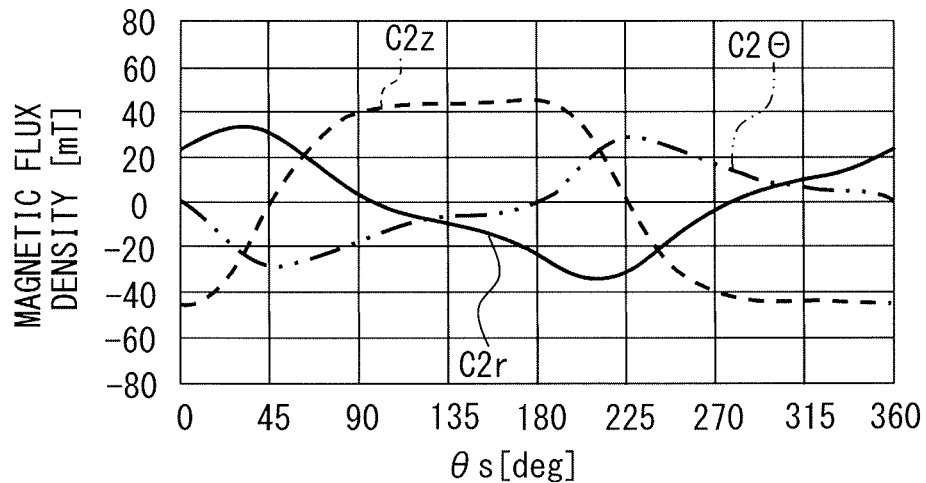
FIG. 20A is a characteristic graph of a displacement detection unit according to experimental example 4-2 which indicates the relationships between the rotation angle of the magnet relative to the magnetic detector and the individual magnetic flux densities when the magnet is provided with the boundaries having shapes as illustrated in FIG. 18.
Figure 20B:
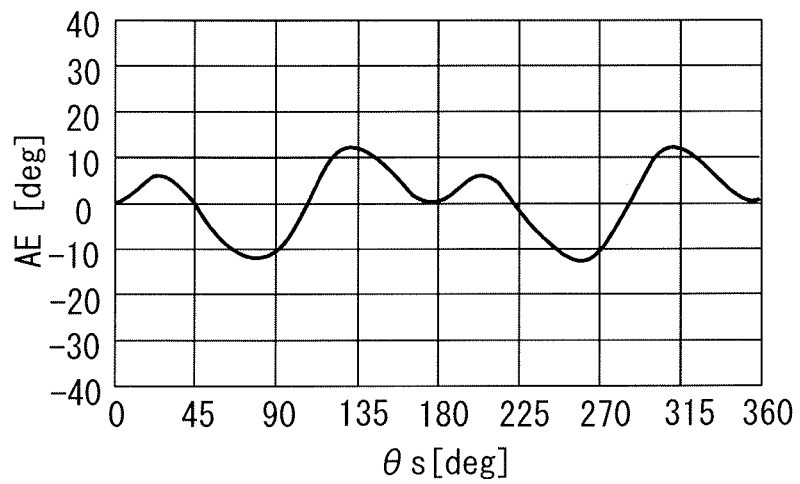
FIG. 20B is a characteristic graph of the displacement detection unit according to experimental example 4-2 which indicates an error in a rotation angle when the magnet is provided with the boundaries having shapes as illustrated in FIG. 18.

FIG. 20A is a characteristic graph of experimental example 4-2 which indicates the relationships between the rotation angle θs of the magnet 2 and the individual magnetic flux densities Br, BΘ, and Bz when the magnet 2 satisfies expression (2) as illustrated in FIG. 18. FIG. 20B is a characteristic graph of experimental example 4-2 which indicates the error AE. Experimental example 4-2 had substantially the same configuration as experimental example 4-1 except for the shape of the boundaries 21 and 22.

In light of the result of the comparison between the characteristic graphs of FIGS. 19B and 20B, as a whole, the error AE caused in the displacement detection unit according to experimental example 4-2 is reduced more greatly than that according to experimental example 4-1. In other words, the error AE caused in the displacement detection unit according to experimental example 4-2 is closer to zero than that in experimental example 4-1. More specifically, in the displacement detection unit according to experimental example 4-1, when the rotation angle θs becomes nearly 0° and nearly 180°, the error AE increases to the positive side. When the rotation angle θs becomes nearly 90° and nearly 270°, the error AE increases to the negative side. Therefore, in the displacement detection unit according to experimental example 4-2, the shapes of the boundaries 21 and 22 are modified such that a change in the ratio of the magnetic volumes Vs and Vn delays as compared with the experimental example 4-1 when the rotation angle θs becomes nearly 0° and nearly 180° and such that the change in the ratio of the magnetic volumes Vs and Vn accelerates as compared with the experimental example 4-1 when the rotation angle θs becomes nearly 90° and nearly 270°. In other words, in the displacement detection unit according to experimental example 4-2, the shapes of the boundaries 21 and 22 are modified such that the transition from the S-pole region 2S to the N-pole region 2N or from the N-pole region 2N to the S-pole region 2S delays as compared with the experimental example 4-1 when the rotation angle θs becomes nearly 0° and nearly 180° and such that the transition from the S-pole region 2S to the N-pole region 2N or from the N-pole region 2N to the S-pole region 2S accelerates as compared with the experimental example 4-1 when the rotation angle θs becomes nearly 90° and nearly 270°. For example, the shapes of the boundaries 21 and 22 are modified such that the transition from a state in which the magnetic volume Vs of the S-pole region 2S is higher than the magnetic volume Vn of the N-pole region 2N to a state in which the magnetic volume Vn of the N-pole region 2N is higher than the magnetic volume Vs of the S-pole region 2S delays as compared with the experimental example 4-1 when the rotation angle θs becomes nearly 0° and nearly 180°, and such that the transition from the state in which the magnetic volume Vs of the S-pole region 2S is higher than the magnetic volume Vn of the N-pole region 2N to the state in which the magnetic volume Vn of the N-pole region 2N is higher than the magnetic volume Vs of the S-pole region 2S accelerates as compared with the experimental example 4-1 when the rotation angle θs becomes nearly 90° and nearly 270°. Modifying the shape of the boundaries 21 and 22 in this manner makes it possible to control an increase in the error AE to the positive side when the rotation angle θs becomes nearly 0° and nearly 180° and an increase in the error AE to the negative side when the rotation angle θs becomes nearly 90° and nearly 270°.

2. Second Embodiment

[Configuration of Displacement Detection Unit 12]

Next, a description will be given of a configuration of a displacement detection unit 12 according to a second embodiment of the technology. The foregoing displacement detection unit 11 according to the first embodiment may cause the sensor unit 3 to detect a variation in a magnetic flux density within the rotation plane, or the Θ-r plane, of the magnet 2 which is orthogonal to the rotation axis 1J. However, the displacement detection unit 12 according to this embodiment may cause the sensor unit 3 to detect a variation in a magnetic flux density Bip in any predetermined direction within the Θ-r plane and a variation in a magnetic flux density Bz in the z direction. Then, the displacement detection unit 12 may cause the arithmetic circuit 6 to determine the rotation angle θs of the magnet 2.

Figure 21A:
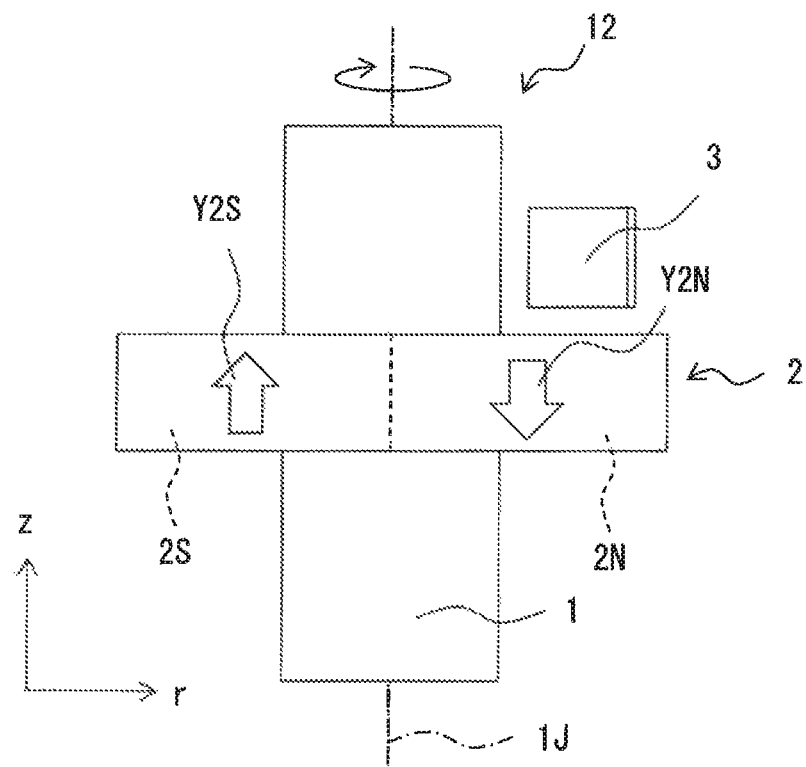
FIG. 21A is a front view of an overall configuration of a displacement detection unit according to a second embodiment of the technology.
Figure 21B:
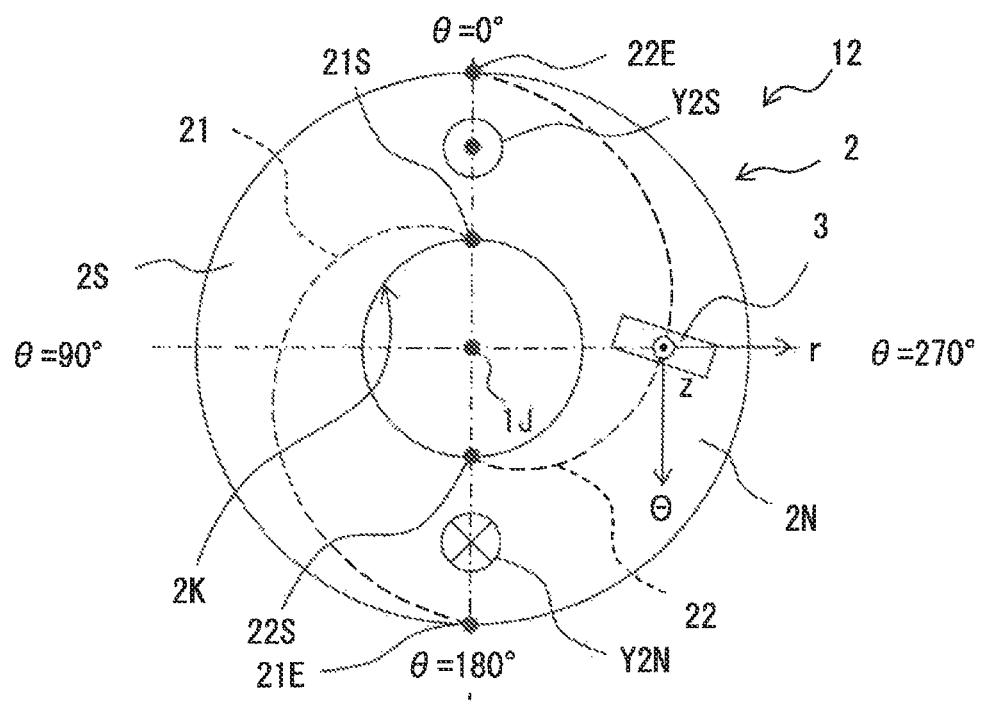
FIG. 21B is a top plan view of the overall configuration of the displacement detection unit illustrated in FIG. 21A.

As a specific configuration, the displacement detection unit 12 may be disposed such that the substrate 30 in the sensor unit 3 is orthogonal to the rotation plane, or the Θ-r plane, of the magnet 2, as illustrated in FIGS. 21A and 21B. Thus, the magnetization pinned layer 31, the intermediate layer 32, and the magnetization free layer 33 that are constituent elements of each MR device 41 in the magnetic detection device 4 may be laid out in the plane orthogonal to the Θ-r plane. As a result, the orientation of the magnetization J33 of the magnetization free layer 33 may be rotatable in the plane orthogonal to the Θ-r plane, namely, in the plane parallel to the z direction.

Operation and Workings of Displacement Detection Unit 12

Experimental Example 5-1 to 5-3

Figure 22:
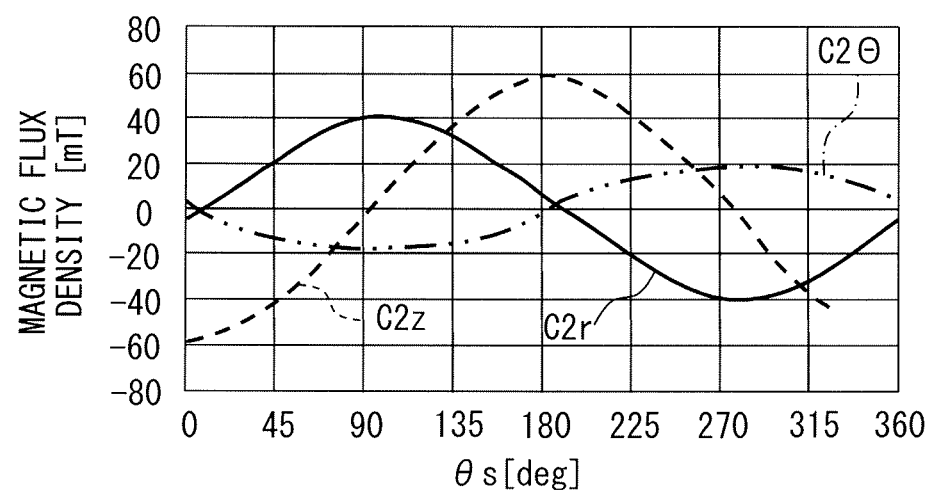
FIG. 22 is a characteristic graph of the displacement detection unit, illustrated in FIG. 21A, according to experimental example 5 which indicates the relationships between the rotation angle of the magnet relative to the magnetic detector and the individual magnetic flux densities.

As with the foregoing displacement detection unit 11 according to the first embodiment, the displacement detection unit 12 according to this embodiment may be able to cause the sensor unit 3 to detect a magnitude of the rotation angle θs of the magnet 2 in the Θ-direction. When the magnet 2 in the displacement detection unit 12 rotates one revolution, a magnetic field reaches the sensor unit 3, and each MR device 41 may detect variations in r-directional and Θ-direction components in the magnetic field, as well as a variation in a z-direction component. Subsequently, the bridge circuit 40 may output the signals e1 and e2, which then may be supplied to the arithmetic circuit 6. More specifically, the magnetic detection devices 4 and 5 each may detect variations in the densities Br, BΘ, and Bz of the magnetic flux produced by the magnet 2; in FIG. 22, for example, the magnetic flux density Br is represented by the curve C2r, the magnetic flux density BΘ is represented by the curve C2Θ, and the magnetic flux density Bz is represented by a curve C2z. Then, the bridge circuit 40 may output signals e1 to e4, which then may be supplied to the arithmetic circuit 6, as illustrated in FIG. 3C. Thereafter, the arithmetic circuit 6 may determine the rotation angle θs of the magnet 2. FIG. 22 is a characteristic graph of the displacement detection unit 12 which indicates the relationships between the rotation angle θs of the magnet 2 relative to the sensor unit 3 and the individual magnetic flux densities Br, BΘ, and Bz. Specifically, FIG. 22 illustrates simulation data on experimental example 5 which was obtained under the conditions described below. A thickness of the magnet 2, or a dimension of the magnet 2 in the z direction, was set to 10 mm. The outer diameter φ0 of the magnet 2 was set to 100 mm. The inner diameter φi of the magnet 2 was set to 60 mm. The distance Rs between the magnetic detection device 4 and the rotation axis 1J and the distance Rs between the magnetic detection device 5 and the rotation axis 1J were each set to 40 mm. The distance Zs between the surface of the magnet 2 in the z direction and the magnetic detection device 4 and the distance Zs between the surface of the magnet 2 in the z direction and the magnetic detection device 5 were each set to 10 mm. The angle θ was set to 180°. The boundaries 21 and 22 conformed to expression (1) that defines the configuration of FIG. 2B.

Figure 23A:
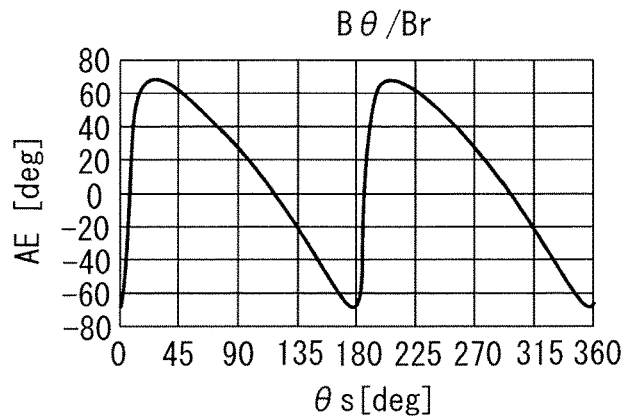
FIG. 23A is a characteristic graph of the displacement detection unit, illustrated in FIG. 21A, according to experimental example 5-1 which indicates an error in a rotation angle determined from the magnetic flux densities detected by the magnetic detector with respect to an actual rotation angle of the magnet.
Figure 23B:
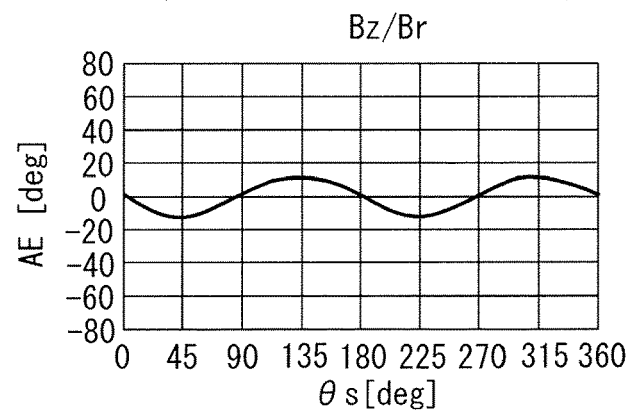
FIG. 23B is a characteristic graph of the displacement detection unit, illustrated in FIG. 21A, according to experimental example 5-2 which indicates an error in a rotation angle determined from the magnetic flux densities detected by the magnetic detector with respect to an actual rotation angle of the magnet.
Figure 23C:
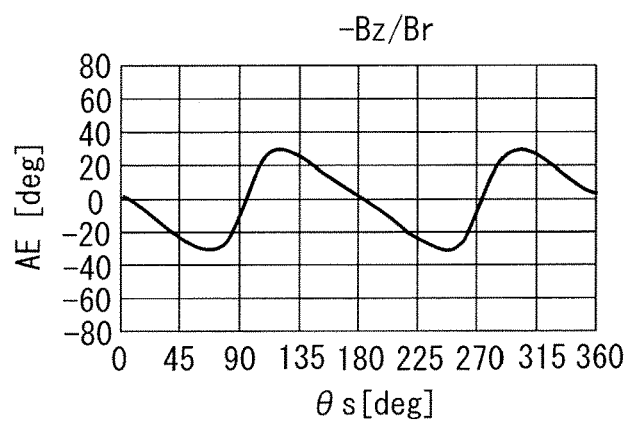
FIG. 23C is a characteristic graph of the displacement detection unit, illustrated in FIG. 21A, according to experimental example 5-3 which indicates an error in a rotation angle determined from the magnetic flux densities detected by the magnetic detector with respect to an actual rotation angle of the magnet.

FIG. 23A is a characteristic graph of experimental example 5-1 which indicates the error AE in the rotation angle θss determined from one or more of the magnetic flux densities Br, BΘ, and Bz detected by the magnetic detection devices 4 and 5 with respect to the actual rotation angle θs of the magnet 2. FIG. 23B is a characteristic graph of experimental example 5-2 which indicates the error AE in the rotation angle θss determined from one or more of the magnetic flux densities Br, BΘ, and Bz detected by the magnetic detection devices 4 and 5 with respect to the actual rotation angle θs of the magnet 2. FIG. 23C is a characteristic graph of experimental example 5-3 which indicates the error AE in the rotation angle θss determined from one or more of the magnetic flux densities Br, BΘ, and Bz detected by the magnetic detection devices 4 and 5 with respect to the actual rotation angle θs of the magnet 2. More specifically, FIG. 23A indicates the error AE caused in experimental example 5-1 which is calculated using values of the magnetic flux densities BΘ and Br. FIG. 23B indicates the error AE caused in experimental example 5-2 which is calculated using values of the magnetic flux densities Bz and Br. FIG. 23C indicates the error AE caused in experimental example 5-3 which is calculated using values of the magnetic flux densities Bz and BΘ. In all of FIGS. 23A to 23C, the error AE periodically varies, i.e., increases or decreases, with the actual rotation angle θs. Nevertheless, the absolute values of the errors AE in the rotation angles θs for experimental examples 5-2 and 5-3 which are calculated using the magnetic flux density Bz are smaller than those for experimental example 5-1 which are calculated without the use of the magnetic flux density Bz.

Figure 24:
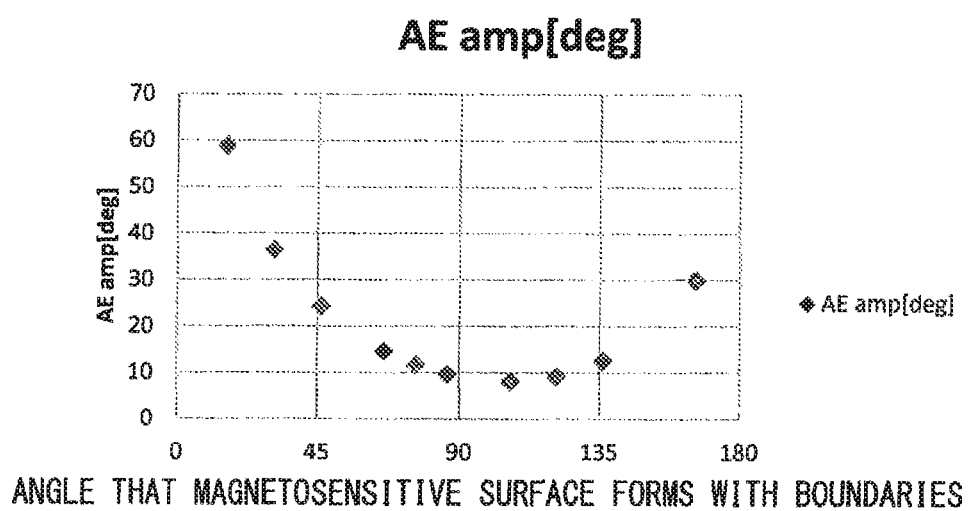
FIG. 24 is a characteristic graph of a displacement detection unit illustrated in FIG. 21A which indicates the relationship between an angle that the magnetosensitive surface of the magnetic detector forms with the boundaries of the magnet and a detection error.

In the above case, the rotation plane of the magnetization J33 may be preferably oriented in a direction orthogonal to the boundaries 21 and 22 at a location overlapped with the boundaries 21 and 22 in the z direction. This rotation plane may be substantially synonymous with the membrane surface of the magnetization free layer 33, and is also referred to as a magnetosensitive surface. As indicated in FIG. 24, for example, as the rotation plane, or the magnetosensitive surface, of the magnetization J33 is positioned more precisely in a direction orthogonal to the boundaries 21 and 22, the error AE decreases. Specifically, as illustrated in FIG. 24, when an angle that the rotation plane, or the magnetosensitive surface, of the magnetization J33 forms the boundaries 21 and 22 falls within the range of 90°±60°, namely, the range from 30° to 150°, the error AE sufficiently decreases. When the angle falls within the range of 90°±30°, namely, the range from 60° to 120°, the error AE further decreases.

Experimental Example 6

Figure 25A:
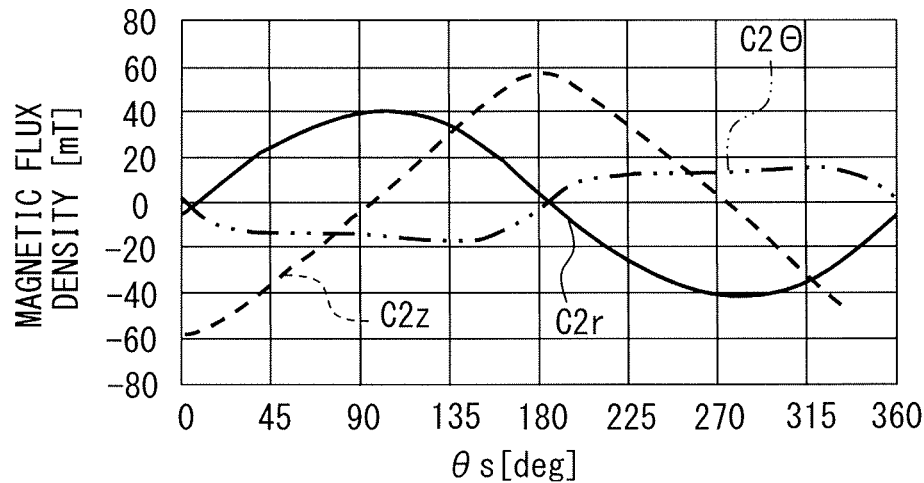
FIG. 25A is a characteristic graph of the displacement detection unit, illustrated in FIG. 21A, according to experimental example 6 which indicates the relationships between the rotation angle of the magnet relative to the magnetic detector and the individual magnetic flux densities when the boundaries of the displacement detection unit are adjusted on the basis of the result of FIG. 24.
Figure 25B:
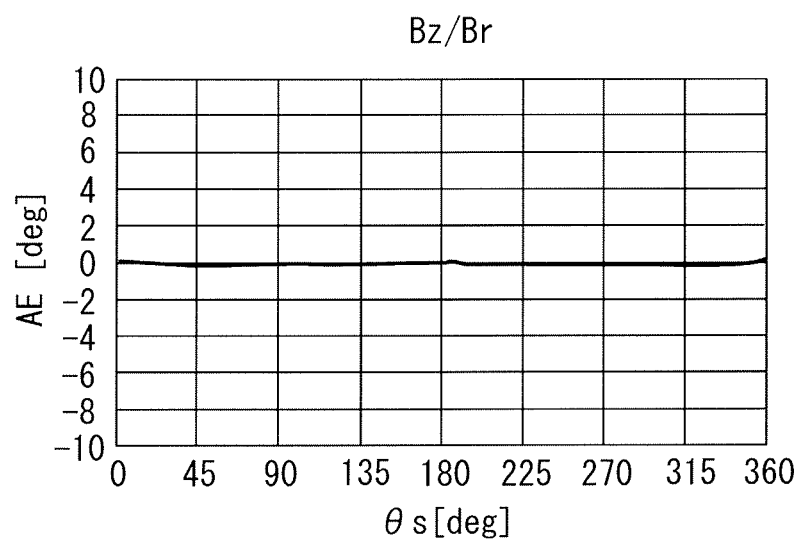
FIG. 25B is a characteristic graph of the displacement detection unit of FIG. 25A according to experimental example 6 which indicates an error in a rotation angle determined from the magnetic flux densities detected by the magnetic detector with respect to an actual rotation angle of the magnet.

The shapes of the boundaries 21 and 22 may be altered, for example on the basis of the result in FIG. 24 so that the densities Br, BΘ, and Bz of the magnetic flux produced by the magnet 2 and detected by the magnetic detection devices 4 and 5 change appropriately. Specifically, when the shapes of the boundaries 21 and 22 are altered so that the waveform of the resultant error AE conforms to that of FIG. 24, for example, the waveforms of the magnetic flux densities Br, BΘ, and Bz may conform to, respectively, the curves C2r, C2Θ, and curve C2z of FIG. 25A. In which case, the error AE may be minimized as indicated in FIG. 25B. A displacement detection unit 12 with the boundaries 21 and 22 configured above is referred to as experimental example 6.

Experimental Examples 7-1 to 7-4

Figure 26A:
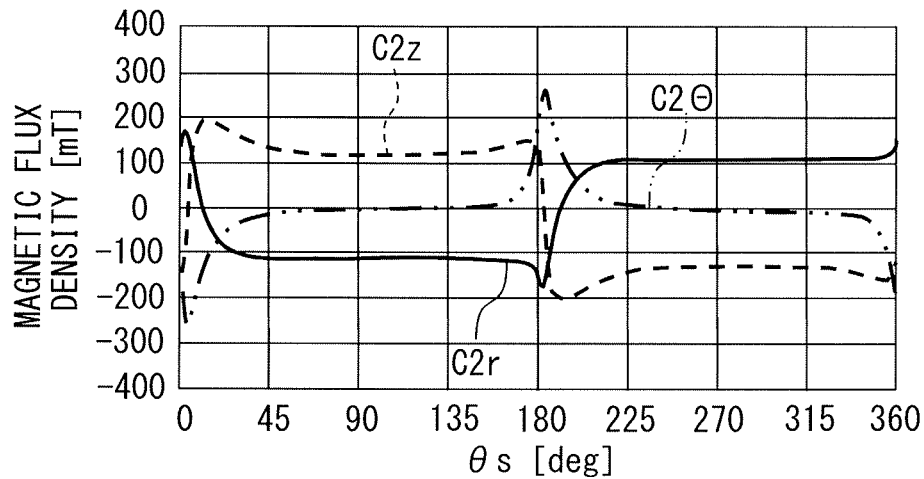
FIG. 26A is a characteristic graph of a displacement detection unit according to experimental example 7-1 which indicates the relationships between the rotation angle of the magnet relative to the magnetic detector and the individual magnetic flux densities when the displacement detection unit is provided with the magnet illustrated in FIG. 21A.
Figure 26B:
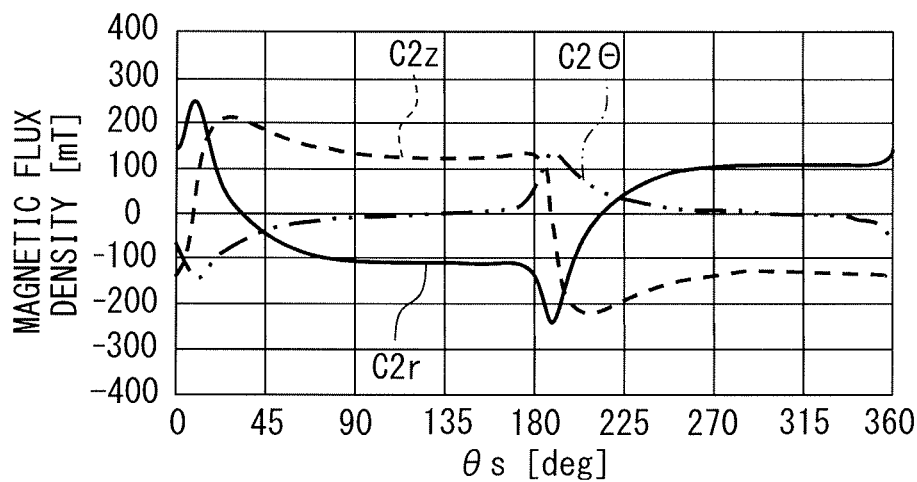
FIG. 26B is a characteristic graph of a displacement detection unit according to experimental example 7-2 which indicates the relationships between the rotation angle of the magnet relative to the magnetic detector and the individual magnetic flux densities when the displacement detection unit is provided with the magnet illustrated in FIG. 21A.
Figure 26C:
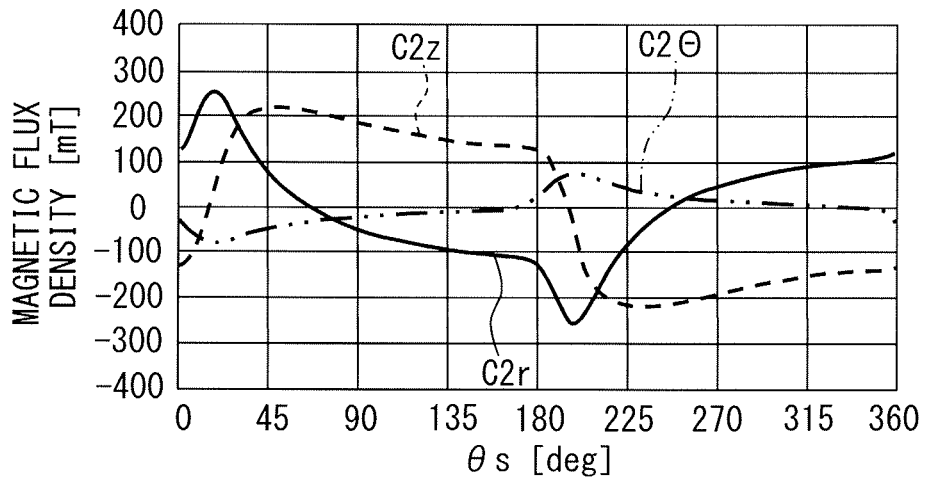
FIG. 26C is a characteristic graph of a displacement detection unit according to experimental example 7-3 which indicates the relationships between the rotation angle of the magnet relative to the magnetic detector and the individual magnetic flux densities when the displacement detection unit is provided with the magnet illustrated in FIG. 21A.
Figure 26D:
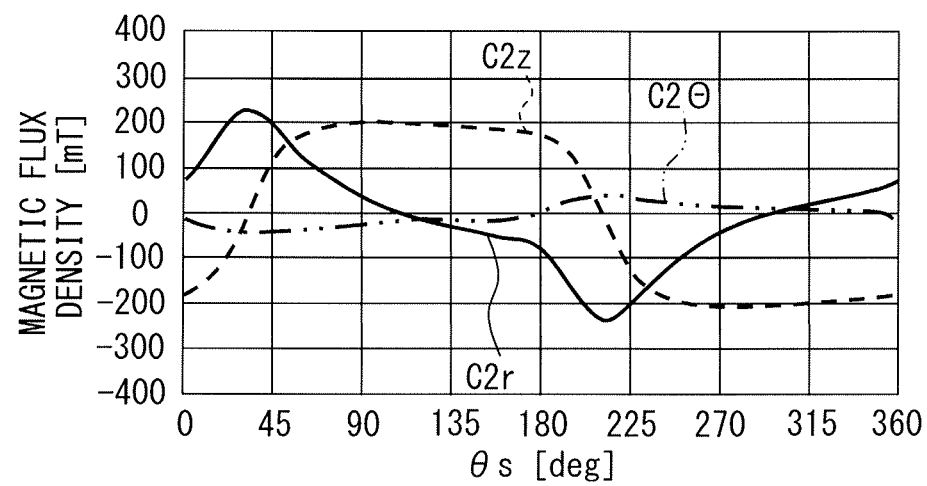
FIG. 26D is a characteristic graph of a displacement detection unit according to experimental example 7-4 which indicates the relationships between the rotation angle of the magnet relative to the magnetic detector and the individual magnetic flux densities when the displacement detection unit is provided with the magnet illustrated in FIG. 21A.
Figure 27A:
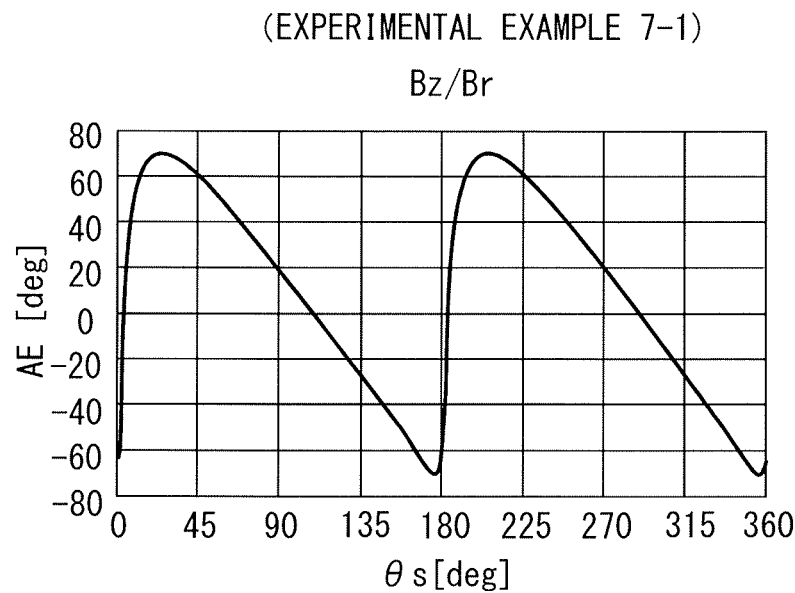
FIG. 27A is a characteristic graph of the displacement detection unit according to experimental example 7-1 which indicates an error in a rotation angle when the displacement detection unit is provided with the magnet illustrated in FIG. 21A.
Figure 27B:
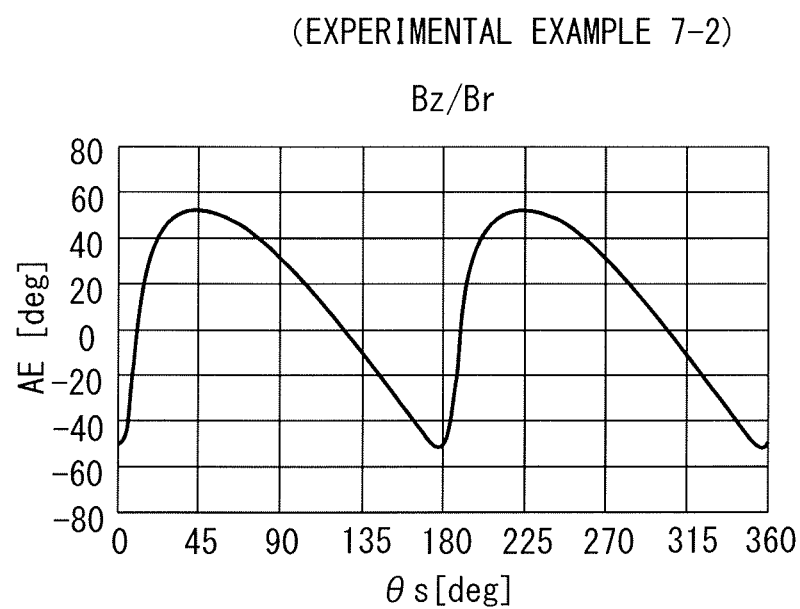
FIG. 27B is a characteristic graph of the displacement detection unit according to experimental example 7-2 which indicates an error in a rotation angle when the displacement detection unit is provided with the magnet illustrated in FIG. 21A.
Figure 27C:
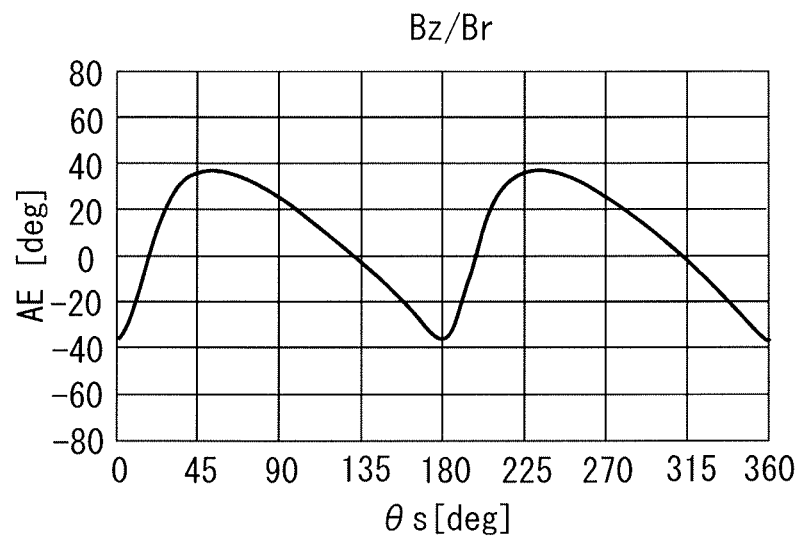
FIG. 27C is a characteristic graph of the displacement detection unit according to experimental example 7-3 which indicates an error in a rotation angle when the displacement detection unit is provided with the magnet illustrated in FIG. 21A.
Figure 27D:
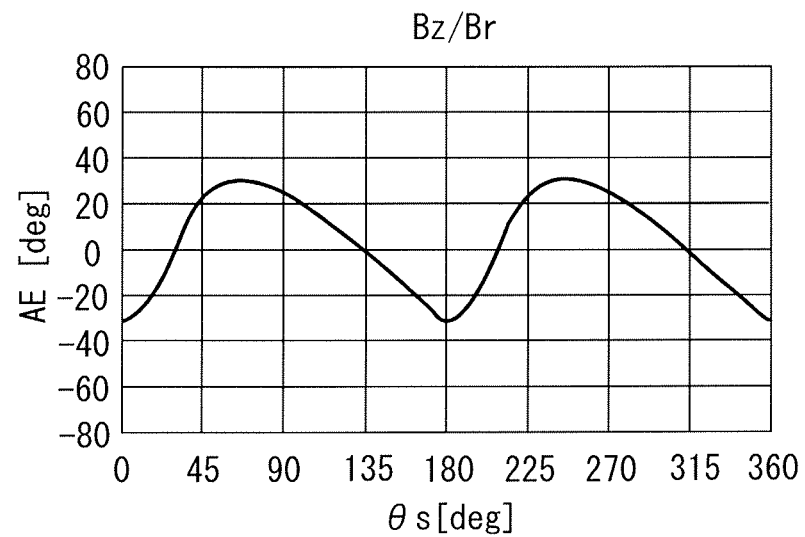
FIG. 27D is a characteristic graph of the displacement detection unit according to experimental example 7-4 which indicates an error in a rotation angle when the displacement detection unit is provided with the magnet illustrated in FIG. 21A.
Figure 28A:
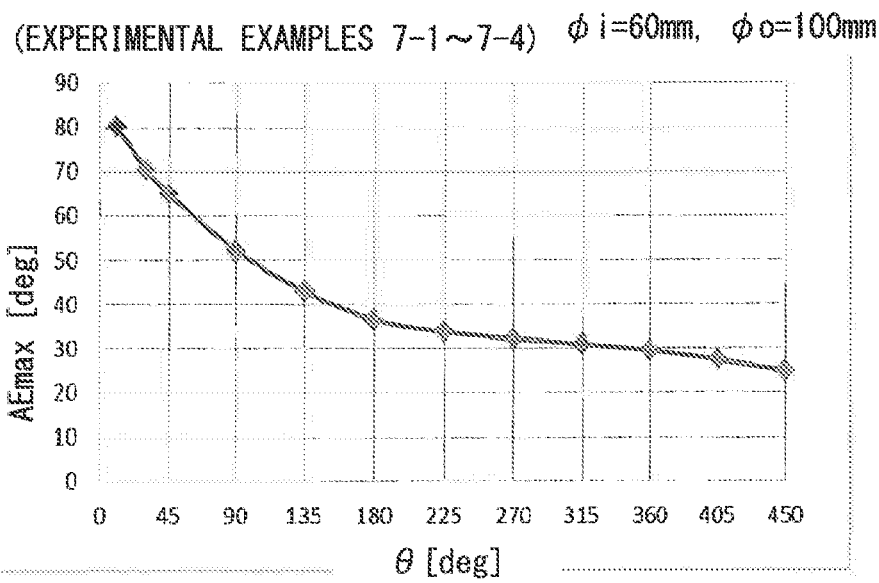
FIG. 28A is a characteristic graph of experimental examples 7-1 to 7-4 which indicates the relationship between the angle θ and the maximum of errors AE.
Figure 28B:
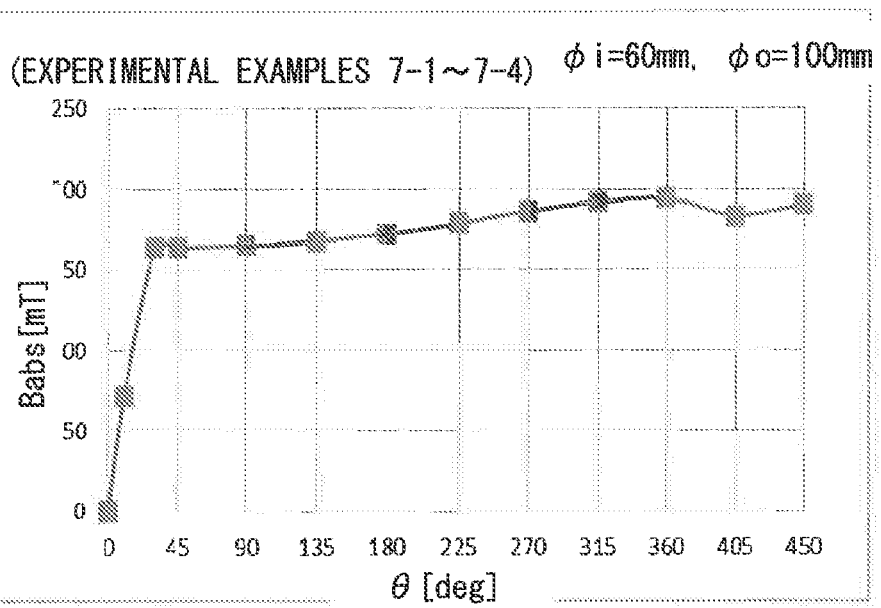
FIG. 28B is a characteristic graph of experimental examples 7-1 to 7-4 which indicates the relationship between the angle θ and a magnitude Babs of a magnetic flux density.

Displacement detection units 12 according to experimental examples 7-1 to 7-4 were evaluated using a simulation. Each displacement detection unit 12 had substantially the same configuration as that according to experimental example 5 except that the distance Rs was set to 32 mm and the distance Zs was set to 1 mm. FIGS. 26A to 28B each indicate the evaluation result. Specifically, in experimental example 7-1 of FIGS. 26A and 27A, the angle θ was set to 30°. In experimental example 7-2 of FIGS. 26B and 27B, the angle θ was set to 90°. In experimental example 7-3 of FIGS. 26C and 27C, the angle θ was set to 180°. In experimental example 7-4 of FIGS. 26D and 27D, the angle θ was set to 315°. FIG. 26A is a characteristic graph of experimental example 7-1 which indicates the relationships between the rotation angle θs of the magnet 2 relative to the sensor unit 3 and the individual magnetic flux densities Br, BΘ, and Bz detected by the sensor unit 3. FIG. 26B is a characteristic graph of experimental example 7-2 which indicates the relationships between the rotation angle θs of the magnet 2 relative to the sensor unit 3 and the individual magnetic flux densities Br, BΘ, and Bz detected by the sensor unit 3. FIG. 26C is a characteristic graph of experimental example 7-3 which indicates the relationships between the rotation angle θs of the magnet 2 relative to the sensor unit 3 and the individual magnetic flux densities Br, BΘ, and Bz detected by the sensor unit 3. FIG. 26D is a characteristic graph of experimental example 7-4 which indicates the relationships between the rotation angle θs of the magnet 2 relative to the sensor unit 3 and the individual magnetic flux densities Br, BΘ, and Bz detected by the sensor unit 3. FIG. 27A is a characteristic graph of experimental example 7-1 which indicates the error AE in the rotation angle θs determined from the magnetic flux densities Br and Bz with respect to the actual rotation angle θs of the magnet 2. FIG. 27B is a characteristic graph of experimental example 7-2 which indicates the error AE in the rotation angle θs determined from the magnetic flux densities Br and Bz with respect to the actual rotation angle θs of the magnet 2. FIG. 27C is a characteristic graph of experimental example 7-3 which indicates the error AE in the rotation angle θs determined from the magnetic flux densities Br and Bz with respect to the actual rotation angle θs of the magnet 2. FIG. 27D is a characteristic graph of experimental example 7-4 which indicates the error AE in the rotation angle θs determined from the magnetic flux densities Br and Bz with respect to the actual rotation angle θs of the magnet 2. FIG. 28A is a characteristic graph of experimental examples 7-1 to 7-4 which indicates the relationship between the angle θ and the maximum of the errors AE. FIG. 28B is a characteristic graph of experimental examples 7-1 to 7-4 which indicates the relationship between the angle θ and the magnitude Babs of the magnetic flux density. In these experimental examples, as indicated in FIG. 28A, the error AE decreases as the angle θ increases. In terms of an actual production capacity, the angle θ may be preferably set to 360° or less. In addition, as indicated in FIG. 28B, setting the angle θ to 30° or more makes it possible to sufficiently increase the magnitude Babs of the magnetic flux density. It is also confirmed in this experimental example that, when an angle that the rotation plane, or the magnetosensitive surface, of the magnetization J33 forms with the boundaries 21 and 22 falls within the range of 90°±60°, namely, the range from 30° to 150°, the error AE sufficiently decreases, as in experimental example 5. When the angle falls within the range of 90°±30°, namely, the range from 60° to 120°, the error AE further decreases.

Experimental Examples 8-1 to 8-4

Figure 29A:
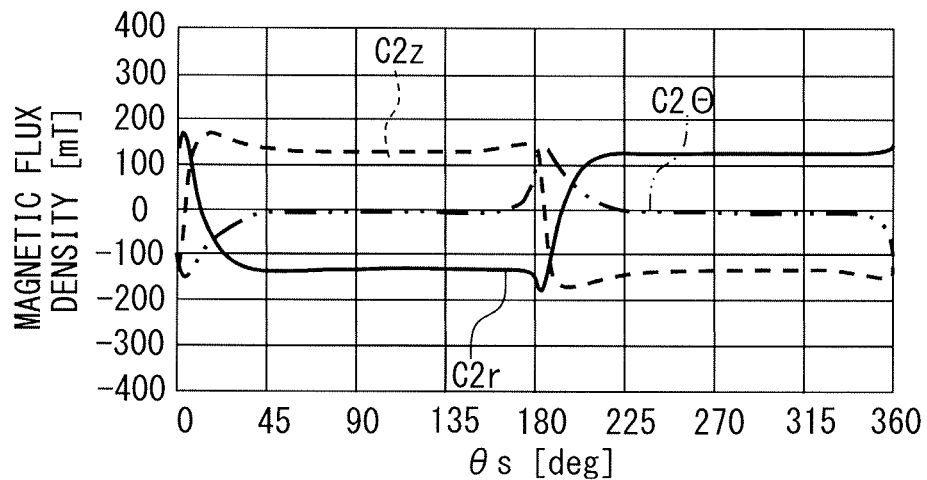
FIG. 29A is a characteristic graph of a displacement detection unit according to experimental example 8-1 which indicates the relationships between the rotation angle of the magnet relative to the magnetic detector and the individual magnetic flux densities when the displacement detection unit is provided with the magnet illustrated in FIG. 21A.
Figure 29B:
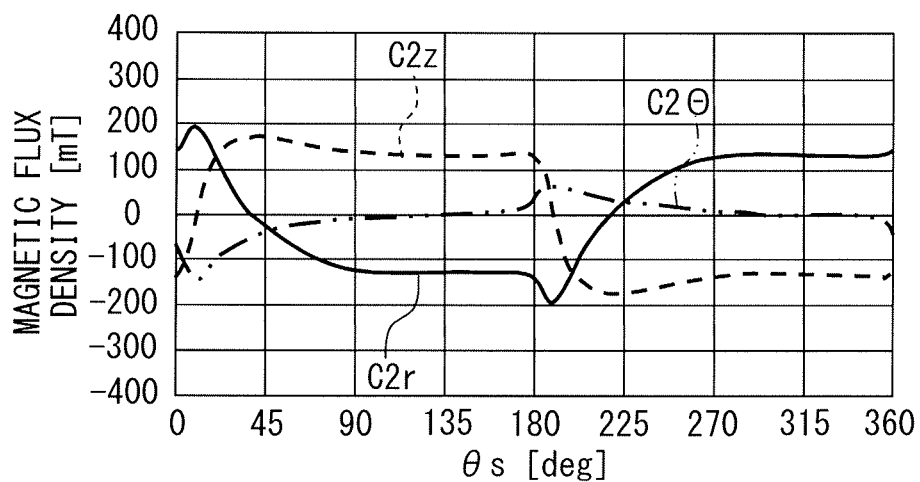
FIG. 29B is a characteristic graph of a displacement detection unit according to experimental example 8-2 which indicates the relationships between the rotation angle of the magnet relative to the magnetic detector and the individual magnetic flux densities when the displacement detection unit is provided with the magnet illustrated in FIG. 21A.
Figure 29C:
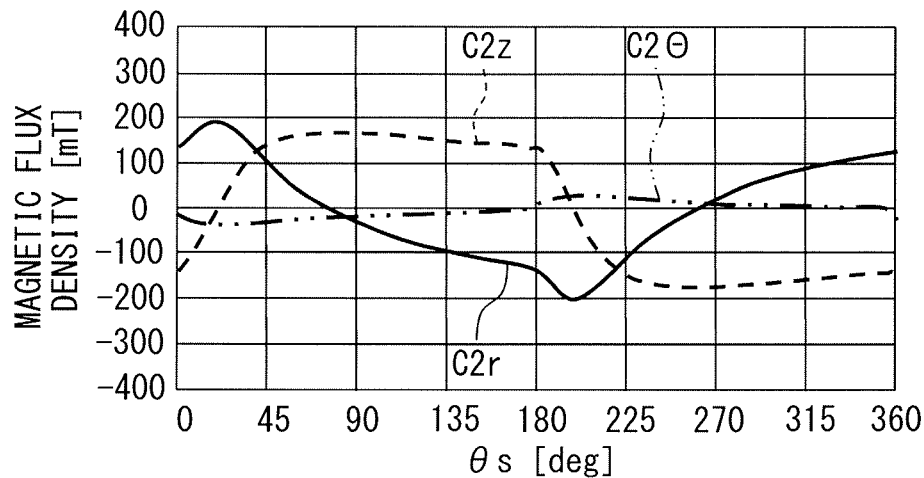
FIG. 29C is a characteristic graph of a displacement detection unit according to experimental example 8-3 which indicates the relationships between the rotation angle of the magnet relative to the magnetic detector and the individual magnetic flux densities when the displacement detection unit is provided with the magnet illustrated in FIG. 21A.
Figure 29D:
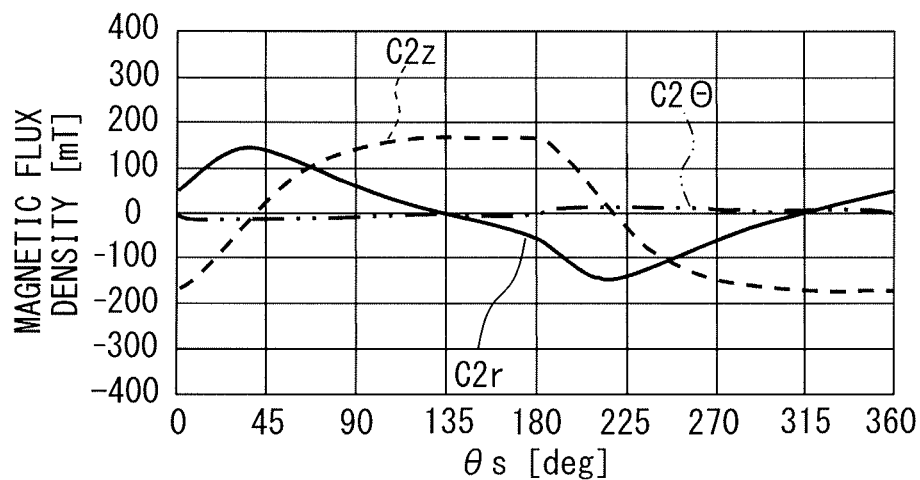
FIG. 29D is a characteristic graph of a displacement detection unit according to experimental example 8-4 which indicates the relationships between the rotation angle of the magnet relative to the magnetic detector and the individual magnetic flux densities when the displacement detection unit is provided with the magnet illustrated in FIG. 21A.
Figure 30A:
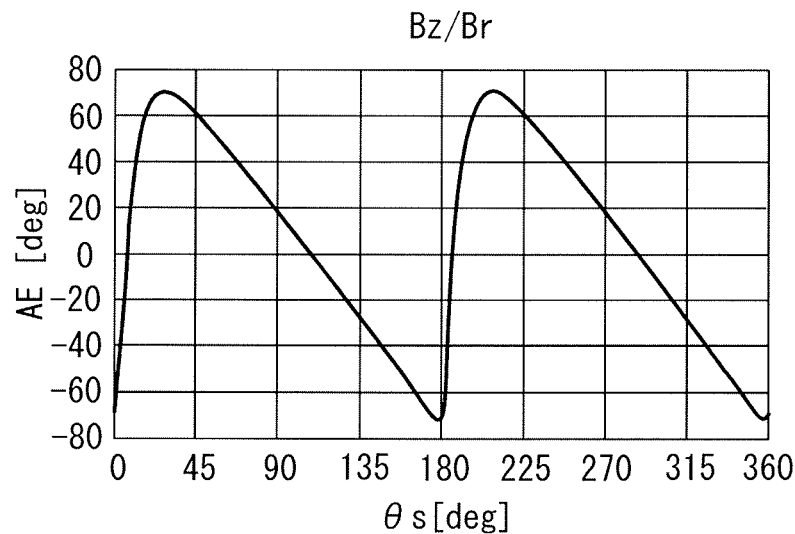
FIG. 30A is a characteristic graph of the displacement detection unit according to experimental example 8-1 which indicates an error in a rotation angle when the displacement detection unit is provided with the magnet illustrated in FIG. 21A.
Figure 30B:
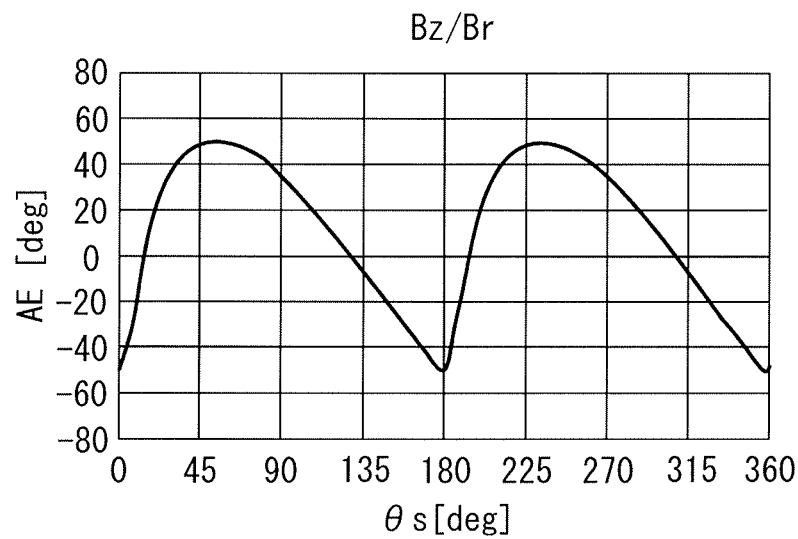
FIG. 30B is a characteristic graph of the displacement detection unit according to experimental example 8-2 which indicates an error in a rotation angle when the displacement detection unit is provided with the magnet illustrated in FIG. 21A.
Figure 30C:
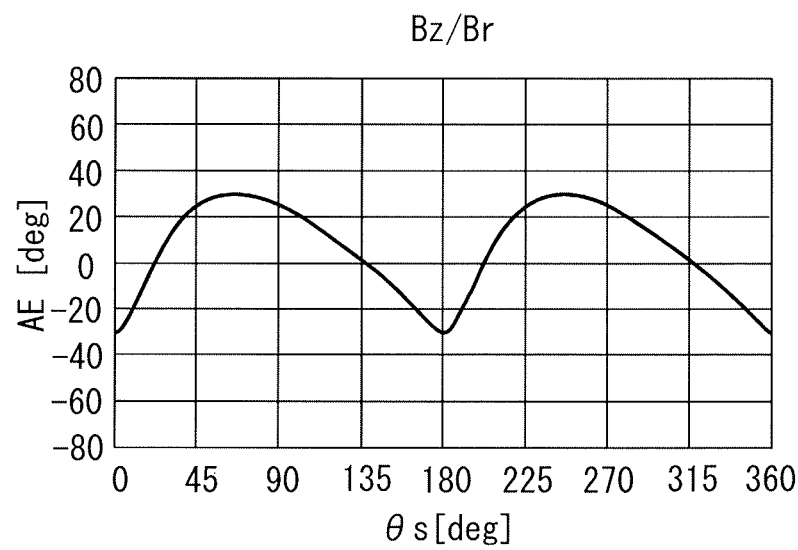
FIG. 30C is a characteristic graph of the displacement detection unit according to experimental example 8-3 which indicates an error in a rotation angle when the displacement detection unit is provided with the magnet illustrated in FIG. 21A.
Figure 30D:
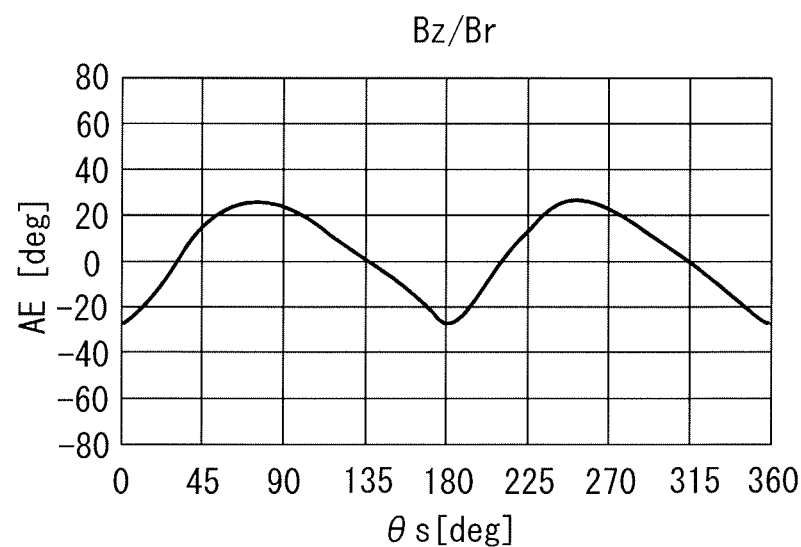
FIG. 30D is a characteristic graph of the displacement detection unit according to experimental example 8-4 which indicates an error in a rotation angle when the displacement detection unit is provided with the magnet illustrated in FIG. 21A.
Figure 31A:
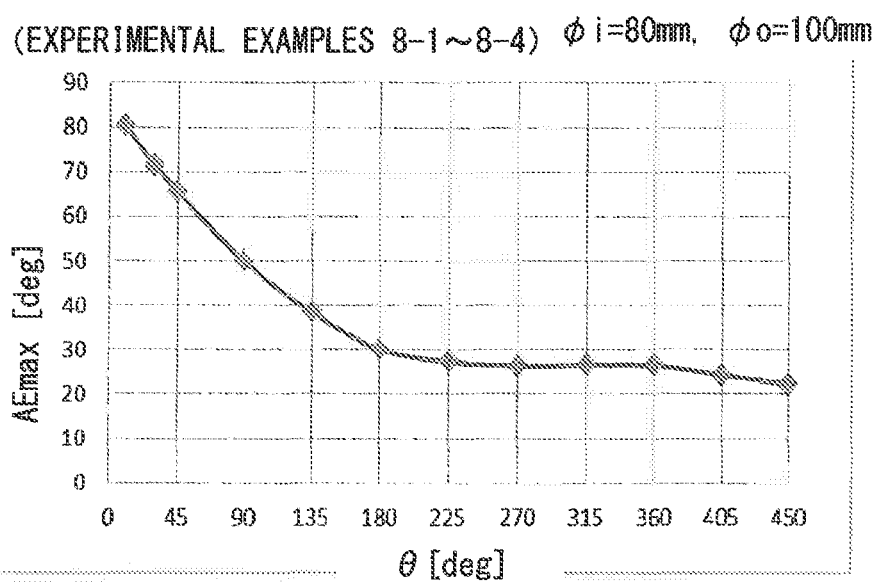
FIG. 31A is a characteristic graph of the displacement detection units according to experimental examples 8-1 to 8-4 which indicates the relationship between the angle θ and the maximum of errors AE.
Figure 31B:
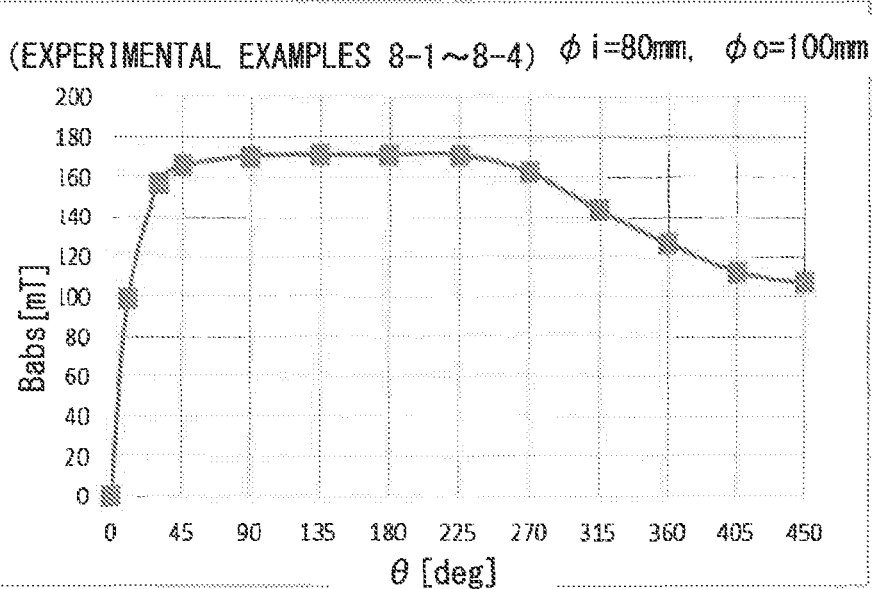
FIG. 31B is a characteristic graph of the displacement detection units according to experimental examples 8-1 to 8-4 which indicates the relationship between the angle θ and a magnitude Babs of a magnetic flux density.

Displacement detection units 12 according to experimental examples 8-1 to 8-4 were evaluated using a simulation. Each displacement detection unit 12 had substantially the same configuration as that according to experimental example 5, except that the inner diameter φi of the magnet 2 was set to 80 mm, the distance Rs was set to 32 mm, and the distance Zs was set to 1 mm. FIGS. 29A to 31B each indicate the evaluation result. Specifically, in experimental example 8-1 of FIGS. 29A and 30A, the angle θ was set to 30°. In experimental example 8-2 of FIGS. 29B and 30B, the angle θ was set to 90°. In experimental example 8-3 of FIGS. 29C and 30C, the angle θ was set to 180°. In experimental example 8-4 of FIGS. 29D and 30D, the angle θ was set to 315°. FIG. 29A is a characteristic graph of experimental example 8-1 which indicates the relationships between the rotation angle θs of the magnet 2 relative to the sensor unit 3 and the individual magnetic flux densities Br, BΘ, and Bz detected by the sensor unit 3. FIG. 29B is a characteristic graph of experimental example 8-2 which indicates the relationships between the rotation angle θs of the magnet 2 relative to the sensor unit 3 and the individual magnetic flux densities Br, BΘ, and Bz detected by the sensor unit 3. FIG. 29C is a characteristic graph of experimental example 8-3 which indicates the relationships between the rotation angle θs of the magnet 2 relative to the sensor unit 3 and the individual magnetic flux densities Br, BΘ, and Bz detected by the sensor unit 3. FIG. 29D is a characteristic graph of experimental example 8-4 which indicates the relationships between the rotation angle θs of the magnet 2 relative to the sensor unit 3 and the individual magnetic flux densities Br, BΘ, and Bz detected by the sensor unit 3. FIG. 30A is a characteristic graph of experimental example 8-1 which indicates the error AE in the rotation angle θs determined from the magnetic flux densities Br and Bz with respect to the actual rotation angle θs of the magnet 2. FIG. 30B is a characteristic graph of experimental example 8-2 which indicates the error AE in the rotation angle θs determined from the magnetic flux densities Br and Bz with respect to the actual rotation angle θs of the magnet 2. FIG. 30C is a characteristic graph of experimental example 8-3 which indicates the error AE in the rotation angle θs determined from the magnetic flux densities Br and Bz with respect to the actual rotation angle θs of the magnet 2. FIG. 30D is a characteristic graph of experimental example 8-4 which indicates the error AE in the rotation angle θs determined from the magnetic flux densities Br and Bz with respect to the actual rotation angle θs of the magnet 2. FIG. 31A is a characteristic graph of experimental examples 8-1 to 8-4 which indicates the relationship between the angle θ and the maximum of the errors AE. FIG. 31B is a characteristic graph of experimental examples 8-1 to 8-4 which indicates the relationship between the angle θ and the magnitude Babs of the magnetic flux density. In these experimental examples, as indicated in FIG. 31A, the error AE also decreases as the angle θ increases. Further, the error AE sufficiently decreases, especially when the angle θ is set to 180° or more. In terms of an actual production capacity, however, the angle θ may be preferably set to 360° or less. In addition, as indicated in FIG. 31B, setting the angle θ to 30° or more makes it possible to sufficiently increase the magnitude Babs of the magnetic flux density. It is also confirmed in this experimental example that, when an angle that the rotation plane, or the magnetosensitive surface, of the magnetization J33 forms with the boundaries 21 and 22 falls within the range of 90°±60°, namely, the range from 30° to 150°, the error AE sufficiently decreases, as in experimental example 5. When the angle falls within the range of 90°±30°, namely, the range from 60° to 120°, the error AE further decreases.

[Effect of Displacement Detection Unit 12]

In the displacement detection unit 12 according to this embodiment, the magnet 2 includes the transition section in which both the magnetic volume Vs of the S-pole region 2S and the magnetic volume Vn of the N-pole region 2N in the r direction gradually vary in the Θ direction. This enables the displacement detection unit 12 to provide an output from the sensor unit 3 in accordance with a variation in relative location between the sensor unit 3 and the magnet 2 with higher precision than a displacement detection unit that has a magnet without the above transition section. Moreover, the displacement detection unit 12 calculates the rotation angle θs on the basis of magnetic flux densities Bz in the z direction which is detected by the magnetic detection devices 4 and 5, thus achieving more precise detection.

3. Third Embodiment

[Configuration of Displacement Detection Unit 13]

Figure 32A:
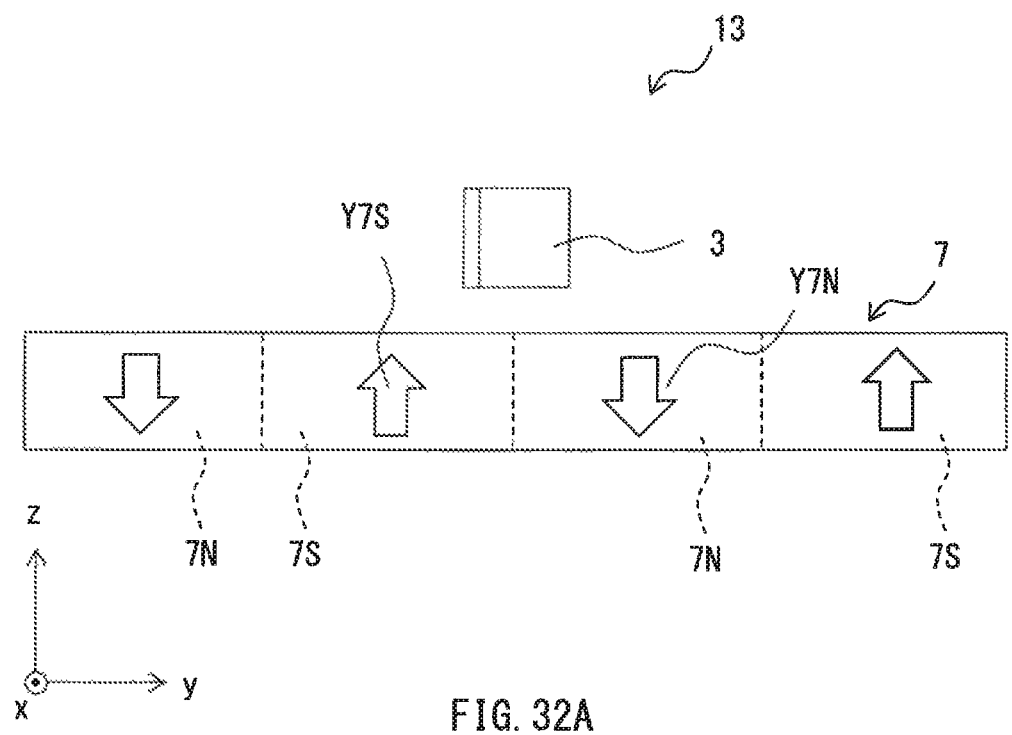
FIG. 32A is a top plan view of an overall configuration of a displacement detection unit according to a third embodiment of the technology.
Figure 32B:
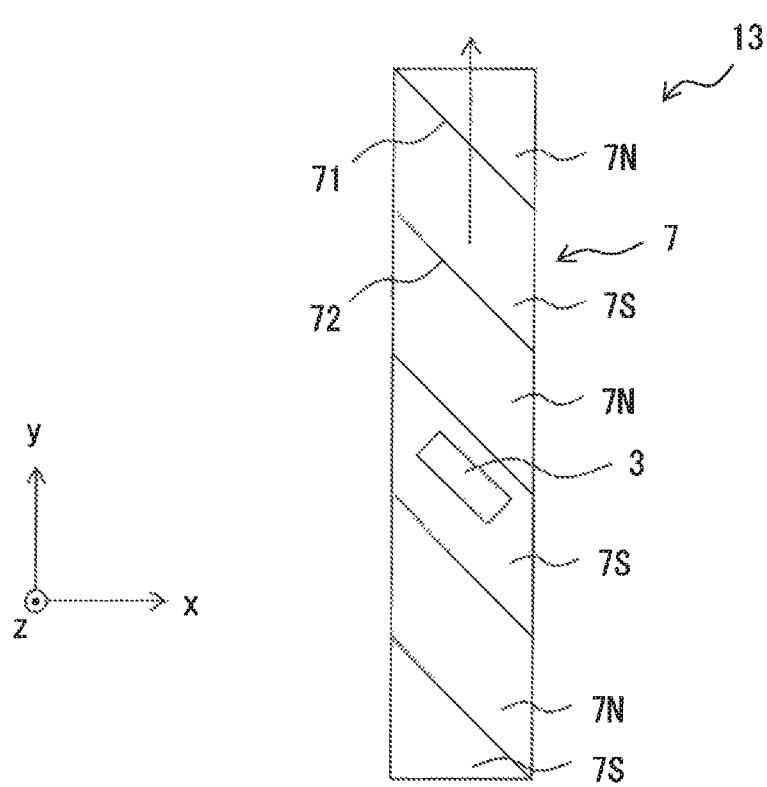
FIG. 32B is a front view of the overall configuration of the displacement detection unit illustrated in FIG. 32A.

Next, a description will be given of a configuration of a displacement detection unit 13 according to a third embodiment of the technology, with reference to FIGS. 32A and 32B. FIG. 32A is a front view of an exemplary overall configuration of the displacement detection unit 13; FIG. 32B is a top plan view of the overall configuration of the displacement detection unit 13.

As described above, both of the displacement detection unit 11 according to the first embodiment and the displacement detection unit 12 according to the second embodiment include the magnet 2 rotatable around the rotation axis 1J. However, the displacement detection unit 13 according to this embodiment includes a magnet 7 that has a rod-like shape and extends in a longitudinal direction; the longitudinal direction may be a y direction, and the rod-like shape may be a rectangular parallelepiped shape, for example.

Furthermore, the displacement detection unit 13 may calculate a displacement of the magnet 7 relative to the sensor unit 3 in the y direction. The displacement detection unit 13 may have substantially the same configuration as those of displacement detection units 11 and 12, except that the magnet 7 is provided instead of the magnet 2. Other constituent elements in the displacement detection unit 13 will not be described accordingly. The magnet 7 may correspond to a "magnet" in one specific but non-limiting embodiment of the technology.

The magnet 7 includes S-pole regions 7S and N-pole regions 7N; each S-pole region 7S is polarized into the S pole, and each N-pole region 7N is polarized into the N pole. The S-pole regions 7S and the N-pole regions 7N are separated from one another by boundaries 71 and 72 and may be alternately disposed in the y direction. An arrow denoted by a character Y7S within each S-pole region 7S and an arrow denoted by a character Y7N within each N-pole region 7N indicate the orientations of major magnetic fluxes of the magnet 7. The magnet 7 includes a transition section in which the S-pole regions 7S and the N-pole regions 7N coexist in a width direction orthogonal to the y or longitudinal direction; the width direction is referred to below as an x direction. In the transition section, the magnetic volume Vs of each S-pole region 7S and the magnetic volume Vn of each N-pole region 7N in the x direction gradually vary in the y direction. In the transition section, thus, the boundaries 71 and 72 are angled in both the y and x directions.

In the displacement detection unit 13, the substrate 30 in the sensor unit 3 may be disposed so as to be orthogonal to the x-y plane. In other words, the magnetization pinned layer 31, the intermediate layer 32, and the magnetization free layer 33 that are constituent elements of each MR device 41 in the magnetic detection device 4 may be laid out in the plane orthogonal to the x-y plane. Thus, the orientation of the magnetization J33 of the magnetization free layer 33 may be rotatable in the plane orthogonal to the x-y plane or parallel to the z direction. It is to be noted that the magnetization J33 of the magnetization free layer 33 may also respond to a variation in a magnetic field in the x-y plane.

[Operation and Workings of Displacement Detection Unit 13]

Figure 33:
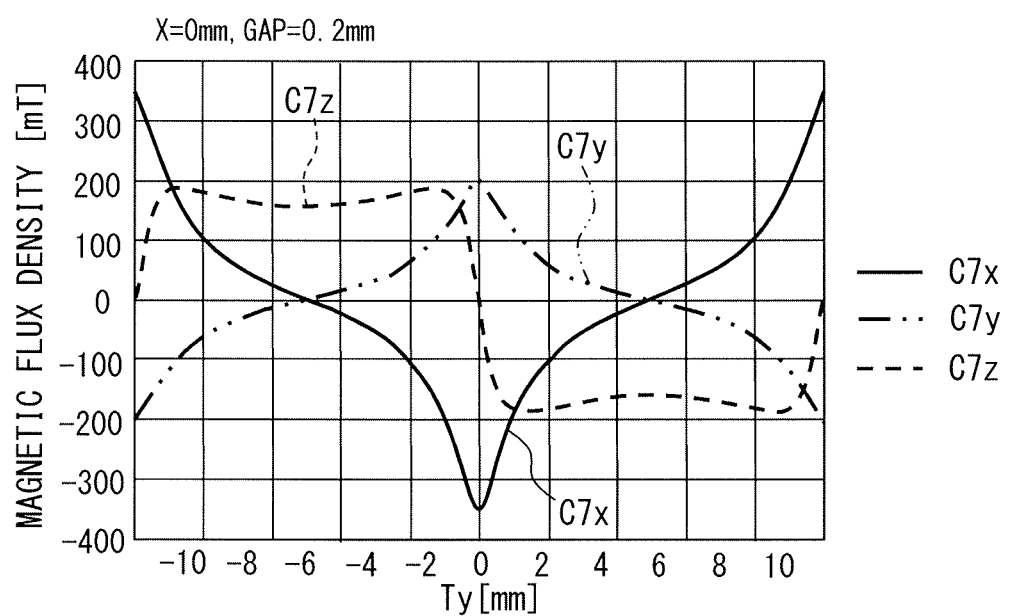
FIG. 33 is a characteristic graph of the displacement detection unit, illustrated in FIG. 32A, according to experimental example 9 which indicates the relationships between a displacement of the magnet relative to the magnetic detector and the individual magnetic flux densities.

The displacement detection unit 13 may be able to cause the sensor unit 3 to detect a variation in the magnetic flux density Bip in a predetermined direction within the x-y plane and a variation in the magnetic flux density Bz in the z direction, and to cause the arithmetic circuit 6 to determine a displacement of the magnet 7. When the magnet 7 moves in the +y direction, for example, a magnetic field reaches the sensor unit 3 in the displacement detection unit 13, and the MR devices 41 in the sensor unit 3 may detect variations in x-direction and z-direction components in the magnetic field. Subsequently, the bridge circuit 40 may output the signals e1 and e2, which then may be supplied to the arithmetic circuit 6. More specifically, the movement of the magnet 7 may cause variations in densities Bx, By, and Bz of magnetic flux produced by the magnet 7, which are represented, respectively, by curves C7x, C7y, and C7z in FIG. 33, for example. In response, the magnetic detection device 4 may detect the variations in the magnetic flux densities Bx and Bz and output the signals e1 and e2, which then are supplied to the arithmetic circuit 6, as illustrated in FIG. 3B. Thereafter, the arithmetic circuit 6 determines a displacement of the magnet 7. FIG. 33 is a characteristic graph of the displacement detection unit 13 which indicates the relationships between a displacement Ty of the magnet 7 relative to the sensor unit 3 and the individual magnetic flux densities Bx, By, and Bz. Specifically, FIG. 33 illustrates simulation data obtained under the conditions described below. A thickness of the magnet 7, or a dimension of the magnet 7 in the z direction, was set to 2 mm. A width of the magnet 7, or a dimension of the magnet 7 in the x direction, was set to 10 mm. A length of the magnet 7 was set to a value that was sufficiently larger than the thickness and width of the magnet 7 and does not affect an operation of the sensor unit 3. Specifically, for example, a length of the magnet 7 was set to 100 mm or more. The distance Zs between the surface of the magnet 7 in the z direction and the magnetic detection device 4 was set to 0.2 mm. An angle at which each of the boundaries 71 and 72 was angled in the y direction was set to 30°.

Figure 34A:
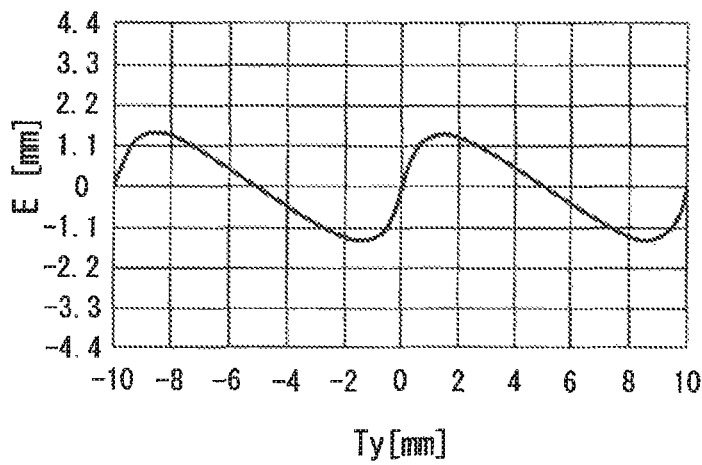
FIG. 34A is a characteristic graph of the displacement detection unit, illustrated in FIG. 32A, according to experimental example 9-1 which indicates an error in a displacement determined from the magnetic flux densities detected by the magnetic detector with respect to an actual displacement of the magnet.
Figure 34B:
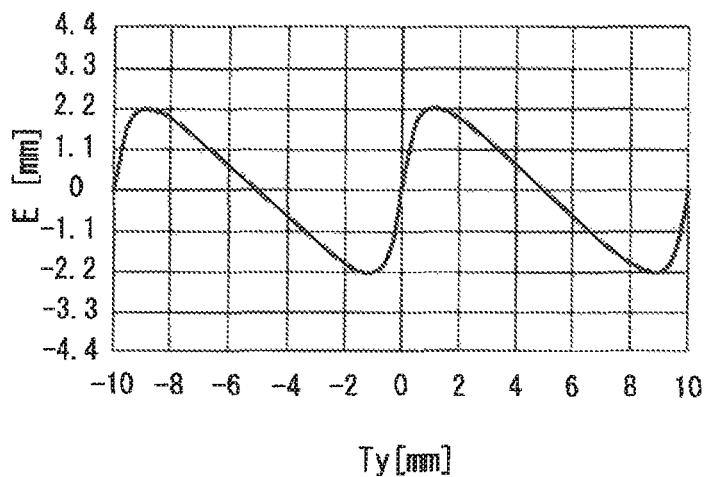
FIG. 34B is a characteristic graph of the displacement detection unit, illustrated in FIG. 32A, according to experimental example 9-2 which indicates an error in a displacement determined from the magnetic flux densities detected by the magnetic detector with respect to an actual displacement of the magnet.

FIG. 34A is a characteristic graph of the displacement detection unit 13 according to experimental example 9-1 which indicates an error E [mm] in the displacement Ty [mm] determined from the magnetic flux densities Bx, By, and Bz detected by the magnetic detection device 4 with respect to the actual displacement Ty [mm] of the magnet 7. FIG. 34B is a characteristic graph of the displacement detection unit 13 according to experimental example 9-2 which indicates the error E [mm] in the displacement Ty [mm] determined from the magnetic flux densities Bx, By, and Bz detected by the magnetic detection device 4 with respect to the actual displacement Ty [mm] of the magnet 7. More specifically, in FIG. 34A, the error E [mm] caused in experimental example 9-1 is calculated using the magnetic flux densities Bz and Bx. In FIG. 34B, the error E [mm] caused in experimental example 9-2 is calculated using the magnetic flux densities Bz and By. As indicated in both FIGS. 34A and 34B, the error E varies, i.e., increases or decreases, periodically with the actual displacement Ty. A similar tendency was also prominent when the error E was calculated using magnetic flux densities By and Bx. However, the error E calculated using the magnetic flux density Bz as in experimental examples 9-1 and 9-2 tends to be reduced to a smaller value.

In the displacement detection unit 13 according to this embodiment, the magnet 7 includes the transition section in which both the magnetic volume Vs of the S-pole region 7S and the magnetic volume Vn of the N-pole region 7N in the width or x direction gradually vary in the y direction. This enables the displacement detection unit 13 to provide an output from the sensor unit 3 in accordance with a variation in relative location between the sensor unit 3 and the magnet 7 with higher precision than a displacement detection unit that has a magnet without the above transition section. Consequently, it is possible to detect a displacement of the magnet 7 relative to the sensor unit 3 in the y direction with high precision. The magnet 7 may have nonlinear boundaries 71 and 72, which are similar to those of the magnet 2. In experimental example 9-1, for example, as indicated in FIG. 34A, the error E largely increases to the positive side within the ranges in which the displacement Ty varies from about −9 mm to −8 mm and from about +1 mm to +2 mm. Furthermore, the error E largely increases to the negative side within the ranges in which the displacement Ty varies from about −2 mm to −1 mm and from about +7 mm to +9 mm. Therefore, the shapes of the boundaries 71 and 72 may be altered such that a change in the magnetic field, or a change from the S pole to the N pole or from the N pole to the S pole, delays within the ranges in which the displacement Ty varies from about −9 mm to −8 mm and from about +1 mm to +2 mm and such that a change in the magnetic field, or a change from the S pole to the N pole or from the N pole to the S pole, accelerates within the ranges in which the displacement Ty varies from about −2 mm to −1 mm and from about +7 mm to +9 mm. Altering the shapes of the boundaries 71 and 72 in this manner may be able to further reduce the error E.

4. Other Modifications

The technology has been described using some embodiments and modifications; however, the technology is not limited to these embodiments and modifications, and other modifications may be possible. As one example, a shape of a magnet according to the technology is not limited to a circular or rod-like shape as in the foregoing embodiments. Alternately, a shape of the magnet may be a disc-like or other shape. In addition, the magnet may be provided with a non-magnetized portion and, on the whole, may have any shape other than circular, disc-like, and rod-like shapes.

In the foregoing third embodiment and its modification, the S-pole regions and the N-pole regions are alternately disposed in a first direction, which is the longitudinal direction of the magnet, with no gaps therebetween; however, the technology is not limited to this example. As one alternative example, a magnet according to an embodiment of the technology may include a non-polarized or nonmagnetic section between the S-pole and N-pole regions. As another alternative example, the S-pole region and the N-pole region may coexist in a third direction, which is the thickness direction of the magnet, in the vicinity of their boundaries. As yet another alternative example, a portion of the S-pole region in which the intensity of its magnetization gradually varies (increases or decreases) and a portion of the N-pole region in which the intensity of its magnetization gradually varies (increases or decreases) may be continuously disposed in the vicinity of their boundaries.

Figure 41:
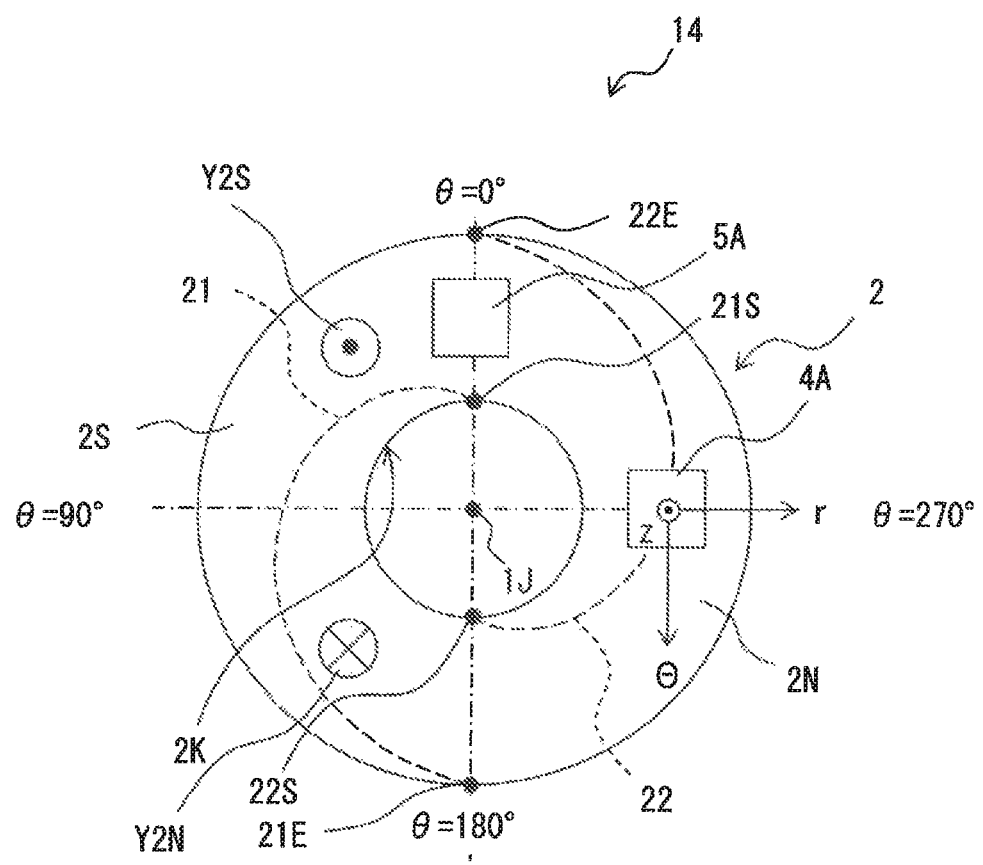
FIG. 41 is a front view of an overall configuration of a displacement detection unit according to a modification of the technology.

In the foregoing embodiments and modifications, a single magnetic detector, which may serve as the sensor unit 3, is provided; however, any number of magnetic detectors, including two or more magnetic detectors, may be provided as one embodiment of the technology. As one alternative example, as illustrated in FIG. 41, a displacement detection unit 14 may include a magnetic detection device 4A and a magnetic detection device 5A disposed at different locations in a rotational direction of the magnet 2, or in the Θ direction. In this case, the magnetic detection devices 4A and 5A may be positioned away from each other by an electrical angle of 90°. However, the electrical angle between the magnetic detection devices 4A and 5A is not limited to 90° and may be set to another value. Moreover, in the displacement detection unit 14, for example, the magnetic detection device 4A may detect a change in a magnetic field component in any predetermined direction within the Θ-r plane and then may output the detected change in the one-direction component as a first signal. Likewise, the magnetic detection device 5B may detect a change in the magnetic field component in another predetermined direction and then may output the detected change in the one-direction component as a second signal. In this case, since the magnetic detection devices 5A and 5B may be disposed at different locations, the first and second signal may differ in phase. Then, the arithmetic circuit 6 (not illustrated in FIG. 41) may calculate a displacement of the magnet 2 in the Θ direction on the basis of the first and second signals.

Figure 42:
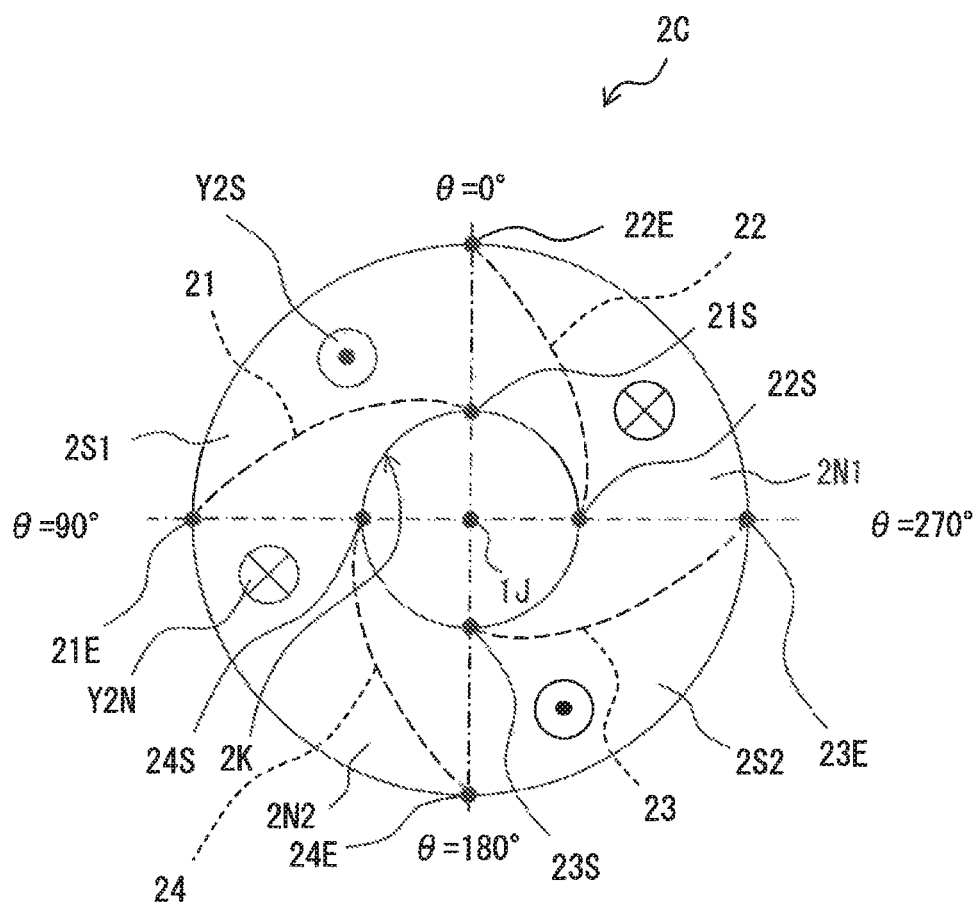
FIG. 42 is a plan view of an exemplary configuration of a multipole magnet according to another modification of the technology.

In the foregoing first and second embodiments and their modifications, the single S-pole region and the single N-pole region are provided in the magnet; however, two or more S-pole regions and two or more N-pole regions may be provided, for example, as in a magnet 2C illustrated in FIG. 42. More specifically, the magnet 2C may include an S-pole region 2S1, an N-pole region 2N1, an S-pole region 2S2, and an N-pole region 2N2 disposed in the rotational direction Θ in this order. The S-pole region 2S1 may be separated from the N-pole region 2N1 by the boundary 22; the N-pole region 2N1 may be separated from the S-pole region 2S2 by a boundary 23; the S-pole region 2S2 may be separated from the N-pole region 2N2 by a boundary 24; and the N-pole region 2N2 may be separated from the S-pole region 2S1 by the boundary 21. These S-pole region 2S1, N-pole region 2N1, S-pole region 2S2, and N-pole region 2N2 may be preferably disposed at regular intervals.

Moreover, the technology encompasses any possible combination of some or all of the various embodiments and the modification examples described herein and incorporated herein.

It is possible to achieve at least the following configurations from the above-described example embodiments of the technology.

(1) A displacement detection unit including:
a magnet that includes a first magnetic-pole region polarized into a south pole and a second magnetic-pole region polarized into a north pole, and generates a magnetic field around the magnet; and
a magnetic detector that is movable relative to the magnet in a first direction, and detects a change in the magnetic field and thereby detects a displacement of the magnet in the first direction,
the magnet including a transition section in which a ratio of a magnetic volume of the second magnetic-pole region in a second direction to a magnetic volume of the first magnetic-pole region in the second direction gradually varies in the first direction, the second direction being orthogonal to the first direction.

(2) The displacement detection unit according to (1), wherein
the magnet has a thickness that is substantially uniform in a third direction, the third direction being orthogonal to both the first direction and the second direction, and
the transition section has a ratio with respect to a cross section of the transition section, a surface of the transition section, or both of the cross section and the surface, the ratio being a ratio of a length of a line segment of the second magnetic-pole region in the second direction to a length of a line segment of the first magnetic-pole region in the second direction and gradually varying in the first direction, the cross section and the surface of the transition section each being parallel to a plane that is orthogonal to the third direction.

(3) The displacement detection unit according to (1) or (2), wherein a boundary between the first magnetic-pole region and the second magnetic-pole region extends while being angled in both the first direction and the second direction.

(4) The displacement detection unit according to any one of (1) to (3), wherein, in the transition section, the ratio of the magnetic volume of the second magnetic-pole region in the second direction to the magnetic volume of the first magnetic-pole region in the second direction monotonically increases in the first direction or monotonically decreases in the first direction.

(5) The displacement detection unit according to any one of (1) to (4), wherein the magnet has a cross section, the cross section being orthogonal to the first direction and having a shape and area that are substantially uniform in the first direction.

(6) The displacement detection unit according to any one of (1) to (5), wherein the magnetic detector is provided at a location that is overlapped with the magnet in a third direction, the third direction being orthogonal to both the first direction and the second direction.

(7) The displacement detection unit according to any one of (1) to (6), wherein the magnetic detector includes a magneto-resistive effect device containing magnetization, the magnetization being rotatable in a plane that contains a third direction, the third direction being orthogonal to both the first direction and the second direction.

(8) The displacement detection unit according to any one of (1) to (7), wherein the magnetic detector includes:
a first sensor that detects a change in one-direction component of the change in the magnetic field, and outputs the change in the detected one-direction component as a first signal;
a second sensor that detects the change in the one-direction component, and outputs the change in the detected one-direction component as a second signal; and
an arithmetic circuit that calculates the displacement of the magnet in the first direction, on a basis of the first signal and the second signal.

(9) The displacement detection unit according to (8), wherein the first sensor and the second sensor are disposed at locations that are different from each other in the first direction.

(10) The displacement detection unit according to (8) or (9), wherein the first sensor and the second sensor each include one of a magnetic tunnel junction device that includes a magnetic tunnel junction film and a giant magneto resistive effect device that includes a giant magneto resistive effect film.

(11) The displacement detection unit according to any one of (1) to (10), wherein
the magnet includes one of a circular member with its circumferential direction coinciding with the first direction and a disc-shaped member with its circumferential direction coinciding with the first direction, and
the magnet is rotatable in the first direction around a first axis that extends in a third direction, the third direction being orthogonal to both the first direction and the second direction.

(12) The displacement detection unit according to (11), wherein
the circular member includes an outer-circumferential rim, an inner-circumferential rim, a first boundary, and a second boundary, each of the first magnetic-pole region and the second magnetic-pole region adjoining to both the first boundary and the second boundary, and
the first axis is present between a first point and a second point and between a third point and a fourth point, the first boundary intersecting the outer-circumferential rim at the first point, the second boundary intersecting the outer-circumferential rim at the second point, the first boundary intersecting the inner-circumferential rim at the third point, the second boundary intersecting the inner-circumferential rim at the fourth point.

(13) The displacement detection unit according to (11) or (12), wherein the magnetic detector detects both a change in an orthogonal component of the magnetic field and a change in a parallel component of the magnetic field, the orthogonal component being orthogonal to the first axis, the parallel component being along the first axis.

(14) The displacement detection unit according to (13), wherein the magnetic detector detects a change in a first direction component in the first direction as the orthogonal component.

(15) The displacement detection unit according to (13), wherein the magnetic detector detects a change in a second direction component in the second direction as the orthogonal component.

(16) The displacement detection unit according to any one of (11) to (15), wherein the following conditional expression (1) is satisfied:

$$R(\theta)=(\theta/180)\times(\phi 0-\phi i)/2+(\phi i/2) \quad (1)$$

where
$R(\theta)$ denotes a distance from the first axis to any point on a boundary between the first magnetic-pole region and the second magnetic-pole region,
$\theta$ denotes a central angle in degree that a reference line forms with a line, the line coupling any point on the boundary to the first axis, the reference line being zero degree and defined as a line that couples the first axis to an inner-circumferential edge of the boundary,
$\phi i$ denotes an inner diameter of the magnet, and
$\phi 0$ denotes an outer diameter of the magnet.

(17) The displacement detection unit according to any one of (11) to (15), wherein the following conditional expression (2) is satisfied:

$$R(\theta)=-\alpha\cdot\cos(2\theta)-(\theta/180)\times(\phi 0-\phi i)/2+(\phi 0/2) \quad (2)$$

where
$R(\theta)$ denotes a distance from the first axis to any point on a boundary between the first magnetic-pole region and the second magnetic-pole region,
$\theta$ denotes a central angle in degree that a reference line forms with a line, the line coupling any point on the boundary to the first axis, the reference line being zero degree and defined as a line that couples the first axis to an inner-circumferential edge of the boundary,
$\alpha$ denotes a constant,
$\phi i$ denotes an inner diameter of the magnet, and
$\phi 0$ denotes an outer diameter of the magnet.

(18) The displacement detection unit according to any one of (1) to (17), wherein
the first magnetic-pole region includes a plurality of first magnetic-pole regions, and the second magnetic-pole region includes a plurality of second magnetic-pole regions, and
the first magnetic-pole regions and the second magnetic-pole regions are alternately disposed in the first direction.

(19) The displacement detection unit according to any one of (1) to (10), wherein the magnet has one of a rod-shaped member extending linearly in the first direction and a plate-shaped member extending linearly in the first direction.

(20) The displacement detection unit according to (19), wherein
the first magnetic-pole region includes a plurality of first magnetic-pole regions, the second magnetic-pole region includes a plurality of second magnetic-pole regions, and the first magnetic-pole regions and the second magnetic-pole regions are alternately disposed in the first direction,
the magnet has a plurality of boundaries to which the first magnetic-pole regions and the second magnetic-pole regions adjoin, and
the plurality of boundaries extend in a direction that intersects both the first direction and the second direction.

(21) The displacement detection unit according to (19) or (20), wherein the magnetic detector detects a change in an orthogonal component of the magnetic field and a change in an in-plane component of the magnetic field, the orthogonal component being orthogonal to both the first direction and the second direction, the in-plane component being in a plane that contains the first direction and the second direction.

(22) A magnet including:
    a first magnetic-pole region extending in a first direction, and polarized into a south pole;
    a second magnetic-pole region extending in the first direction, and polarized into a north pole; and
    a transition section in which a ratio of a magnetic volume of the second magnetic-pole region in a second direction to a magnetic volume of the first magnetic-pole region in the second direction gradually varies in the first direction, the second direction being orthogonal to the first direction.

(23) The magnet according to (22), wherein a boundary between the first magnetic-pole region and the second magnetic-pole region extends while being angled in both the first direction and the second direction.

(24) The magnet according to (22) or (23), wherein the magnet includes one of a circular member with its circumferential direction coinciding with the first direction and a disc-shaped member with its circumferential direction coinciding with the first direction.

(25) The magnet according to any one of (22) to (24), wherein the first magnetic-pole region includes a plurality of first magnetic-pole regions, the second magnetic-pole region includes a plurality of second magnetic-pole regions, and the first magnetic-pole regions and the second magnetic-pole regions are alternately disposed in the first direction.

The displacement detection unit according to one embodiment of the technology includes the magnet provided to be movable relative to the magnetic detector in the first direction. In the transition section of this magnet, the ratio of the magnetic volume of the first magnetic-pole region to the magnetic volume of the second magnetic-pole region in the second direction, which is orthogonal to the first direction, gradually varies in the first direction. The magnet provides an output from the magnetic detector in accordance with a relative location between the magnetic detector and the magnet with higher precision than a displacement detection unit that has a magnet without the above transition section. The magnet according to one embodiment of the technology is provided suitably in the displacement detection unit.

According to the above magnet according to one embodiment and the above displacement detection unit according to one embodiment of the technology, provision of the transition section in which the ratio between magnetic volumes of magnetic-pole regions having opposite polarities gradually varies in the first direction makes it possible to detect a movement or displacement of a magnet relative to the magnetic detector with high precision.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A displacement detection unit comprising:
    a magnet that includes a first magnetic-pole region polarized into a south pole and a second magnetic-pole region polarized into a north pole, and generates a magnetic field around the magnet; and
    a magnetic detector arranged such that the magnet is movable relative to the magnetic detector in a first direction, and detects a change in the magnetic field and thereby detects a displacement of the magnet in the first direction,
    the magnet including a transition section in which a ratio of a magnetic volume of the second magnetic-pole region in a second direction to a magnetic volume of the first magnetic-pole region in the second direction gradually varies in the first direction, the second direction being orthogonal to the first direction, and
    wherein the magnetic detector includes a magneto-resistive effect device containing magnetization, the magnetization being rotatable in a plane that contains a third direction, the third direction being orthogonal to both the first direction and the second direction.

2. The displacement detection unit according to claim 1, wherein
    the magnet has a thickness that is substantially uniform in a third direction, the third direction being orthogonal to both the first direction and the second direction, and
    the transition section has a ratio with respect to a cross section of the transition section, a surface of the transition section, or both of the cross section and the surface, the ratio being a ratio of a length of a line segment of the second magnetic-pole region in the second direction to a length of a line segment of the first magnetic-pole region in the second direction and gradually varying in the first direction, the cross section and the surface of the transition section each being parallel to a plane that is orthogonal to the third direction.

3. The displacement detection unit according to claim 1, wherein a boundary between the first magnetic-pole region and the second magnetic-pole region extends while being angled in both the first direction and the second direction.

4. The displacement detection unit according to claim 1, wherein, in the transition section, the ratio of the magnetic volume of the second magnetic-pole region in the second direction to the magnetic volume of the first magnetic-pole region in the second direction monotonically increases in the first direction or monotonically decreases in the first direction.

5. The displacement detection unit according to claim 1, wherein the magnet has a cross section, the cross section being orthogonal to the first direction and having a shape and area that are substantially uniform in the first direction.

6. The displacement detection unit according to claim 1, wherein the magnetic detector is provided at a location that is overlapped with the magnet in a third direction, the third direction being orthogonal to both the first direction and the second direction.

7. The displacement detection unit according to claim 1, wherein the magnetic detector includes:
- a first sensor that detects a change in one-direction component of the change in the magnetic field, and outputs the change in the detected one-direction component as a first signal;
- a second sensor that detects the change in the one-direction component, and outputs the change in the detected one-direction component as a second signal; and
- an arithmetic circuit that calculates the displacement of the magnet in the first direction, on a basis of the first signal and the second signal.

8. The displacement detection unit according to claim 7, wherein the first sensor and the second sensor are disposed at locations that are different from each other in the first direction.

9. The displacement detection unit according to claim 7, wherein the first sensor and the second sensor each comprise one of a magnetic tunnel junction device that includes a magnetic tunnel junction film and a giant magneto resistive effect device that includes a giant magneto resistive effect film.

10. The displacement detection unit according to claim 1, wherein
- the magnet comprises one of a circular member with its circumferential direction coinciding with the first direction and a disc-shaped member with its circumferential direction coinciding with the first direction, and
- the magnet is rotatable in the first direction around a first axis that extends in a third direction, the third direction being orthogonal to both the first direction and the second direction.

11. The displacement detection unit according to claim 10, wherein
- the circular member includes an outer-circumferential rim, an inner-circumferential rim, a first boundary, and a second boundary, each of the first magnetic-pole region and the second magnetic-pole region adjoining to both the first boundary and the second boundary, and
- the first axis is present between a first point and a second point and between a third point and a fourth point, the first boundary intersecting the outer-circumferential rim at the first point, the second boundary intersecting the outer-circumferential rim at the second point, the first boundary intersecting the inner-circumferential rim at the third point, the second boundary intersecting the inner-circumferential rim at the fourth point.

12. The displacement detection unit according to claim 10, wherein the magnetic detector detects both a change in an orthogonal component of the magnetic field and a change in a parallel component of the magnetic field, the orthogonal component being orthogonal to the first axis, the parallel component being along the first axis.

13. The displacement detection unit according to claim 12, wherein the magnetic detector detects a change in a first direction component in the first direction as the orthogonal component.

14. The displacement detection unit according to claim 12, wherein the magnetic detector detects a change in a second direction component in the second direction as the orthogonal component.

15. The displacement detection unit according to claim 10, wherein the following conditional expression (1) is satisfied:

$$R(\theta)=(\theta/180)\times(\phi 0-\phi i)/2+(\phi i/2) \quad (1)$$

where
- $R(\theta)$ denotes a distance from the first axis to any point on a boundary between the first magnetic-pole region and the second magnetic-pole region,
- $\theta$ denotes a central angle in degree that a reference line forms with a line, the line coupling any point on the boundary to the first axis, the reference line being zero degree and defined as a line that couples the first axis to an inner-circumferential edge of the boundary,
- $\phi i$ denotes an inner diameter of the magnet, and
- $\phi 0$ denotes an outer diameter of the magnet.

16. The displacement detection unit according to claim 10, wherein the following conditional expression (2) is satisfied:

$$R(\theta)=-\alpha\cdot\cos(2\theta)-(\theta/180)\times(\phi 0-\phi i)/2+(\phi 0/2) \quad (2)$$

where
- $R(\theta)$ denotes a distance from the first axis to any point on a boundary between the first magnetic-pole region and the second magnetic-pole region,
- $\theta$ denotes a central angle in degree that a reference line forms with a line, the line coupling any point on the boundary to the first axis, the reference line being zero degree and defined as a line that couples the first axis to an inner-circumferential edge of the boundary,
- $\alpha$ denotes a constant,
- $\phi i$ denotes an inner diameter of the magnet, and
- $\phi 0$ denotes an outer diameter of the magnet.

17. The displacement detection unit according to claim 1, wherein
- the first magnetic-pole region comprises a plurality of first magnetic-pole regions, and the second magnetic-pole region comprises a plurality of second magnetic-pole regions, and
- the first magnetic-pole regions and the second magnetic-pole regions are alternately disposed in the first direction.

18. The displacement detection unit according to claim 1, wherein the magnet has one of a rod-shaped member extending linearly in the first direction and a plate-shaped member extending linearly in the first direction.

19. The displacement detection unit according to claim 18, wherein
- the first magnetic-pole region comprises a plurality of first magnetic-pole regions, the second magnetic-pole region comprises a plurality of second magnetic-pole regions, and the first magnetic-pole regions and the second magnetic-pole regions are alternately disposed in the first direction,
- the magnet has a plurality of boundaries to which the first magnetic-pole regions and the second magnetic-pole regions adjoin, and
- the plurality of boundaries extend in a direction that intersects both the first direction and the second direction.

20. The displacement detection unit according to claim 18, wherein the magnetic detector detects a change in an orthogonal component of the magnetic field and a change in an in-plane component of the magnetic field, the orthogonal component being orthogonal to both the first direction and the second direction, the in-plane component being in a plane that contains the first direction and the second direction.

21. A magnet comprising:
- a first magnetic-pole region extending in a first direction, and polarized into a south pole;

a second magnetic-pole region extending in the first direction, and polarized into a north pole; and a transition section in which a ratio of a magnetic volume of the second magnetic-pole region in a second direction to a magnetic volume of the first magnetic-pole region in the second direction gradually varies in the first direction, the second direction being orthogonal to the first direction, and being a circular member with its circumferential direction coinciding with the first direction, the magnet being rotatable in the first direction around a first axis that extends in a third direction, the third direction being orthogonal to both the first direction and the second direction, wherein the circular member includes an outer-circumferential rim, an inner-circumferential rim, a first boundary, and a second boundary, each of the first magnetic-pole region and the second magnetic-pole region adjoining to both the first boundary and the second boundary, the first axis is present between a first point and a second point and between a third point and a fourth point, the first boundary intersecting the outer-circumferential rim at the first point, the second boundary intersecting the outer-circumferential rim at the second point, the first boundary intersecting the inner-circumferential rim at the third point, the second boundary intersecting the inner-circumferential rim at the fourth point, the first boundary includes only a portion that is neither parallel nor antiparallel to the second direction from the first point to the third point in a plane orthogonal to the first axis, and the second boundary includes only a portion that is neither parallel nor antiparallel to the second direction from the second point to the fourth point in the plane orthogonal to the first axis.

22. The magnet according to claim 21, wherein a boundary between the first magnetic-pole region and the second magnetic-pole region extends while being angled in both the first direction and the second direction.

23. The magnet according to claim 21, wherein the magnet comprises one of a circular member with its circumferential direction coinciding with the first direction and a disc-shaped member with its circumferential direction coinciding with the first direction.

24. The magnet according to claim 21, wherein the first magnetic-pole region comprises a plurality of first magnetic-pole regions, the second magnetic-pole region comprises a plurality of second magnetic-pole regions, and the first magnetic-pole regions and the second magnetic-pole regions are alternately disposed in the first direction.

* * * * *